US012261005B2

(12) United States Patent
Kato et al.

(10) Patent No.: US 12,261,005 B2
(45) Date of Patent: Mar. 25, 2025

(54) ELECTROMAGNETIC RELAY AND ELECTROMAGNETIC DEVICE

(71) Applicant: Panasonic Intellectual Property Management Co., Ltd., Osaka (JP)

(72) Inventors: Yoshimasa Kato, Mie (JP); Yoshihide Asada, Tochigi (JP); Machiko Nishiyama, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/110,164

(22) Filed: Feb. 15, 2023

(65) Prior Publication Data

US 2023/0197387 A1 Jun. 22, 2023

Related U.S. Application Data

(63) Continuation of application No. 16/760,859, filed as application No. PCT/JP2018/039682 on Oct. 25, 2018, now Pat. No. 11,615,931.

(30) Foreign Application Priority Data

Nov. 1, 2017 (JP) ................................ 2017-212215
Nov. 1, 2017 (JP) ................................ 2017-212216
May 14, 2018 (JP) ................................ 2018-093255

(51) Int. Cl.
*H01H 50/24* (2006.01)
*H01H 50/36* (2006.01)
(Continued)

(52) U.S. Cl.
CPC ............ *H01H 50/24* (2013.01); *H01H 50/36* (2013.01); *H01H 50/44* (2013.01); *H01H 50/56* (2013.01); *H01H 50/643* (2013.01)

(58) Field of Classification Search
CPC ............................ H01H 50/24; H01H 50/643
(Continued)

(56) References Cited

U.S. PATENT DOCUMENTS 3,993,971 A * 11/1976 Ono .................. H01H 51/2227 335/125
4,236,132 A * 11/1980 Zissimopoulos ......... H01F 7/14 335/193

(Continued)

FOREIGN PATENT DOCUMENTS

CN 1747079 A 3/2006
DE 196 06 884 C1 4/1997

(Continued)

OTHER PUBLICATIONS

International Search Report and Written Opinion issued in International Patent Application No. PCT/JP2018/039682, dated Jan. 29, 2019; with partial English translation.

(Continued)

*Primary Examiner* — Alexander Talpalatski
(74) *Attorney, Agent, or Firm* — Rimon P.C.

(57) ABSTRACT

The electromagnetic relay includes a contact unit, an electromagnet, an armature unit, and a base. The contact unit includes a fixed contact and a movable spring including a movable contact. The armature unit is movable in accordance with excitation of the electromagnet to allow the movable contact to move between a closed position in contact with the fixed contact and an open position away from the fixed contact. The base holds the contact unit and the electromagnet on a certain surface side. The movable contact is placed between the base and the fixed contact in an arrangement direction in which the base and the electromagnet are arranged. The armature unit includes a press part which causes movement of the movable contact by applying (Continued)

a pressing force to a certain surface facing the fixed contact, of the movable spring.

9 Claims, 26 Drawing Sheets

(51) Int. Cl.
*H01H 50/44* (2006.01)
*H01H 50/56* (2006.01)
*H01H 50/64* (2006.01)

(58) Field of Classification Search
USPC .................................................... 335/234, 79
See application file for complete search history.

(56) References Cited

U.S. PATENT DOCUMENTS 4,237,439 A * 12/1980 Nemoto ................. G03B 17/38 335/79
4,496,919 A * 1/1985 Fournier ................. H01P 1/125 333/105
4,644,308 A * 2/1987 Guery ...................... H01H 9/02 335/131
5,844,456 A 12/1998 Mader
5,994,987 A * 11/1999 Passow ................ H01H 50/546 335/78
6,025,766 A * 2/2000 Passow ............. H01H 51/2227 335/78
6,670,871 B1 * 12/2003 Saso .................. H01H 51/2272 335/78
6,806,801 B2 * 10/2004 Kadoya ................ H01H 50/643 335/83
7,233,220 B2 * 6/2007 Batteux .................. H01H 51/01 335/229
7,307,499 B2 * 12/2007 Nakamura ......... H01H 51/2272 335/83
7,504,915 B2 * 3/2009 Takayama ............ H01H 50/642 335/131
2002/0121950 A1 * 9/2002 Kadoya .................. H01H 50/10 335/78
2006/0049701 A1 3/2006 Sato
2006/0279384 A1 12/2006 Takayama et al.
2007/0171016 A1 * 7/2007 Bonjean ................ H01F 7/1623 335/234
2007/0229203 A1 10/2007 Mikl
2010/0052830 A1 * 3/2010 Shinoura .............. H01H 43/022 335/202
2020/0203104 A1 * 6/2020 Elsinger ............. H01H 51/2272

FOREIGN PATENT DOCUMENTS

DE 10-2016-117671 A1 3/2018
EP 1365431 A2 * 11/2003 ......... H01H 51/2272
EP 2 650 899 A1 10/2013
JP S48-12539 U 2/1973
JP S54-35345 U 3/1979
JP S56-31446 U 3/1981
JP 2000-285782 A 10/2000
JP 2005-063940 A 3/2005
JP 2006-344397 A 12/2006
JP 2007-273472 A 10/2007
JP 2011-077141 A 4/2011

OTHER PUBLICATIONS

Partial Supplementary European Search Report dated Nov. 17, 2020 issued in European Patent Application No. 18872294.6.
Extended European Search Report dated Mar. 23, 2021 issued in corresponding European Patent Application No. 18872294.6.
Chinese Office Action dated Apr. 7, 2022 issued in the corresponding Chinese Patent Application No. 201880070568.7.
Non-Final Office Action dated Jan. 5, 2022 issued in U.S. Appl. No. 16/760,859.
Final Office Action dated May 11, 2022 issued in U.S. Appl. No. 16/760,859.
Non-Final Office Action dated Aug. 19, 2022 issued in U.S. Appl. No. 16/760,859.
Notice of Allowance dated Nov. 18, 2022 issued in U.S. Appl. No. 16/760,859.

* cited by examiner

ELECTROMAGNETIC RELAY AND ELECTROMAGNETIC DEVICE

CROSS-REFERENCE TO RELATED APPLICATIONS

This Application is a Divisional Application of U.S. patent application Ser. No. 16/760,859, filed on Apr. 30, 2020, which is the U.S. National Phase under 35 U.S.C. § 371 of International Patent Application No. PCT/JP2018/039682, filed on Oct. 25, 2018, which in turn claims the benefit of Japanese Patent Application No. 2018-093255, filed on May 14, 2018, Japanese Patent Application No. 2017-212215, filed on Nov. 1, 2017, Japanese Patent Application No. 2017-212216, filed on Nov. 1, 2017, the entire contents of which Applications are incorporated herein by reference herein.

TECHNICAL FIELD

The present disclosure generally relates to electromagnetic relays and electromagnetic devices and in particular to an electromagnetic relay which opens and closes a contact unit in accordance with excitation/non-excitation of an electromagnet, and an electromagnetic device including the electromagnet.

BACKGROUND ART

An electromagnetic relay disclosed in Patent Literature 1 exemplifies a prior art. This electromagnetic relay includes: an armature which is slidably inserted into a coil block with opposite ends thereof protruded therefrom; a pair of yokes placed facing opposite surfaces of the opposite ends of the coil block; and a permanent magnet held between the pair of yokes. Further, the electromagnetic relay includes: a card linked to the armature; a pair of movable springs between which the cart extends; movable contacts fixed to one ends of the movable springs; and fixed contacts placed facing the movable contacts.

In the electromagnetic relay disclosed in Patent Literature 1, an electromagnet block constituted by the coil block, the armature, the pair of yokes, and the permanent magnet, and a contact mechanism unit constituted by the card, the pair of movable springs, the pair of movable contacts, and the pair of fixed contacts are provided upright on one surface side of the base. In this electromagnetic relay, on the one surface side of the base, all of the fixed contacts, the movable contacts, the yokes, and the armature are arranged in one direction (a width direction of the base).

CITATION LIST

Patent Literature

Patent Literature 1: JP 2011-77141 A

SUMMARY OF INVENTION

An object of the present disclosure would be to propose an electromagnetic relay excellent in workability of assembling operation.

An electromagnetic relay according to one aspect of the present disclosure includes: at least one contact unit; an electromagnet; an armature unit; and a base. The at least one contact unit includes a fixed contact and a movable spring including a movable contact. The electromagnet includes a coil and is excited by a coil current flowing through the coil. The armature unit is movable in accordance with excitation of the electromagnet to allow the movable contact to move between a closed position in contact with the fixed contact and an open position away from the fixed contact. The base holds the contact unit and the electromagnet on a certain surface side. The movable contact is placed between the base and the fixed contact in an arrangement direction in which the base and the electromagnet are arranged. The armature unit includes a press part which causes movement of the movable contact by applying a pressing force to a certain surface facing the fixed contact, of the movable spring.

An electromagnetic device according to one aspect of the present disclosure includes: an electromagnet; and an armature unit. The electromagnet includes a coil and a yoke provided to protrude from the coil. The armature unit includes an armature at least part of which has an area facing the yoke, and a holder holding the armature. The armature moves in a direction in which the area moves toward the yoke or in a direction in which the area moves away from the yoke, when the electromagnet is excited. The holder includes a separator which has electrically insulating properties and separates at least part of the area of the armature facing the yoke from the yoke when the area moves toward the yoke.

An electromagnetic relay according to one aspect of the present disclosure includes: the electromagnetic device; and a contact unit. The contact unit includes a fixed contact, and a movable contact movable in accordance with movement of the armature unit between a closed position in contact with the fixed contact and an open position away from the fixed contact.

An electromagnetic device according to one aspect of the present disclosure includes: an electromagnet; an armature; a permanent magnet; and an auxiliary yoke. The electromagnet includes a coil and a yoke. The permanent magnet includes poles one of which faces the armature. The auxiliary yoke includes a first surface and a second surface. The first surface faces the other of the poles of the permanent magnet and crosses a magnetic pole direction of the permanent magnet. The second surface faces the yoke. The armature moves toward or away from the yoke when the electromagnet is excited. The second surface of the auxiliary yoke faces the yoke in a range of at least part of a movable range of the armature moving in response to the excitation.

An electromagnetic relay according to one aspect of the present disclosure includes: the electromagnetic device; and a contact unit. The contact unit includes a fixed contact, and a movable contact movable in accordance with movement of the armature between a closed position in contact with the fixed contact and an open position away from the fixed contact.

BRIEF DESCRIPTION OF DRAWINGS

FIG. 7A illustrates a non-excited state. FIG. 7B illustrates an excited state.

FIG. 8A illustrates the non-excited state. FIG. 8B illustrates the excited state.

FIG. 9A illustrates the non-excited state. FIG. 9B illustrates the excited state.

FIG. 10A illustrates the non-excited state. FIG. 10B illustrates the excited state.

FIG. 20A illustrates a non-excited state. FIG. 20B illustrates an excited state.

FIG. 21A illustrates the non-excited state. FIG. 21B illustrates the excited state.

FIG. 22A illustrates the non-excited state. FIG. 22B illustrates the excited state.

DESCRIPTION OF EMBODIMENTS

Embodiment 1

(1) Outline of Embodiment 1

The following embodiment is just one of various embodiments of the present disclosure. The following embodiment may be modified in various ways depending on the design and the like so long as the objects of the present disclosure can be achieved. In addition, FIG. 1 to FIG. 13 described in the following embodiment are schematic diagrams, and the ratio of the size and thickness of each component in FIG. 1 to FIG. 13 does not necessarily reflect the actual dimension ratio.

Hereinafter, upward, downward, left, right, forward, and rearward directions of the electromagnetic relay 1 and the electromagnetic device 3 of the present embodiment will be described by defining upward, downward, left, right, forward, and rearward arrows illustrated in FIG. 1, FIG. 3, FIG. 4, and FIG. 6. These arrows are provided merely for illustrative purposes and are not tangible. Further, these directions are not intended to limit the use directions of the electromagnetic relay 1 and the electromagnetic device 3.

Figure 1:
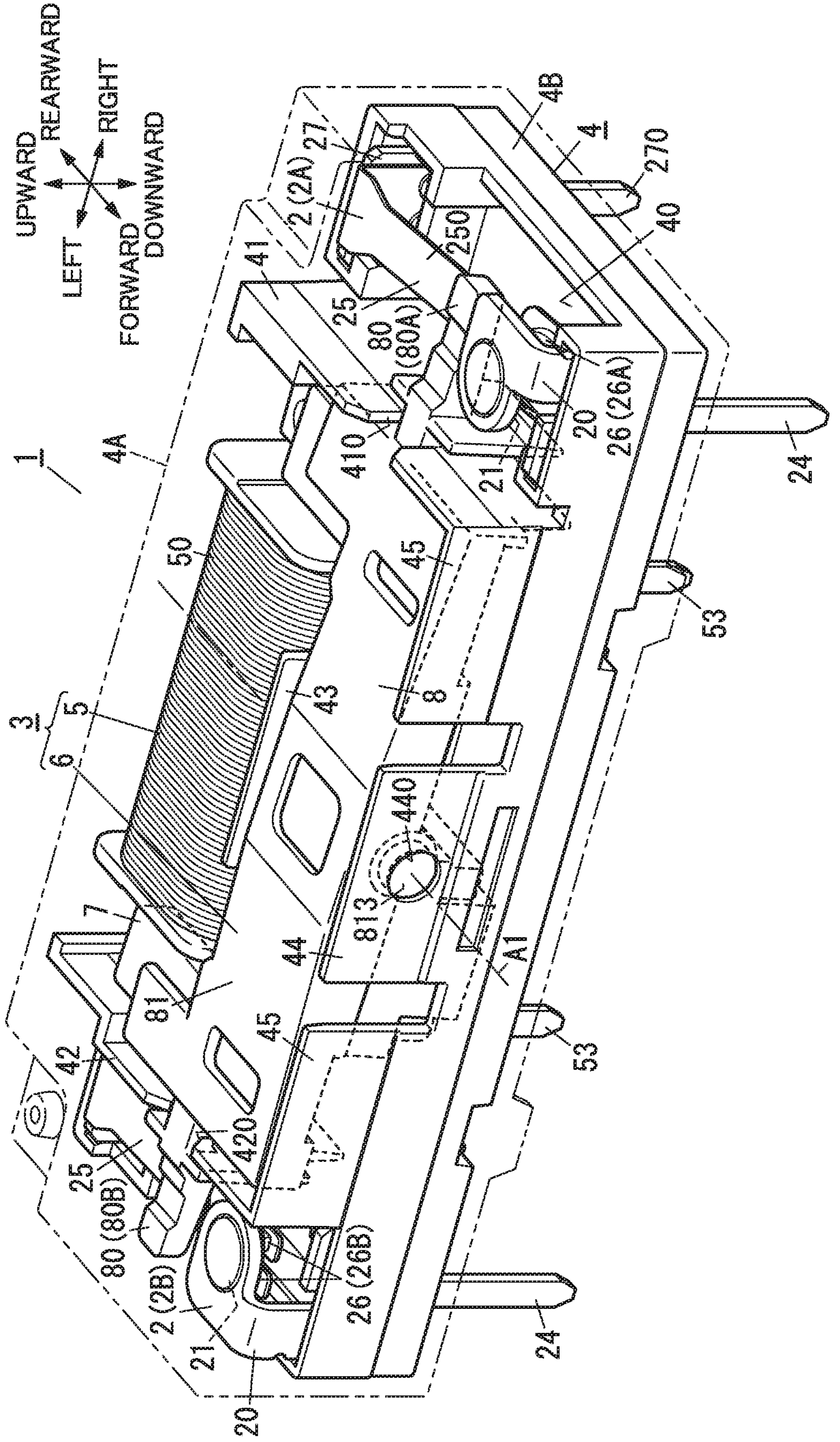
FIG. 1 is a perspective view of an electromagnetic relay according to Embodiment 1.

As shown in FIG. 1, the electromagnetic relay 1 of the present embodiment includes two contact units 2, an electromagnet 5, an armature unit 6, and a base 4B. Each contact unit 2 has a fixed contact 21 and a movable spring 25 having a movable contact 26. The electromagnet 5 includes a coil 50, and is excited by a coil current flowing through the coil 50. The armature unit 6 is movable in accordance with excitation of the electromagnet 5 to allow the movable contact 26 to move between a closed position in contact with the fixed contact 21 and an open position away from the fixed contact 21.

It is assumed that the electromagnetic relay 1 of the present embodiment is configured as a so-called safety relay having a normally open contact, which closes a contact when the electromagnet 5 is excited, and a normally closed contact, which closes a contact when the electromagnet 5 is not excited, and capable of detecting occurrence of an abnormality such as contact welding. Therefore, the number of contact units 2 is two. The two contact units 2 are a first contact unit 2A corresponding to the normally open contact and a second contact unit 2B corresponding to the normally closed contact. However, the electromagnetic relay 1 is not limited to a safety relay, and the number of contact units 2 may be one or three or more.

Figure 2:
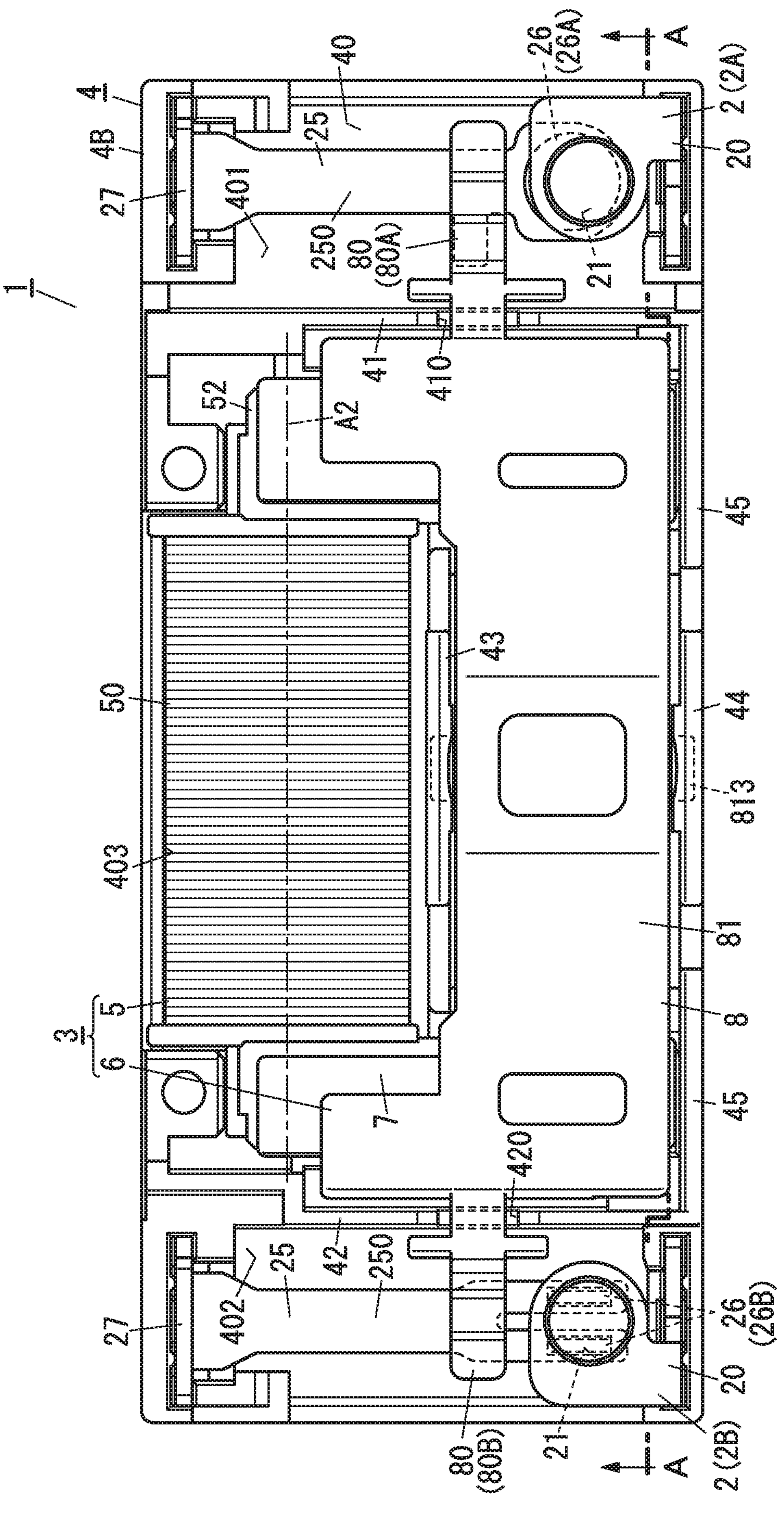
FIG. 2 is a plan view of the above electromagnetic relay.

As shown in FIG. 2, the base 4B holds the two contact units 2 and the electromagnet 5 on a certain surface 40 side.

The certain surface 40 of the base 4B extends in a plane including the forward and rearward directions and the left and right directions in FIG. 1, and has a substantially rectangular outer shape when viewed in the upward and rearward directions. That is, a plane including the certain surface 40 of the base 4B is perpendicular to the upward and rearward directions. Note that the term “perpendicular” as used herein has a broader meaning than “perpendicular” in a geometric sense and is not limited to “perpendicular” in a strict sense and may be interpreted as substantially perpendicular (an angle of intersection may be, for example, 90°±10°.

The movable contact 26 is placed between the base 4B and the fixed contact 21 in an arrangement direction in which the base 4B and the electromagnet 5 are arranged (the upward and rearward directions in FIG. 1). The armature unit 6 includes a press part 80 which causes movement of the movable contact 26 by applying a pressing force to a certain surface 250 facing the fixed contact 21, of the movable spring 25. That is, in the illustrated embodiment, the movable contact 26 and the fixed contact 21 are arranged in this order from the bottom to the top from the base 4B.

According to this configuration, for example, the movable contact 26, the fixed contact 21, and the armature unit 6 can be attached to the base 4B in this order from above the base 4B along the arrangement direction in which the base 4B and the electromagnet 5 are arranged (the upward and rearward directions in FIG. 1). Therefore, it is excellent in workability of assembling operation. In particular, considering automation of assembly of the electromagnetic relay 1, the present embodiment allows sequentially assembling the contact unit 2 and the armature unit 6 along one direction, and therefore productivity of the electromagnetic relay 1 can be improved.

As shown in FIG. 1, the electromagnetic device 3 of the present embodiment includes the electromagnet 5 and the armature unit 6. The electromagnet 5 includes the coil 50 and a yoke 52 provided so as to protrude from the coil 50.

The armature unit 6 includes an armature 7 at least part of which has an area (second area 72) facing the yoke 52, and a holder 8 holding the armature 7. When the electromagnet 5 is excited, the armature 7 moves in a direction in which the area (second area 72) moves toward the yoke 52 or in a direction in which the area (second area 72) moves away from the yoke 52.

In the present embodiment, the holder 8 has a separator 85 which has electrically-insulating properties and separates at least part of the area (second area 72) of the armature 7 facing the yoke 52 from the yoke 52 when the area moves toward the yoke 52.

According to this configuration, the holder 8 holding the armature 7 also includes the separator 85 functioning as a magnetic gap. Therefore, it is possible to provide the electromagnetic device 3 having a magnetic gap with simplified configuration.

(2) Details of Embodiment 1

(2.1) Overall Configuration

Hereinafter, the electromagnetic relay 1 of the present embodiment will be described in detail with reference to FIG. 1 to FIG. 13. As shown in FIG. 1, the electromagnetic relay 1 includes the two contact units 2 (the first contact unit 2A and the second contact unit 2B), the electromagnetic device 3, and a housing 4 including a cover 4A and the base 4B. As described in the chapter of "(1) Outline of Embodiment 1" above, the electromagnetic relay 1 is applicable, for example, as a safety relay. More specifically, it is preferable that the electromagnetic relay 1 is configured so that, when the contacts of the first contact unit 2A, which is the normally open contact, are welded, the contacts of the second contact units 2B, which is the normally closed contact, are separated by 0.5 mm or more from each other even when the electromagnet 5 is in a non-excited state. Further, it is preferable that the electromagnetic relay 1 is configured so that, when the contacts of the second contact units 2B, which is normally closed contact, are welded, the contacts of the first contact unit 2A, which is the normally open contact, are separated by 0.5 mm or more from each other even when the electromagnet 5 is excited. That is, when weld of the first contact unit 2A occurs, the weld can be detected by the second contact unit 2B. When weld of the second contact unit 2B occurs, the weld can be detected by the first contact unit 2A. As shown in FIG. 1, the electromagnetic relay 1 is formed in a substantially rectangular parallelepiped flat shape as a whole.

(2.2) Contact Unit (2.2.1) Configuration of Contact Unit

Figure 11:
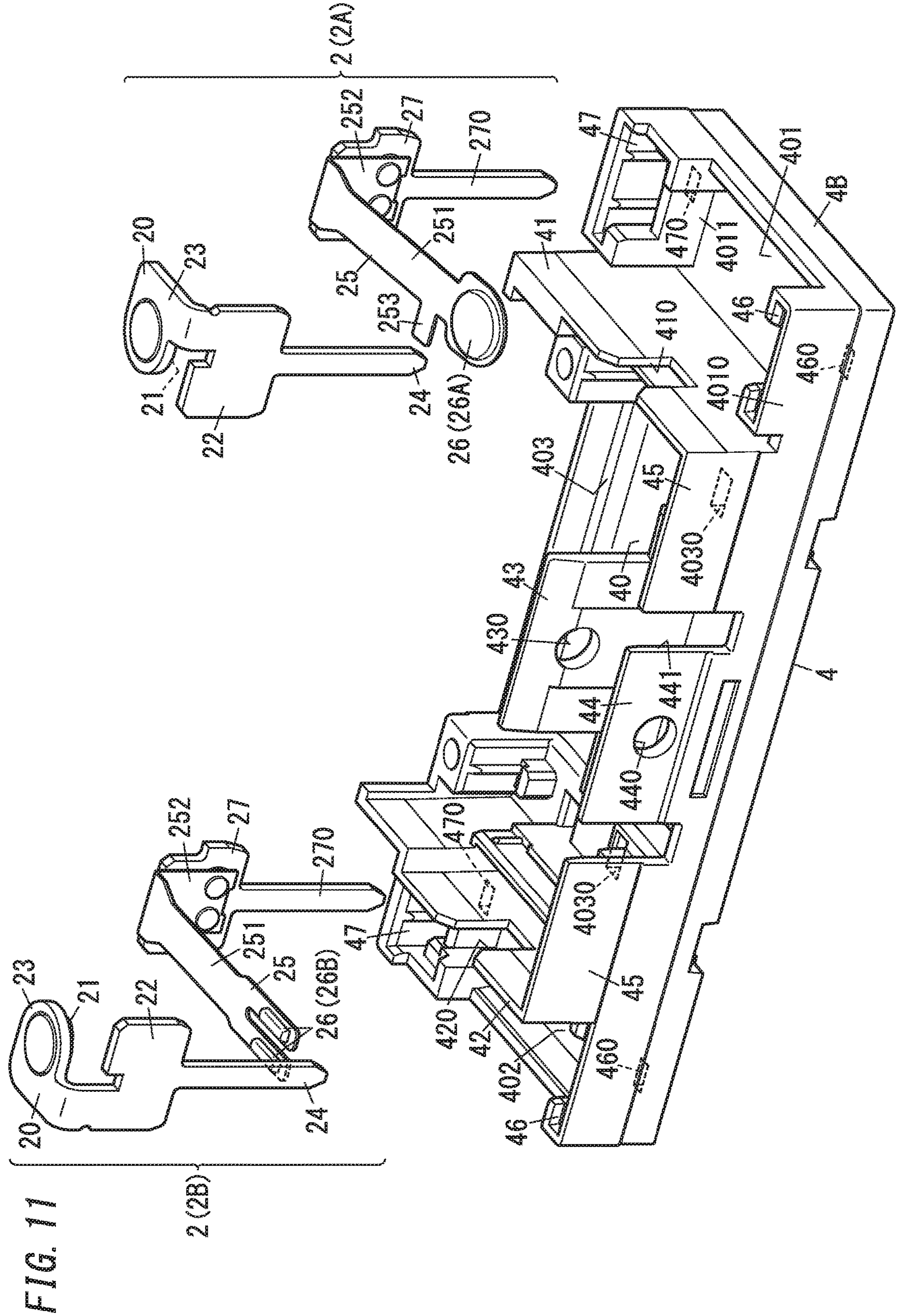
FIG. 11 is an explanatory view of assembly procedure of the above electromagnetic relay.

As shown in FIG. 11, the two contact units 2 include the first contact unit 2A and the second contact unit 2B. The first contact unit 2A corresponds to a normally open contact, and is disposed at a right end of the certain surface 40 (upper surface) of the base 4B of the housing 4. The second contact unit 2B corresponds to a normally closed contact, and is disposed at a left end of the certain surface 40 (upper surface) of the base 4B of the housing 4.

(2.2.2) First Contact Unit

Figure 7A:
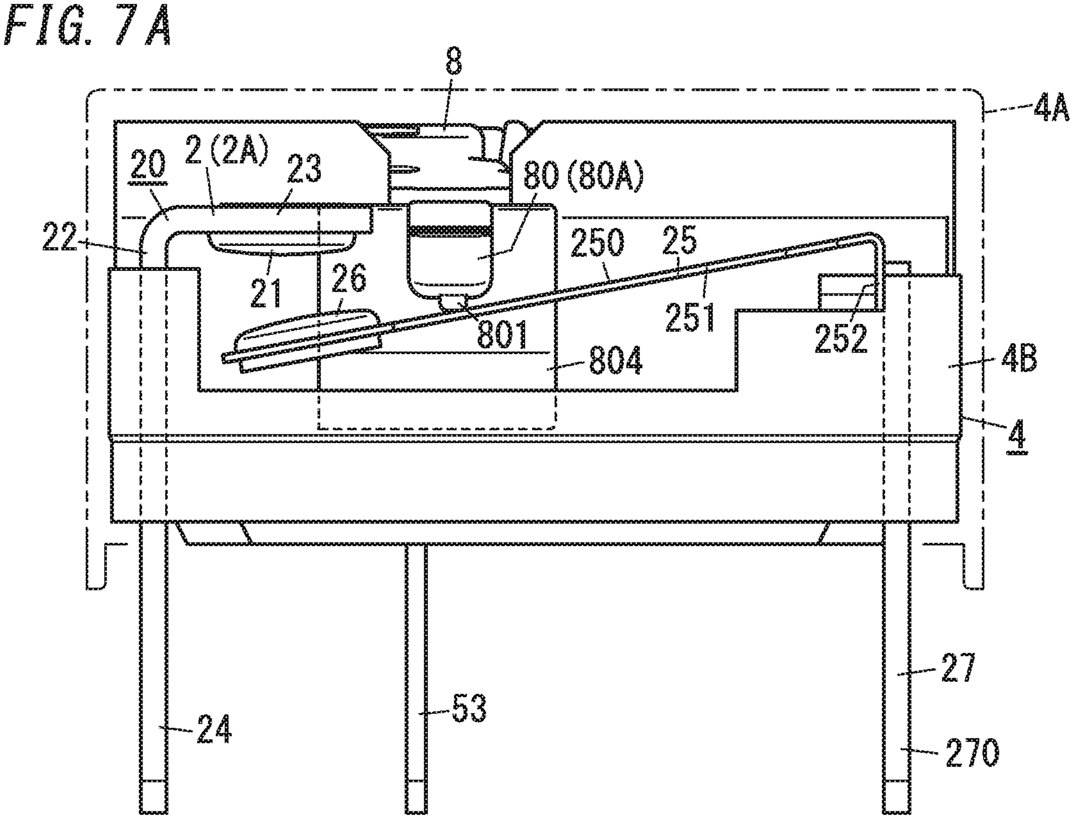
FIG. 7A and FIG. 7B are right side views of the above electromagnetic relay.
Figure 7B:
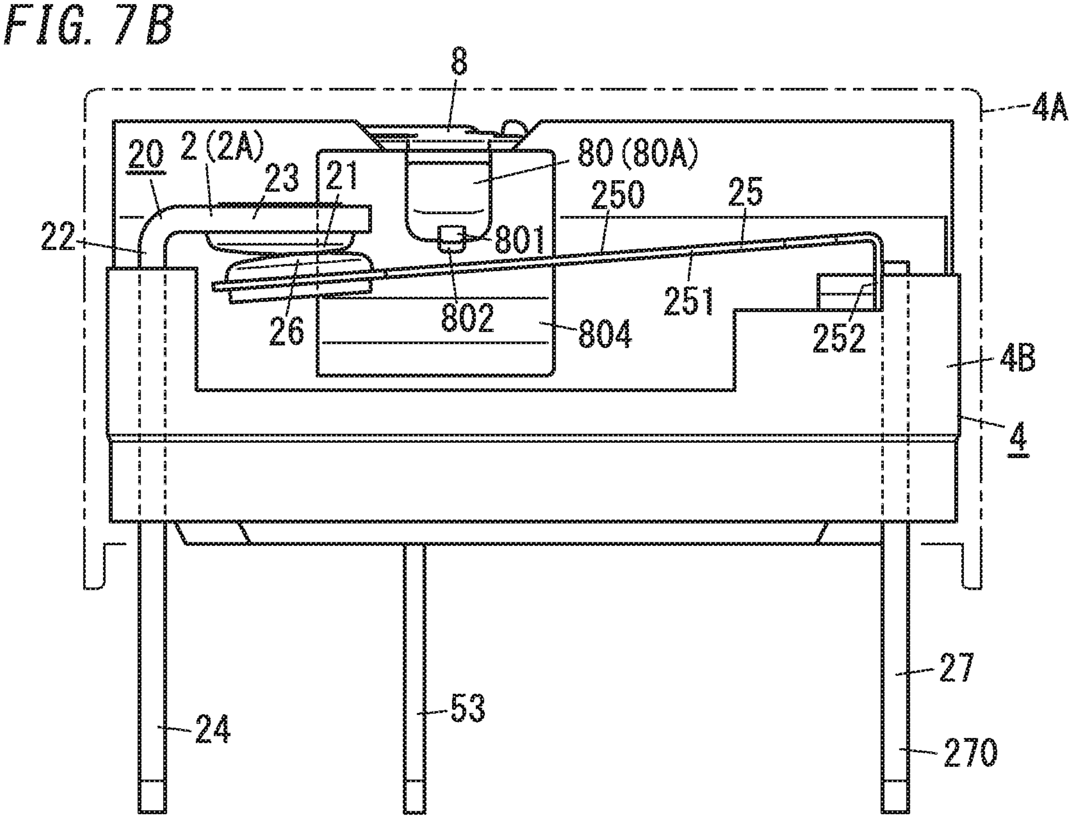

First, the first contact unit 2A will be described mainly referring to FIG. 7A, FIG. 7B, and FIG. 11. FIG. 7A is a right side view of the electromagnetic relay 1 in a state where the electromagnet 5 is in the non-excited state, and FIG. 7B is a right side view of the electromagnetic relay 1 in a state where the electromagnet 5 is in the excited state.

As shown in FIG. 11, the first contact unit 2A includes a fixed terminal 20 including a fixed contact 21, a movable spring 25 including a movable contact 26 (hereinafter sometimes referred to as a first movable contact 26A), and a support terminal 27 supporting the movable spring 25. The fixed terminal 20 is formed in a substantially L-shaped plate shape as a whole when viewed in the left and right directions. The movable spring 25 and the support terminal 27 constitute a movable terminal which is formed in a substantially L-shaped plate shape as a whole when viewed in the left and right directions.

Specifically, the fixed terminal 20 of the first contact unit 2A is formed of electrically conductive material. The fixed terminal 20 includes a fixed contact 21, an upright part 22, an upper wall part 23, and a terminal piece 24. The upright part 22, the upper wall part 23, and the terminal piece 24 are formed by bending a single plate member (such as a copper alloy plate). That is, the upright part 22, the upper wall part 23, and the terminal piece 24 are formed as an integral part.

The upright part 22 is formed in a substantially rectangular plate shape, and is placed so that a thickness direction thereof extends in the forward and rearward directions. The upper wall part 23 is formed in a substantially rectangular plate shape, and protrudes rearward from a right end of an upper part of the upright part 22 (see FIG. 11). The upper wall part 23 is placed so that a thickness direction thereof extends in the upward and downward directions. Attached to a lower surface of the upper wall part 23 is the fixed contact 21 by an appropriate attachment method (e.g., swaging, welding, or the like) as shown in FIG. 7A and FIG. 7B. The fixed contact 21 is formed of, for example, a silver alloy or the like. The terminal piece 24 is formed in a strip shape elongated in the upward and downward directions, extends downward from a lower part of the upright part 22, and is led out from the housing 4 to the outside.

In the present embodiment, as an example, the fixed contact 21 is separate from the upper wall part 23 and is fixed by swaging or the like, but may be formed integrally with the upper wall part 23.

The movable spring 25 of the first contact unit 2A is a leaf spring made of an electrically conductive thin plate, and is formed to have a substantially L-shape when viewed in the left and right directions.

As shown in FIG. 11, the movable spring 25 includes the first movable contact 26A, a lateral piece 251, a vertical piece 252, and a protruded piece 253. The lateral piece 251, the vertical piece 252, and the protruded piece 253 are formed, for example, by performing a bending process on a single plate member. That is, the lateral piece 251, the vertical piece 252, and the protruded piece 253 are formed as an integral part.

The lateral piece 251 is formed in a substantially rectangular plate shape elongated in the forward and rearward directions, and is placed so that a thickness direction thereof extends substantially in the upward and downward directions. As shown in FIG. 7A and FIG. 7B, the first movable contact 26A is attached to a distal end of an upper surface (part of the certain surface 250) of the lateral piece 251 by an appropriate attachment method (for example, swaging method, welding method, or the like). The first movable contact 26A is formed of, for example, a silver alloy or the like, and is disposed so as to face the fixed contact 21 in the upward and downward directions. However, a positional relationship between the first movable contact 26A and the fixed contact 21 is that the first movable contact 26A is on the lower side and the fixed contact 21 is on the upper side.

The vertical piece 252 is formed in a substantially rectangular plate shape and protrudes downward from a rear end of the lateral piece 251. The vertical piece 252 is fixed to the support terminal 27 by, for example, swaging and fixing so that the thickness direction thereof extends in the forward and rearward directions.

The protruded piece 253 protrudes leftward from a left edge near the distal end of the lateral piece 251. The protruded piece 253 is formed in a rectangular plate shape, and a thickness direction thereof extends in the upward and downward directions. The protruded piece 253 serves as part with which a second protrusion 802 of a first press part 80A of the holder 8, which will be described later, comes into contact from above.

In the present embodiment, in one example, the first movable contact 26A is separate from the lateral piece 251 and is fixed by swaging or the like, but may be formed integrally with the lateral piece 251.

The support terminal 27 of the first contact unit 2A is configured to support the movable spring 25. The support terminal 27 includes a terminal piece 270 to be led out from the housing 4. The terminal piece 270 is formed in a strip shape elongated in the upward and downward directions.

In the first contact unit 2A configured as described above, when the electromagnet 5 is in the non-excited state, the certain surface 250 (upper surface) of the movable spring 25 continues to be pressed by the first press part 80A of the holder 8, as shown in FIG. 7A. Therefore, a distal end part of the movable spring 25 is bent downward by elastic deformation, and the first movable contact 26A is in the open position away from the fixed contact 21.

In the first contact unit 2A, when the electromagnet 5 is in the excited state, the pressing force from the first press part 80A of the holder 8 is eliminated as shown in FIG. 7B. Therefore, the distal end part of the movable spring 25 elastically returns upward, and the first movable contact 26A is in the closed position in contact with the fixed contact 21. In the present embodiment, as shown in FIG. 7B, a dimensional relation is defined so that the first press part 80A of the holder 8 does not touch the certain surface 250 of the movable spring 25 while the electromagnet 5 is in the excited state. That is, when the electromagnet 5 is in the excited state, a slight gap is formed between the first press part 80A and the certain surface 250 of the movable spring 25, and the pressing force from the first press part 80A is eliminated.

(2.2.3) Second Contact Unit

Figure 8A:
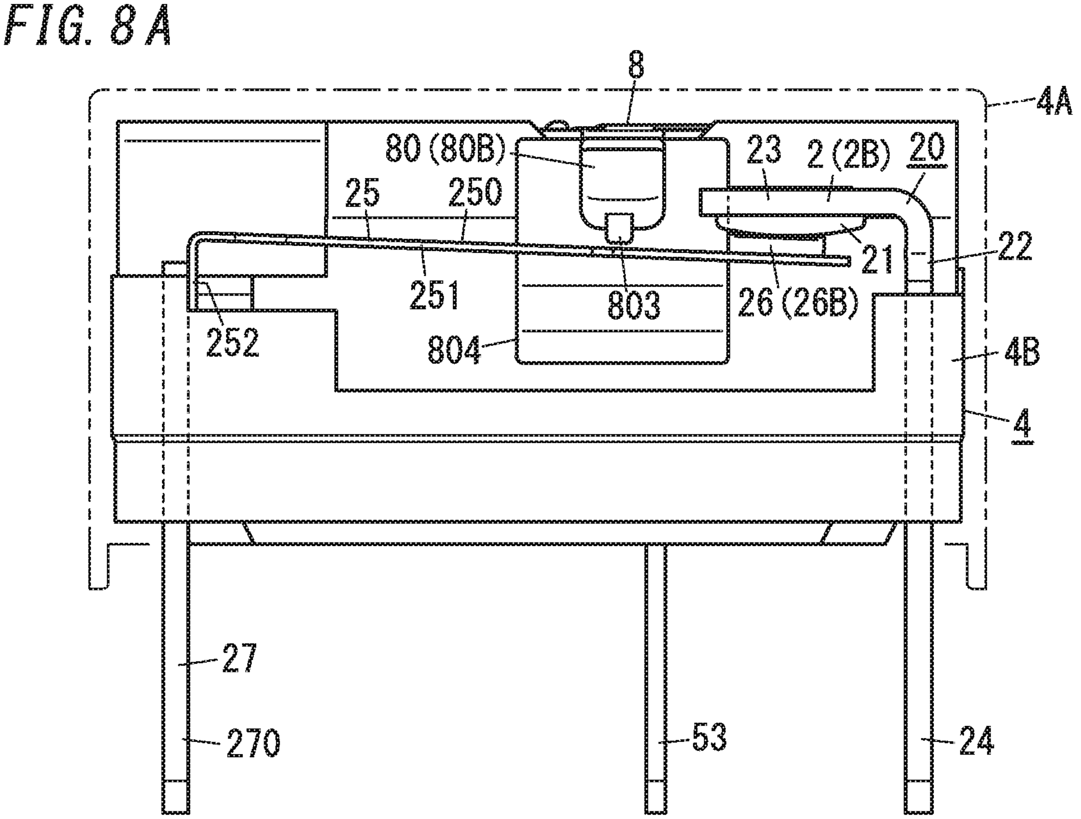
FIG. 8A and FIG. 8B are left side views of the above electromagnetic relay.
Figure 8B:
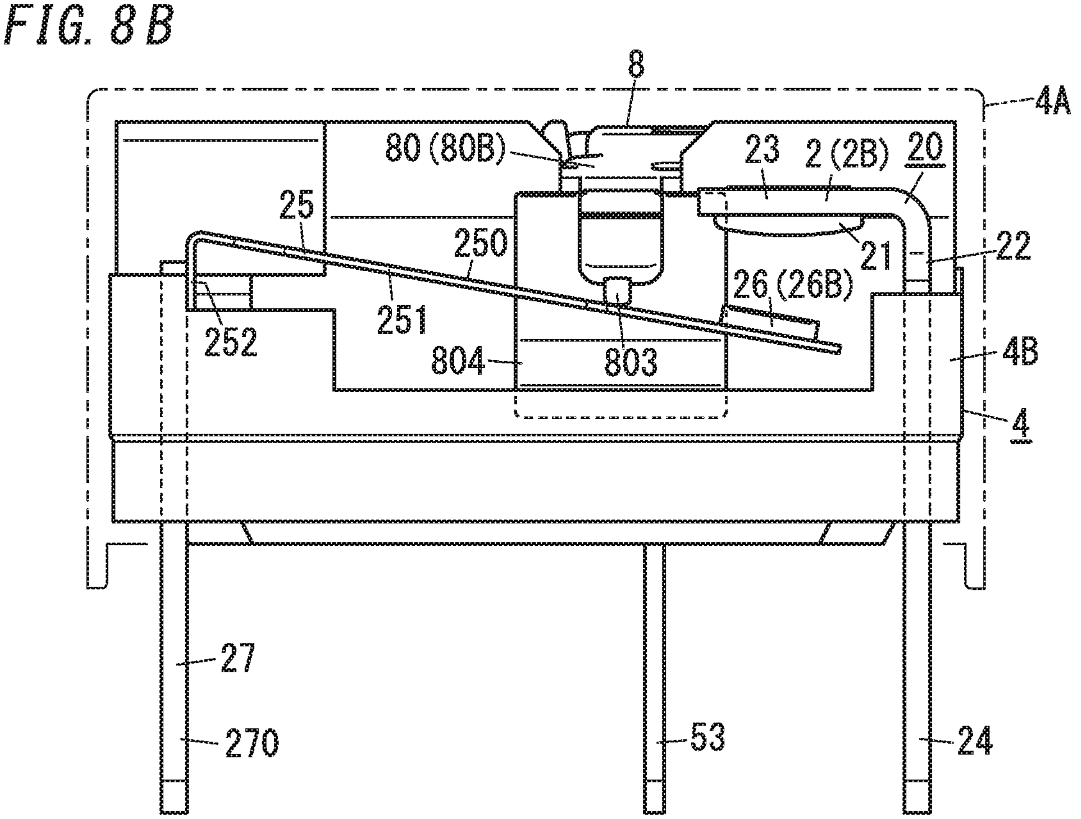

Next, the second contact unit 2B will be described mainly referring to FIG. 8A, FIG. 8B, and FIG. 11. FIG. 8A is a left side view of the electromagnetic relay 1 with the electromagnet 5 being in the non-excited state, and FIG. 8B is a left side view of the electromagnetic relay 1 with the electromagnet 5 being in the excited state.

In the present embodiment, the second contact unit 2B has substantially the same configuration as the first contact unit 2A. Therefore, in the following description, in order to simplify the description, common reference numerals are given to common structures to avoid redundant explanations as appropriate.

As shown in FIG. 11, the second contact unit 2B includes a fixed terminal 20 including a fixed contact 21, a movable spring 25 including a movable contact 26 (hereinafter sometimes referred to as a second movable contact 26B), and a support terminal 27 supporting the movable spring 25. The movable spring 25 and the support terminal 27 constitute a movable terminal.

Specifically, the fixed terminal 20 of the second contact unit 2B is formed of electrically conductive material. The fixed terminal 20 includes a fixed contact 21, an upright part 22, an upper wall part 23, and a terminal piece 24. As shown in FIG. 11, the fixed terminal 20 of the second contact unit 2B employs a configuration that is plane symmetric with the fixed terminal 20 of the first contact unit 2A in the left and right directions.

The movable spring 25 of the second contact unit 2B is a leaf spring made of an electrically conductive thin plate, and is formed to have a substantially L-shape when viewed in the left and right directions. As shown in FIG. 11, the movable spring 25 includes a pair of second movable contacts 26B, a lateral piece 251, and a vertical piece 252. That is, unlike the movable spring 25 of the first contact unit 2A, the movable spring 25 of the second contact unit 2B does not include the protruded piece 253. The number of movable contacts 26 differs from that of the first contact unit 2A. That is, the distal end of the lateral piece 251 of the second contact unit 2B is different in shape from the distal end of the lateral piece 251 of the first contact unit 2A, and is divided into two branches. The pair of second movable contacts 26B are provided on the two branches of the distal end, individually.

The movable contact 26 of the first contact unit 2A is configured to make contact with the fixed contact 21 at one contact point. It is assumed that the first contact 2A corresponds to a normally open contact and is inserted into an electric path to which a load is connected, for example. Therefore, the first contact unit 2A is configured to reduce a resistance for current as much as possible.

On the other hand, the movable contacts 26 of the second contact unit 2B are configured to make contact with the fixed contact 21 at two contact points. This is because it is assumed that the second contact unit 2B corresponds to a normally closed contact, and is connected to a detection circuit for detecting an abnormality such as contact welding, for example. Therefore, even if a foreign substance or the like adheres to one of the pair of second movable contacts 26B, the other makes contact with the fixed contact 21. Thus, the contact reliability is enhanced, and the detection circuit can more reliably detect an abnormality. Further, the movable contact 26 of the second contact unit 2B may be provided so as to make contact with the fixed contact 21 at one contact point, similarly to the movable contact 26 of the first contact unit 2A.

Also in the second contact unit 2B, similarly to the first contact unit 2A, the pair of second movable contacts 26B are placed to face the fixed contact 21 in the upward and downward directions. A positional relationship between the pair of second movable contacts 26B and the fixed contact 21 is that the pair of second movable contacts 26B is on the lower side and the fixed contact 21 is on the upper side.

In the present embodiment, as one example, the fixed contact 21 of the second contact unit 2B is separate from the upper wall part 23 and is fixed by swaging or the like, but may be formed integrally with the upper wall part 23. The pair of second movable contacts 26B of the second contact unit 2B is separate from the lateral piece 251 and is fixed by swaging or the like, but may be formed integrally with the lateral piece 251.

In the second contact point 2B configured as described above, when the electromagnet 5 is in the excited state, the certain surface 250 (upper surface) of the movable spring 25 continues to be pressed by the second press part 80B of the holder 8 to be described later, as shown in FIG. 8B. Therefore, the distal end part of the movable spring 25 is bent downward by elastic deformation, and the pair of second movable contacts 26B each is in the open position away from the fixed contact 21.

Further, in the second contact unit 2B, when the electromagnet 5 is in the non-excited state, a pressing force from the second press part 80B of the holder 8 is eliminated as shown in FIG. 8A. Therefore, the distal end part of the movable spring 25 elastically returns upward, and the pair of second movable contacts 26B each are in the closed position in contact with the fixed contact 21. In the present embodiment, as shown in FIG. 8A, a dimensional relation is defined so that the second press part 80B of the holder 8 does not come into contact with the certain surface 250 of the movable spring 25 while the electromagnet 5 is in the non-excited state. That is, when the electromagnet 5 is in the non-excited state, a slight gap is formed between the second press part 80B and the certain surface 250 of the movable spring 25, and the pressing force from the second press part 80B is eliminated.

(2.3) Electromagnetic Device

(2.3.1) Configuration of Electromagnetic Device

As shown in FIG. 1, the electromagnetic device 3 includes the electromagnet 5 and the armature unit 6. In the electromagnetic device 3, the armature unit 6 is movable in accordance with excitation/non-excitation of the electromagnet 5 to switch open/closed states of the first contact unit 2A and the second contact unit 2B. In the present embodiment, for example, the armature unit 6 is allowed to swing about a rotation axis A1 (see FIG. 1) in accordance with excitation/non-excitation of the electromagnet 5. Note that "swing" in the present embodiment means that both ends (left and right ends) in a length axis of the armature unit 6 having length move upward and downward alternately relative to a center (not necessarily a strict center) in the length axis as a fulcrum. That is, the armature unit 6 is, for example, a so-called seesaw type armature unit. However, the armature unit 6 is not limited to the seesaw type.

The rotation axis A1 illustrated by a dashed line in FIG. 1 is described only for the purpose of assisting the description, and is not tangible. In the present embodiment, a center axis of an axle 813 of the holder 8 of the armature unit 6 (which will be described later) coincides with the rotation axis A1. The armature unit 6 swings about the rotational axis A1 with respect to the base 4B of the housing 4 in response to excitation/non-excitation of the electromagnet 5 to displace the movable contacts 26. Thus, the armature unit 6 can have an increased stroke and can be downsized (especially decreased in height).

(2.3.2) Electromagnet

Figure 6:
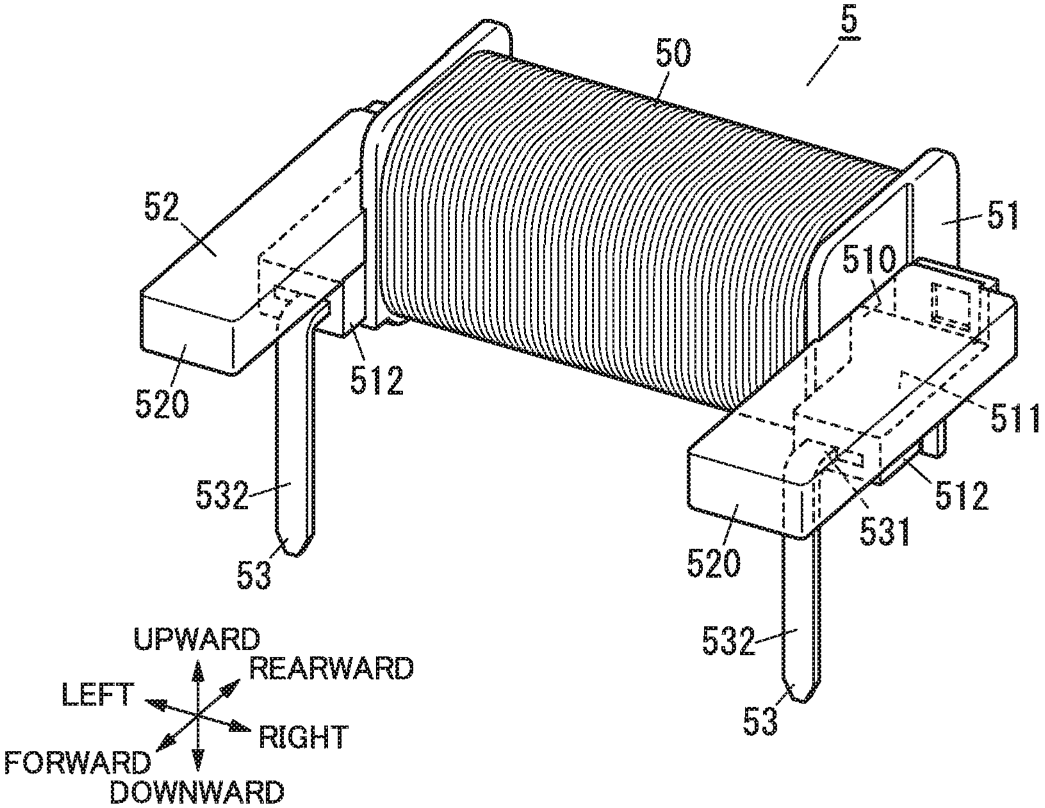
FIG. 6 is a perspective view of an electromagnet of the above electromagnetic relay.

First, the electromagnet 5 will be described mainly with reference to FIG. 2 and FIG. 6. As shown in FIG. 6, the electromagnet 5 includes the coil 50, the yoke 52, and a pair of coil terminals 53.

The yoke 52 is a magnetic material, and forms a magnetic path through which a magnetic flux passes. The yoke 52 is formed in a substantially U-shaped plate shape elongated in the left and right directions as a whole.

The coil 50 is formed by winding an electrically conductive wire around a coil bobbin 51. The coil bobbin 51 is formed of an electrically insulating material such as a synthetic resin material. The coil bobbin 51 is formed in a substantially cylindrical shape elongated in the left and right directions. The coil bobbin 51 is placed to have an axial direction coinciding with the left and right directions. The axial direction of the coil bobbin 51 corresponds to an axial direction A2 of the coil 50 (see FIG. 2).

As shown in FIG. 6, the coil bobbin 51 includes a through hole 510 that penetrates in the left and right directions, and the yoke 52 is held so that a body part of the yoke 52 that extends in the left and right direction penetrates the through hole 510. A pair of extended parts 520 extend forward from left and right ends of the body part of the yoke 52 (see FIG. 6). In short, the yoke 52 is provided so as to protrude from the coil 50.

The coil bobbin 51 includes holding pedestals 511 which have substantially rectangular plate shapes and are provided at both ends in the left and right directions and below the pair of extended parts 520. Each holding pedestal 511 is formed continuously from a lower edge of the through hole 510 so as to have an upper surface flush with an inner bottom surface of the through hole 510. The holding pedestals 511 preferably support the pair of extended parts 520.

The pair of coil terminals 53 are held by the coil bobbin 51 and connected to the coil 50. Specifically, one of the pair of coil terminals 53 is electrically connected to one end of the electrically conductive wire wound around the coil bobbin 51, and the other of the pair of coil terminals 53 is electrically connected to the other end of the electrically conductive wire. Further, terminal holding blocks 512 which have rectangular parallelepiped shapes and are provided on lower surfaces of front end parts of the holding pedestals 511 of the coil bobbin 51 hold the coil terminals 53, individually.

Each of the coil terminals 53 includes a first terminal piece 531, which is long in the forward and rearward directions and is held by a corresponding terminal holding block 512 which penetrating it in the forward and rearward directions. A rear end of the first terminal piece 531 is bent downward and protrudes from the terminal holding block 512. The electrically conductive wire wound around the coil bobbin 51 is connected to an electrically conductive wire end part exposed from the terminal holding block 512. Each coil terminal 53 further includes a second terminal piece 532 extending downward from a front end of the first terminal piece 531. The second terminal piece 532 is part to be led out from the housing 4 to the outside.

In the electromagnet 5 configured as described above, when a voltage is applied between both ends of the coil 50, that is, to the pair of coil terminals 53, a current (coil current) flows through the coil 50 to excite the electromagnet 5. While the coil current is not flowing, the electromagnet 5 is in the non-excited state.

In the present embodiment, the pair of coil terminals 53 and the yoke 52 are integrally molded with the coil bobbin 51. Therefore, it is excellent in workability of assembling operation of the electromagnet 5 relative to the base 4B of the housing 4.

(2.3.3) Armature Unit

Next, the armature unit 6 will be described mainly with reference to FIG. 3 to FIG. 5. The armature unit 6 is a part that moves (swings in this embodiment) in response to excitation/non-excitation of the electromagnet 5 so that the movable contact 26 is displaced between the closed position in contact with the fixed contact 21 and the open position away from the fixed contact 21. As shown in FIG. 5, the armature unit 6 includes the armature 7, the holder 8, and a permanent magnet 9.

The armature 7 is, for example, a member made of soft iron. The armature 7 is held by the holder 8. The armature 7 as a whole is formed in a substantially U-shaped plate shape that is long in the left and right directions. Specifically, as shown in FIG. 5, the armature 7 includes a body piece 73 that is long in the left and right directions, and a pair of leg pieces 70 that are integrally formed at both ends of the body piece 73 in the left and right directions.

The body piece 73 is accommodated in the holder 8. The body piece 73 has a rectangular plate shape, and is placed to have a thickness direction extending in the upward and downward directions. The pair of leg pieces 70 are formed so as to extend rearward from the both ends of the body piece 73. The pair of leg pieces 70 have rectangular plate shapes, and are placed to have thickness directions extending in the upward and downward directions. A rear end part of each leg piece 70 is placed to protrude from the holder 8. A lower surface of each leg piece 70 is substantially exposed from the holder 8.

The armature 7 is placed to have at least part thereof having an area facing the yoke 52. In the present embodiment, the lower surfaces of the individual leg pieces 70 exposed from the holder 8 are areas facing the yoke 52 (the extended parts 520). Hereinafter, a right leg piece 70 of the pair of leg pieces 70 may be referred to as a first leg piece 70A, and the area facing a right one of the extended parts 520 of the yoke 52 may be referred to as a first area 71 (see FIG. 4). A left leg piece 70 of the pair of leg pieces 70 may be referred to as a second leg piece 70B, and the area facing a left one of the extended parts 520 of the yoke 52 may be referred to as a second area 72. The first area 71 and the second area 72 are provided to opposite tops of the armature unit 6 extending in opposite directions (the left and right directions) moving away from the rotation axis A1, respectively.

Figure 9A:
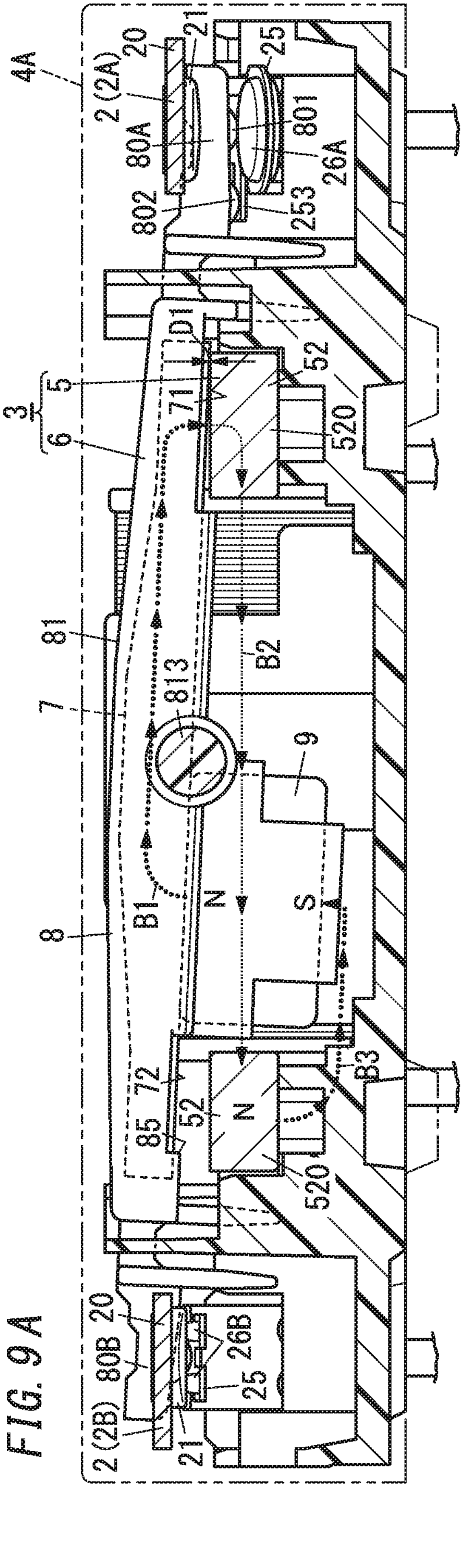
FIG. 9A and FIG. 9B are sectional views of A-A line in FIG. 2.
Figure 9B:
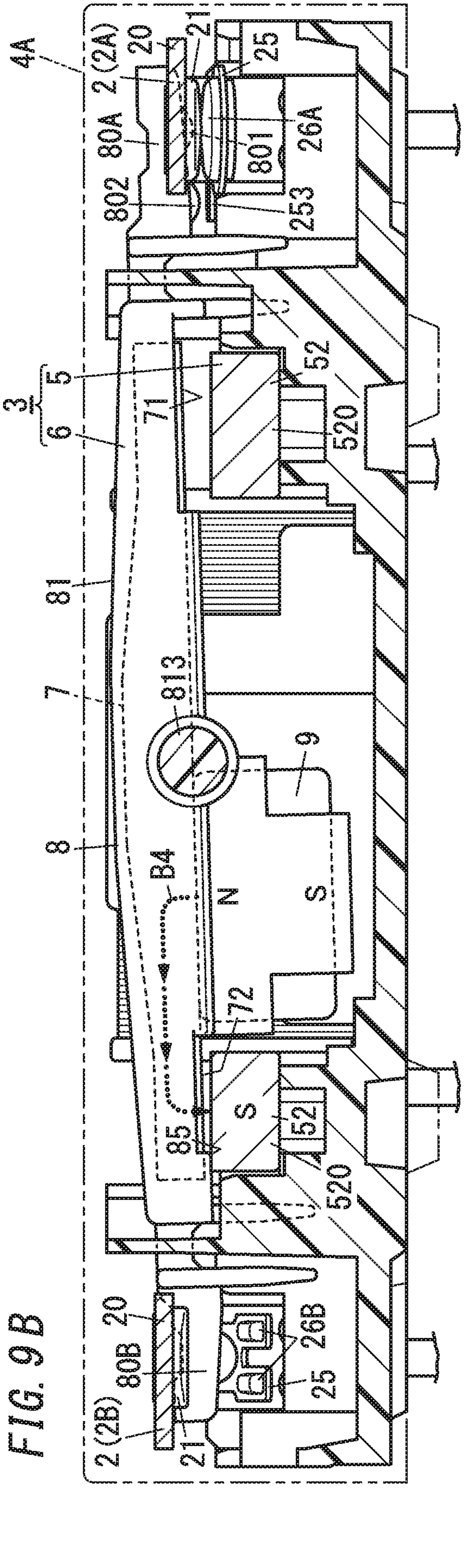

The permanent magnet 9 is formed in a rectangular parallelepiped shape. The permanent magnet 9 is held by the holder 8. The permanent magnet 9 is placed to have opposite polarities in the upward and downward directions different from each other. In the present embodiment, the permanent magnet 9 is placed so that its N pole is directed upward and its S pole is directed downward, as shown in FIG. 9A and FIG. 9B.

The holder 8 is formed to be long in the left and right directions, and have a flat substantially rectangular cylindrical shape. The holder 8 is formed of, for example, an electrically insulating material such as a synthetic resin material. The holder 8 is configured to hold both the armature 7 and the permanent magnet 9 integrally. Specifically, the holder 8 includes a first holding block 81 for holding the armature 7, a second holding block 82 for holding the permanent magnet 9, and a pair of press parts 80. The first holding block 81, the second holding block 82, and the pair of press parts 80 are formed as an integral part. The armature 7 and the permanent magnet 9 are in contact with each other inside the holder 8 (see FIG. 9A and FIG. 9B).

The first holding block 81 is formed in a flat rectangular cylindrical shape that is long in the left and right directions. As shown in FIG. 4, the first holding block 81 includes a bottom both left and right ends of which are opened downward. The first holding block 81 holds the armature 7 to cover a peripheral surface of the body piece 73 of the armature 7 and allow rear ends of the pair of leg pieces 70 of the armature 7 to protrude from the first holding block 81. In particular, the first area 71 and the second area 72 of the armature 7 are exposed through a first opening 811 and a second opening 812 at right and left ends of the bottom of the first holding block 81, respectively (see FIG. 4).

The first holding block 81 includes first insertion pieces 810 individually protruding downward from left and right ends thereof. The first holding block 81 includes the axle 813 protruding outward (forward and rearward) from a center in the left and right directions of the bottom. A central axis of the axle 813 corresponds to the rotation axis A1 about which the armature unit 6 swings with respect to the electromagnet 5 in response to excitation/non-excitation of the electromagnet 5. In other words, the axle 813 is pivotally supported to allow the armature unit 6 to swing with respect to the base 4B of the housing 4.

Further, the first holding block 81 includes the separator 85 (see FIG. 4, FIG. 9A, FIG. 9B, FIG. 10A and FIG. 10B) that separates at least part of the area of the armature 7 facing the yoke 52 from the yoke 52 when the armature 7 moves toward the yoke 52. The separator 85 comes into contact with the yoke 52 when the armature 7 approaches the yoke 52. The separator 85 is formed integrally and continuously with the holder 8 in forming the holder 8 by molding, and is made of an electrically insulating material such as a synthetic resin material. The separator 85 is provided to form a magnetic gap.

In the present embodiment, as an example, the separator 85 is placed to separate one of the first area 71 and the second area 72 of the armature 7 (second area 72) from the yoke 52. Therefore, manufacture of the armature unit 6 is easier than that of configuration in which both of the first area 71 and the second area 72 are separated from each other.

The separator 85 is placed to separate at least part of the second area 72 of the armature 7 from the yoke 52 when the second area 72 moves toward the yoke 52. In the present embodiment, as an example, the separator 85 is placed to separate a whole of the second area 72 of the armature 7 from the yoke 52 when the second area 72 moves toward the yoke 52. The separator 85 is placed to separate the second area 72 of the armature 7 from the yoke 52 by making contact with at least part of the yoke 52 facing the second area 72 of the armature 7.

In the present embodiment, as an example, the separator 85 is placed only at an outer end (left end) of both ends (left and right ends) of the second area 72 in a radial direction of the rotation axis A1. That is, the separator 85 is placed to separate the second area 72 from the yoke 52 by making contact with the yoke 52 facing the outer end (left end). For this reason, for example, a magnetic gap can be formed with higher accuracy compared to a configuration in which the separator 85 is placed at an inner end (right end) of the both ends of the second area 72 of the armature 7, that is, a configuration in which the separator 85 separates the second area 72 from the yoke 52 by making contact with the yoke 52 facing the inner end (right end). That is, a configuration facilitating separation of the armature 7 from the yoke 52 is adopted.

More specifically, the separator 85 is formed as a protruding piece that protrudes rightward from a left edge of the second opening 812 and extends lengthwise in the forward and rearward directions. In other words, the separator 85 is configured to form a step under the second area 72 of the armature 7.

The separator 85 configured as described above suppresses deterioration of opening characteristic of the electromagnetic relay 1 due to difficulty in separation between the second area 72 of the armature 7 and the left extended part 520 of the yoke 52 caused by residual magnetization when the electromagnet 5 is switched from the excited state to the non-excited state.

The second holding block 82 is integral with the bottom of the first holding block 81. The second holding block 82 is formed in a substantially rectangular box shape. The second holding block 82 accommodates therein and holds the permanent magnet 9. As shown in FIG. 4, the second holding block 82 includes left and right ends lower parts of which are opened to expose lower parts of left and right ends of the permanent magnet 9. The second holding block 82 includes a circular through hole 820 (see FIG. 4) at a bottom thereof, exposing part of a bottom of the permanent magnet 9.

The second holding block 82 is placed closer to a left side of the first holding block 81 than the axle 813 of the first holding block 81 is. Therefore, the permanent magnet 9 accommodated in the second holding block 82 is positioned left with respect to the rotation axis A1. Therefore, for example, as compared with a case where the permanent magnet 9 is located at substantially the same position as the rotation axis A1, swinging of the armature unit 6 in response to the excitation/non-excitation of the electromagnet 5 can be performed with higher accuracy through the permanent magnet 9. In addition, for example, as compared with a case where two permanent magnets 9 are provided and the two permanent magnets 9 are arranged in bilateral symmetry with respect to the rotation axis A1, swing of the armature unit 6 can be performed more accurately by using one permanent magnet 9 with the number of parts reduced.

The pair of press parts 80 are provided integrally with the left and right end parts of the first holding block 81. Each press part 80 is part that applies a pressing force to the certain surface 250 of the movable spring 25 to move the movable contact 26. Hereinafter, the press part 80 protruding rightward from the right end part of the first holding block 81 may be referred to as a first press part 80A. The press part 80 protruding leftward from the left end part of the first holding block 81 may be referred to as a second press part 80B.

Each press part 80 is formed in an elongated rectangular parallelepiped shape. As shown in FIG. 3 and FIG. 4, the first press part 80A includes at its lower surface a first protrusion 801 and a second protrusion 802 which are convex downward. As shown in FIG. 7A and FIG. 7B, the first protrusion 801 faces the lateral piece 251 of the movable spring 25 of the first contact unit 2A. As shown in FIG. 9A, the second protrusion 802 faces the protruded piece 253 of the movable spring 25 of the first contact unit 2A. In short, the first press part 80A comes into contact with the movable spring 25 and gives a pressing force thereto with the first protrusion 801 and the second protrusion 802 in-between, thereby moving the first movable contact 26A. As described above, since the first contact unit 2A corresponds to the normally open contact, the first press part 80A gives the pressing force to the movable spring 25 by making contact therewith while the electromagnet 5 is in the non-excited state (see FIG. 7A).

Figure 3:
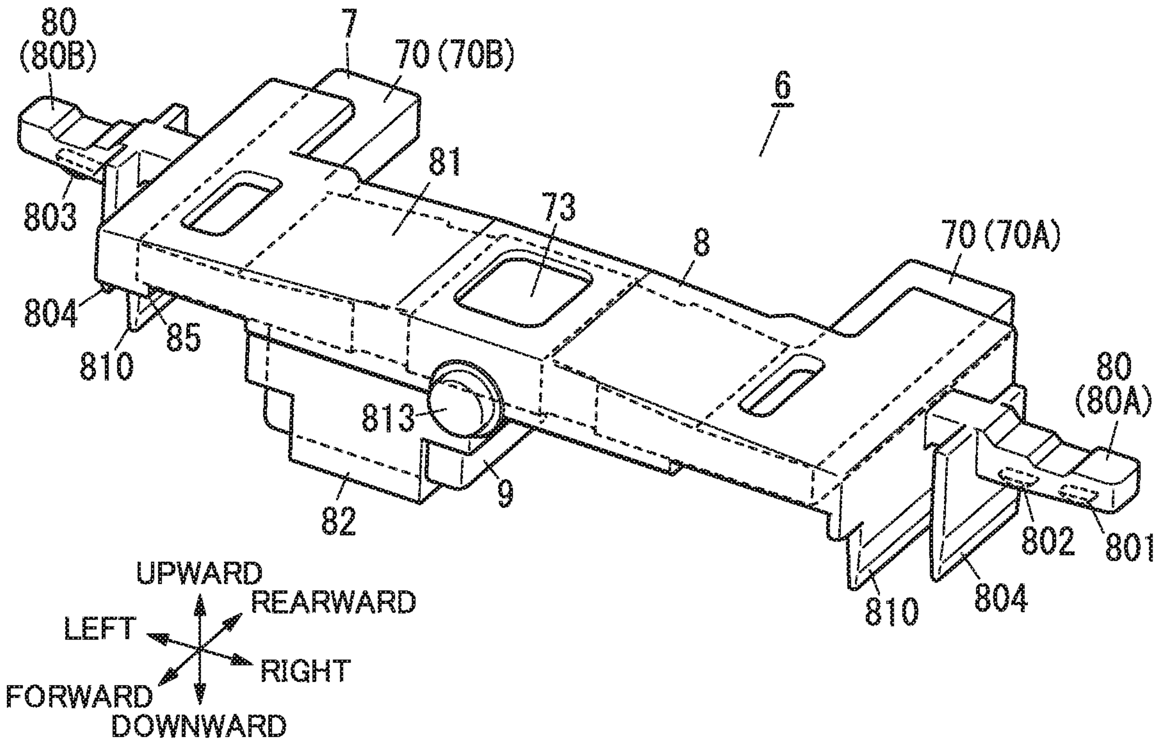
FIG. 3 is a perspective view of an armature unit of the above electromagnetic relay from above.
Figure 4:
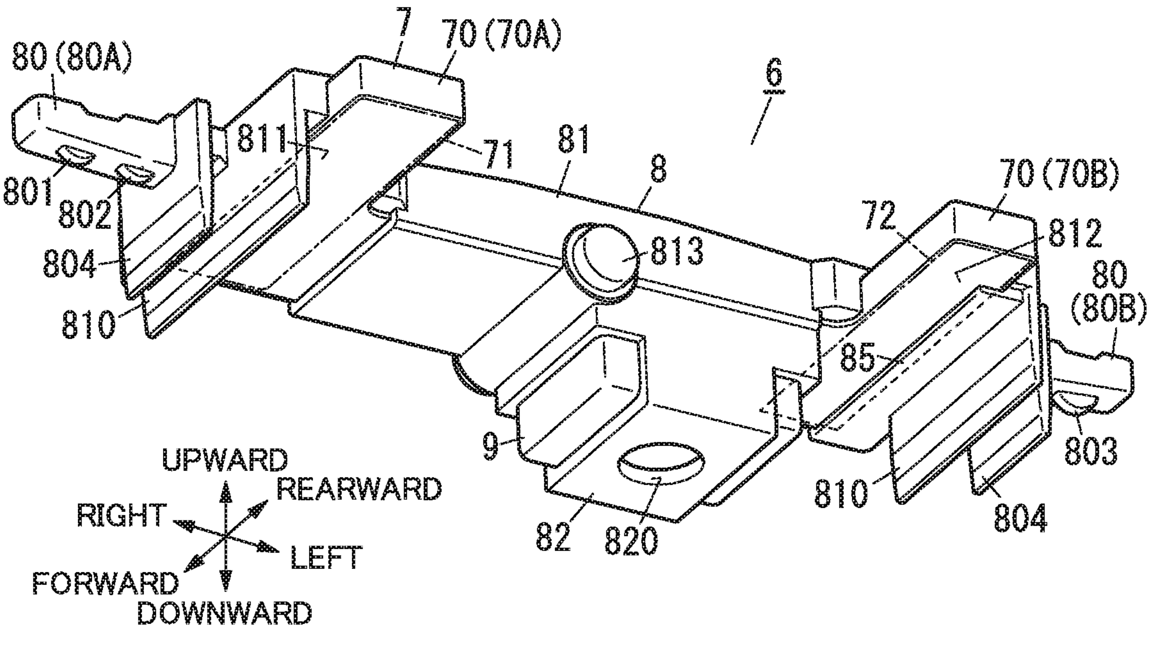
FIG. 4 is a perspective view of the above armature unit from below.
Figure 5:
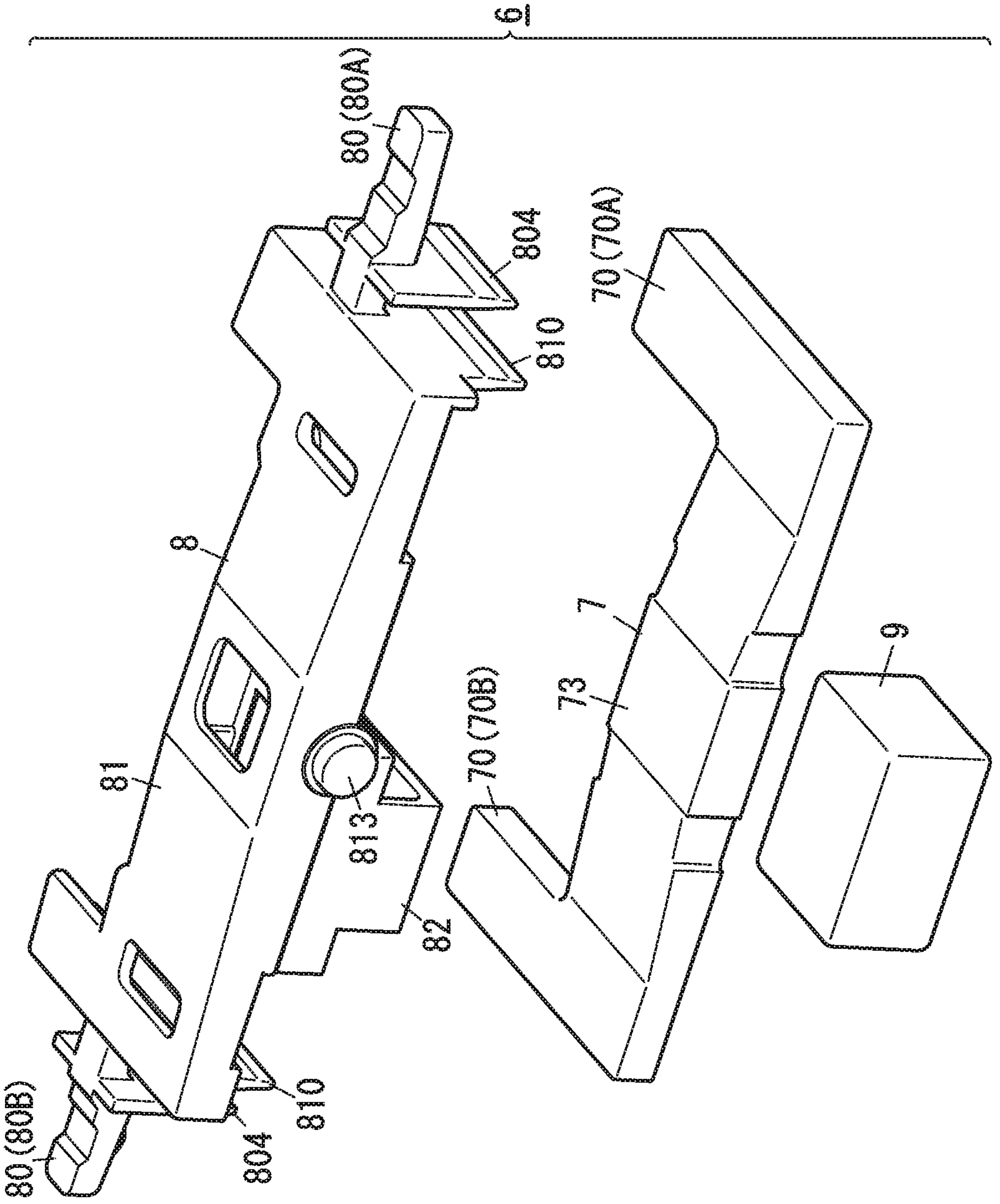
FIG. 5 is an exploded perspective view of the above armature unit.

On the other hand, as shown in FIG. 3 and FIG. 4, the second press part 80B includes at its lower surface a third protrusion 803 convex downward. The third protrusion 803 faces the lateral piece 251 of the movable spring 25 of the second contact unit 2B, as shown in FIG. 8A and FIG. 8B. In short, the second press part 80B comes into contact with the movable spring 25 with the third protrusion 803 in-between to give a pressing force, thereby moving the second movable contact 26B. Since the second contact unit 2B corresponds to the normally closed contact as described above, the second press part 80B gives the pressing force to the movable spring 25 by making contact therewith while the electromagnet 5 is in the excited state (see FIG. 8B).

Each press part 80 includes a second insertion piece 804 with a rectangular plate shape at a position spaced apart from the first holding block 81 by a predetermined distance. The second insertion piece 804 is placed to have a thickness direction extending in the left and right directions.

In the armature unit 6 configured as described above, each press part 80 applies a pressing force to a certain surface 250 of a corresponding movable spring 25, thereby moving the movable contact 26 to the open position. In addition, each press part 80 eliminates the pressing force to the certain surface 250 of the corresponding movable spring 25, thereby moving the movable contact 26 to the closed position. In particular, since the armature unit 6 is of the seesaw type, when one of the first press part 80A and the second press part 80B moves toward the certain surface 250 of the corresponding movable spring 25, the other moves away from the certain surface 250 of the corresponding movable spring 25.

In the present embodiment, the armature 7 and the permanent magnet 9 are integrally molded with the holder 8. Therefore, it is excellent in workability of assembling operation regarding the armature unit 6 with respect to the base 4B of the housing 4.

Figure 10A:
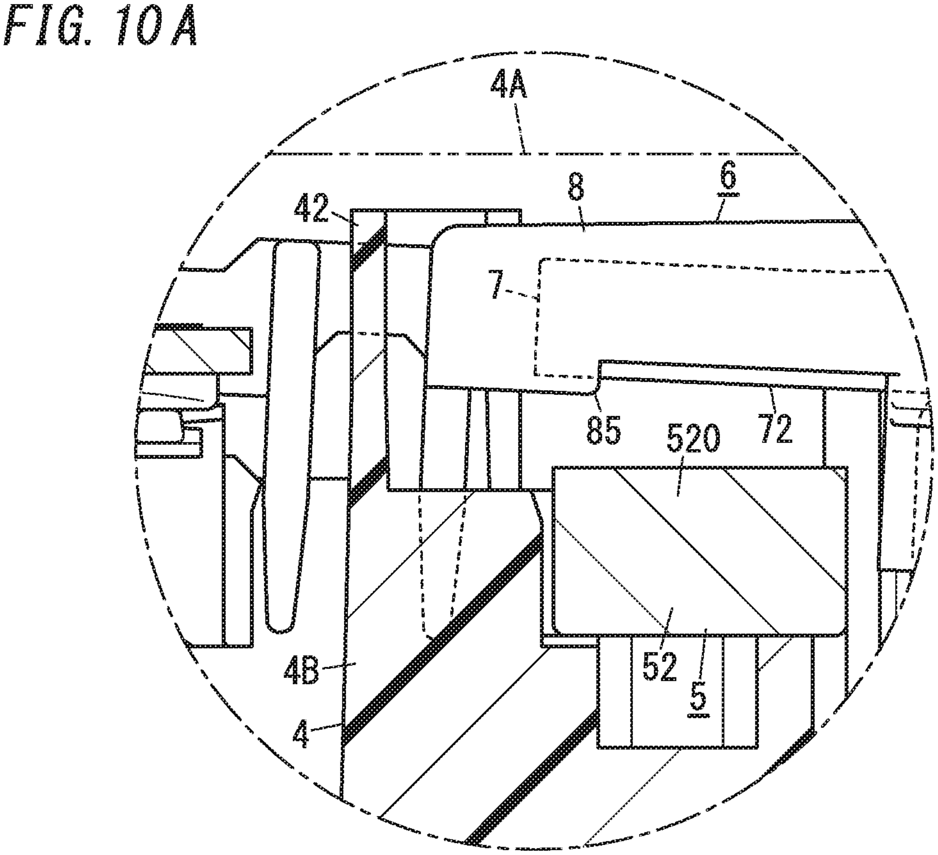
FIG. 10A and FIG. 10B are sectional views of primary part of the electromagnetic device of the above electromagnetic relay.
Figure 10B:
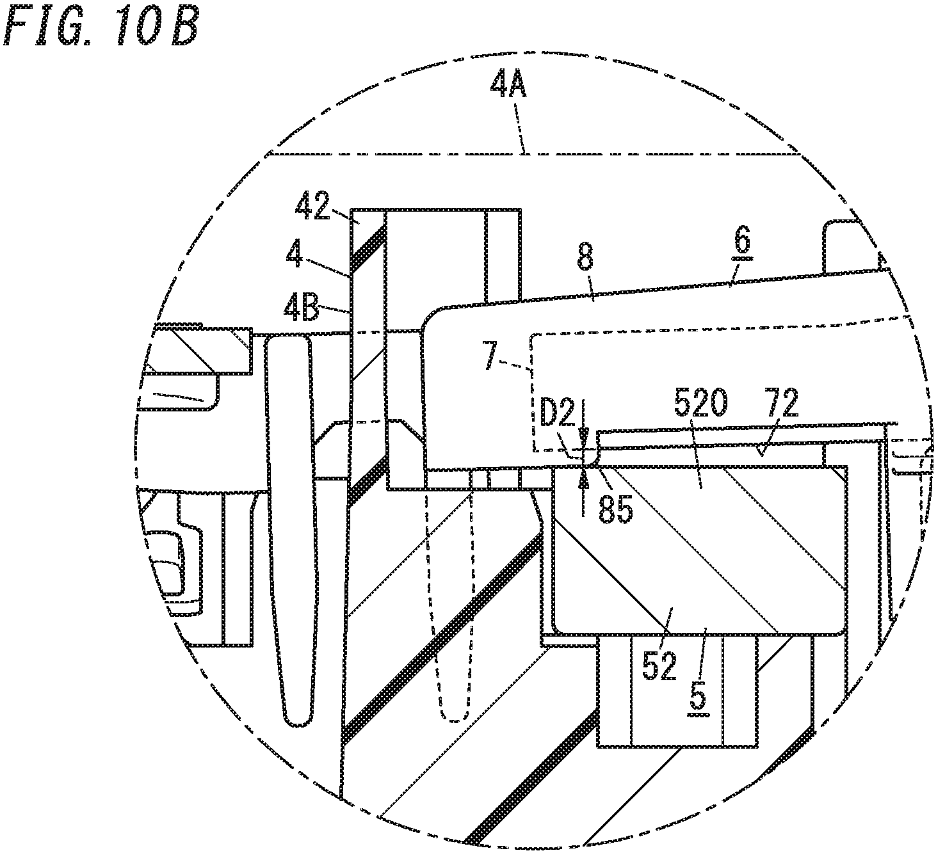

The separator 85 of the present embodiment is provided for not the first area 71 and the second area 72 of the armature 7 both but the second area 72 only. Therefore, a first interval D1 between the first area 71 and the yoke 52 when the first area 71 is in a closest position to the yoke 52 (see FIG. 9A) and a second interval D2 between the second area 72 and the yoke 52 when the second area 72 is in a closest position to the yoke 52 (see FIG. 10B) are different from each other. Note that "when the first area 71 is in a closest to the yoke 52" corresponds to, for example, "when the electromagnet 5 is in the non-excited state" as shown in FIG. 9A, and in the present embodiment, means a state where the outer end (right end) of the first area 71 is in contact with the yoke 52. Therefore, the first interval D1 is zero at the outer end of the first area 71. On the other hand, "when the second area 72 is in a closest position to the yoke 52" corresponds to "when the electromagnet 5 is in the excited state" as shown in FIG. 9B and FIG. 10B. In the present embodiment, this means a state where the separator 85 is in contact with the yoke 52 and the outer end (left end) of the second area 72 is not in contact with the yoke 52. Therefore, the second interval D2 is larger than zero at the outer end (left end) of the second area 72. In other words, the second interval D2 is larger than the first interval D1. In this manner, by making the first interval D1 and the second interval D2 different from each other, it becomes easy to control operation (swinging) of the armature 7.

(2.4) Housing

The housing 4 is made of an electrically insulating material such as a synthetic resin material. As shown in FIG. 1, the housing 4 is formed in a substantially rectangular box shape that is long in the left and right directions as a whole and is relatively small in height. The housing 4 is constituted by the cover 4A and the base 4B. In FIG. 1, the cover 4A is indicated only by a two-dot chain line in order to make it easy to understand an inner structure of the electromagnetic relay 1. The cover 4A has a rectangular box shape with an open bottom surface, and is attached to cover, from above, the base 4B to which the contact units 2 and the electromagnetic device 3 are attached. The housing 4 houses the contact units 2 and the electromagnetic device 3.

As shown in FIG. 1 and FIG. 2, the base 4B has a flat rectangular plate shape as a whole. The base 4B is configured to hold the contact units 2 and the electromagnetic device 3 on its certain surface 40 (upper surface) side.

Specifically, as shown in FIG. 2 and FIG. 11 to FIG. 13, the base 4B includes on its certain surface 40 side three accommodation parts 401 to 403 for accommodating the pair of contact units 2 and the electromagnetic device 3 individually. Hereinafter, an accommodation part in which the first contact unit 2A is accommodated is referred to as a first accommodation part 401, and an accommodation part in which the second contact unit 2B is accommodated is referred to as a second accommodation part 402. An accommodation part in which the electromagnetic device 3 is accommodated is referred to as a third accommodation part 403. Each of these accommodation parts is formed as a recessed space.

The first accommodation part 401 is positioned at a right end of the certain surface 40 of the base 4B. The second accommodation part 402 is positioned at a left end of the certain surface 40 of the base 4B. The third accommodation part 403 is positioned between the first accommodation part 401 and the second accommodation part 402 on the certain surface 40 of the base 4B. In the third accommodation part 403, the armature unit 6 of the electromagnetic device 3 and the electromagnet 5 of the electromagnetic device 3 are accommodated to be arranged so that the armature unit 6 is on a front side and the electromagnet 5 is on a rear side.

Therefore, the first contact unit 2A accommodated in the first accommodation part 401 and the electromagnet 5 accommodated in the third accommodation part 403 are arranged on a plane (here, on the certain surface 40) intersecting the above-mentioned arrangement direction (the upward and downward directions) on the certain surface 40 side of the base 4B. Similarly, the second contact unit 2B accommodated in the second accommodation part 402 and the electromagnet 5 accommodated in the third accommodation part 403 are arranged on a plane (here, on the certain surface 40) intersecting the above-mentioned arrangement direction (the upward and downward directions) on the certain surface 40 side of the base 4B. Therefore, the electromagnetic relay 1 can be downsized (in particular, decreased in height).

Further, the electromagnet 5 accommodated in the third accommodation part 403 is positioned between the first contact unit 2A and the second contact unit 2B. Therefore, the electromagnetic relay 1 is further downsized (in particular, decreased in height).

In particular, as shown in FIG. 2, the first contact unit 2A is placed close to either one (right one) of opposite ends of the coil 50 in the axial direction A2 of the coil 50. As shown in FIG. 2, the second contact unit 2B is placed close to the other (left one) of the opposite ends of the coil 50 in the axial direction A2 of the coil 50. This arrangement makes it possible to increase the stroke of the armature unit 6 due to the excitation/non-excitation of the electromagnet 5. As shown in FIG. 2, the axial direction A2 of the coil 50 is set substantially along a plane in which the certain surface 40 of the base 4B extends.

Between the first accommodation part 401 and the third accommodation part 403, a first partition 41 having a substantially rectangular plate shape protrudes upright from the certain surface 40 of the base 4B. Between the second accommodation part 402 and the third accommodation part 403, a second partition 42 having a substantially rectangular plate shape protrudes upright from the certain surface 40 of the base 4B. The first partition 41 and the second partition 42 are arranged so that their thickness directions extend along the left and right directions. As shown in FIG. 1, the first partition 41 and the second partition 42 include cutouts 410 and 420 into which the corresponding press parts 80 are inserted, respectively.

Figure 12:
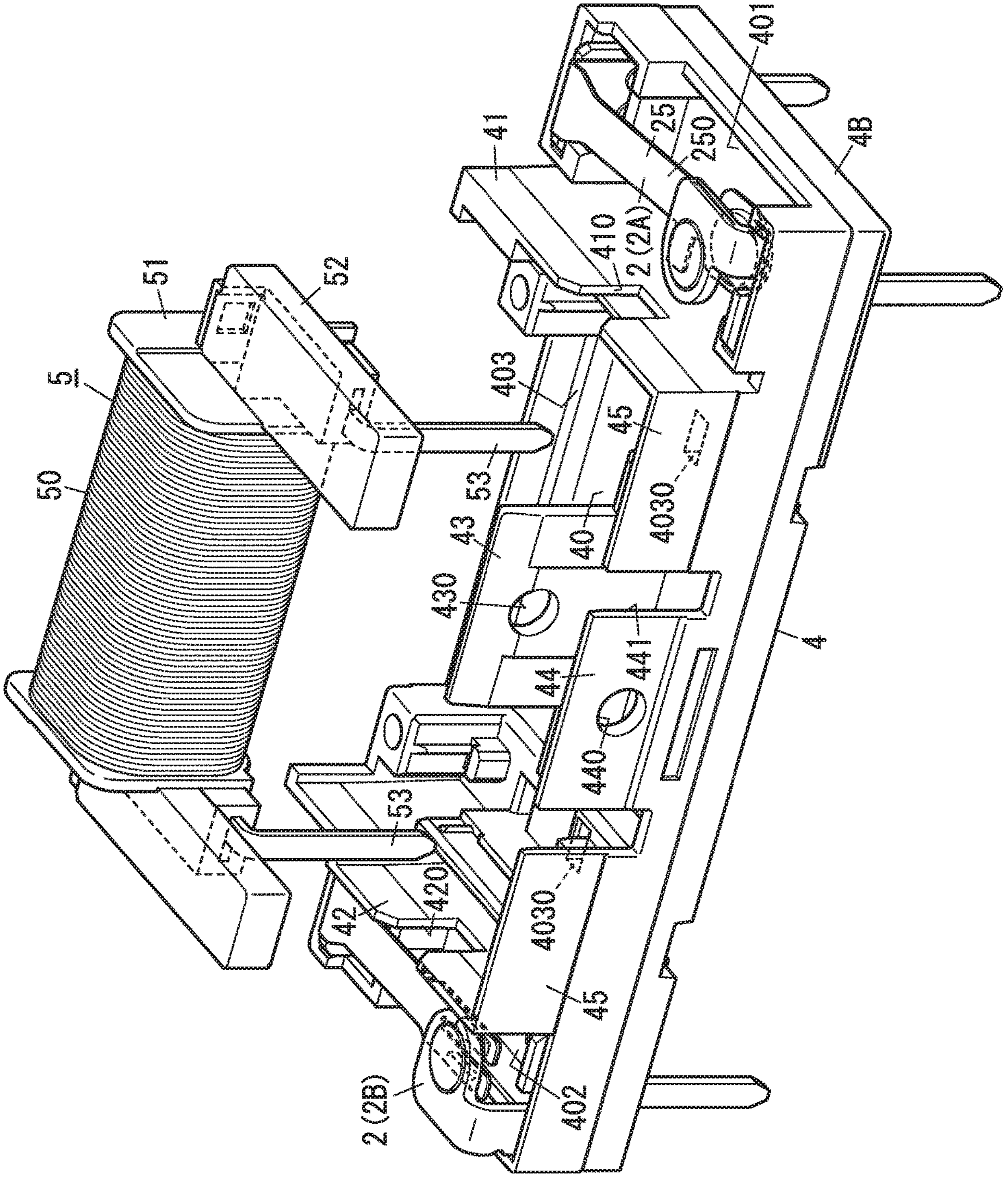
FIG. 12 is another explanatory view of assembly procedure of the above electromagnetic relay.
Figure 13:
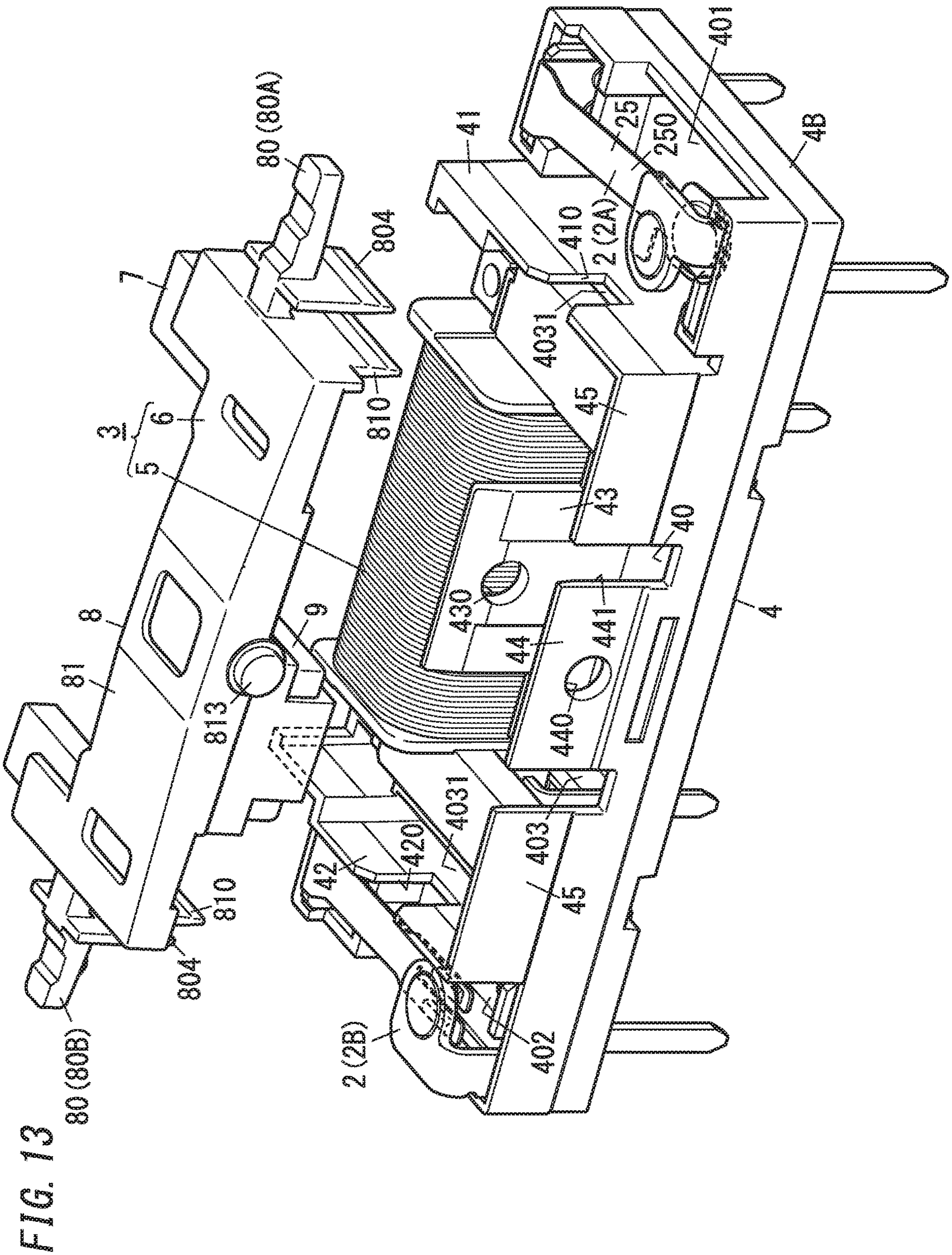
FIG. 13 is another explanatory view of assembly procedure of the above electromagnetic relay.

In the third accommodation part 403, a third partition 43 having a substantially rectangular plate shape for separating the electromagnet 5 and the armature unit 6 from each other protrudes upright from the certain surface 40 of the base 4B. The third partition 43 is placed so that its thickness direction extends along the forward and rearward directions. As shown in FIG. 11 to FIG. 13, the third partition 43 includes a bearing hole 430 penetrating in the thickness direction a center in the upward, downward, left and right directions. On the other hand, the base 4B includes, at a substantial center in the left and right directions of its front end, a front wall 44 facing the third partition 43 with the armature unit 6 in-between. The front wall 44 includes a bearing hole 440 penetrating in its thickness direction. The bearing hole 440 is configured to cooperate with the bearing hole 430 of the third partition 43 to receive the axle 813 of the holder 8. A front wall 45 is provided close to each of left and right sides of the front wall 44 with a cutout 441 in-between.

As shown in FIG. 11, each of the first accommodation part 401 and the second accommodation part 402 includes at its front end a first slot 46 into which the upright part 22 of the fixed terminal 20 is inserted. The first slot 46 is provided in an upper surface of a rib 4010 which is formed at the front end and has a predetermined thickness. In an inner bottom of the first slot 46, a lead-out opening 460 is formed. The lead-out opening 460 allows the terminal piece 24 of the fixed terminal 20 to be inserted thereinto and to be led out therefrom to the outside of the housing 4.

As shown in FIG. 11, each of the first accommodation part 401 and the second accommodation part 402 includes, at its rear end, a second slot 47 into which the support terminal 27 for supporting the movable spring 25 is inserted. The second slot 47 is provided in an upper surface of a rib 4011 which is formed at the rear end and has a predetermined thickness. In an inner bottom of the second slot 47, a lead-out opening 470 is formed. The lead-out opening 470 allows the terminal piece 270 of the support terminal 27 to be inserted thereinto and to be led out therefrom to the outside of the housing 4.

As shown in FIG. 11 and FIG. 12, the third accommodation part 403 includes lead-out openings 4030 at both left and right ends slightly in front of the third partition 43. The lead-out opening 4030 allow the second terminal pieces 532 of the pair of coil terminals 53 of the electromagnet 5 to be inserted thereinto and to be led out therefrom to the outside of the housing 4.

As shown in FIG. 9A and FIG. 9B, the coil terminal 53 of the present embodiment is provided on an opposite side of the yoke 52 from the armature 7. Further, the coil terminal 53 includes a second terminal piece 532 extending in a direction away from the armature 7 (the downward direction). Since the second terminal piece 532 is led out to the outside of the housing 4 through the lead-out opening 4030, the electromagnetic device 3 is downsized. In particular, each coil terminal 53 is provided to be positioned within a projection area of the extended part 520 of the yoke 52 when the electromagnet 5 is viewed in the upward and downward directions. Therefore, further downsizing of the electromagnetic device 3 can be achieved.

(3) Explanation of Operation of Embodiment 1

Hereinafter, the operation of the electromagnetic relay 1 according to the present embodiment will be described by referring to FIG. 9A, FIG. 9B, FIG. 10A and FIG. 10B. As described before, it is assumed that the permanent magnet 9 has an N pole as its upper pole and an S pole as its lower pole (see FIG. 9A and FIG. 9B).

First, a magnetic path during the non-excited state of the electromagnet 5 will be described. A magnetic flux generated from the N pole of the permanent magnet 9 passes through the armature 7 and falls from the right end of the armature 7 to the right extended part 520 of the yoke 52 (see a magnetic path indicated by a dotted arrow B1 in FIG. 9A). Then, the magnetic flux passes through the U-shaped yoke 52 and reaches the left extended part 520 of the yoke 52 (see a magnetic path indicated by a dotted arrow B2 in FIG. 9A). As a result, A lower part of the permanent magnet 9, which is the S pole, is attracted to the left extended part 520 (see a magnetic path indicated by a dotted arrow B3 in FIG. 9A). The entire armature unit 6 including the armature 7 is in an inclined state in which the right end is swung down about the rotation axis A1 (see FIG. 1) (hereinafter, referred to as a first inclined state).

In the first inclined state, as shown in FIG. 9A, the second area 72 of the armature 7 is located away from (the left extended part 520 of) the opposite yoke 52. On the other hand, the first area 71 of the armature 7 is in contact with (the right extended part 520 of) the opposite yoke 52. In the first inclined state, the right first press part 80A is in contact with the movable spring 25 of the first contact unit 2A and applies a pressing force thereto. Therefore, the first movable contact 26A is in the open position away from the fixed contact 21. On the other hand, the left second press part 80B is separated upward from the movable spring 25 of the second contact unit 2B and is in a non-contact state. Therefore, the second movable contact 26B is in the closed position in contact with the fixed contact 21.

When, for example, a switch (not shown) connected in series to the coil 50 is switched from an off state to an on state in a condition where the electromagnet 5 is in the non-excited state, a voltage is applied between the pair of coil terminals 53, and a coil current flows through the coil 50. Then, the electromagnet 5 is excited, and as shown in FIG. 9B, the polarity of the left extended part 520 of the yoke 52 is reversed from the N pole to the S pole. As a result, the left end of the armature 7 in contact with the upper part of the permanent magnet 9, which is the N-pole, is attracted to the left extended part 520 (see a magnetic path indicated by a dotted arrow B4 in FIG. 9B). That is, the armature 7 receives an attraction force from the yoke 52 due to excitation of the electromagnet 5, and moves (swings) in a direction in which the second area 72 moves toward the yoke 52. In other words, the entire armature unit 6 including the armature 7 is switched from the first inclined state to an inclined state in which the left end is swung down due to swing about the rotation axis A1 (see FIG. 1) (hereinafter, referred to as a second inclined state).

In the second inclined state, the second area 72 of the armature 7 is located closer to (the left extended part 520 of) the opposite yoke 52 than in the first inclined state, but is not in contact with the extended part 520. This is because the separator 85 of the holder 8 prevents contact between the second area 72 and the extended part 520 (see FIG. 9B). On the other hand, the first area 71 of the armature 7 is located away from (the right extended part 520) of the opposite yoke 52. In the second inclined state, contrary to the first inclined state, the right first press part 80A is separated upward from the movable spring 25 of the first contact unit 2A and thus is in a non-contact state. Therefore, the first movable contact 26A is in the closed position in contact with the fixed contact 21. On the other hand, the left second press part 80B is in contact with the movable spring 25 of the second contact unit 2B and applies a pressing force thereto. Therefore, the second movable contact 26B is in the open position away from the fixed contact 21.

When the switch connected in series to the coil 50 is switched from the on state to the off state in a condition where the electromagnet 5 is in the excited state, the coil current does not flow through the coil 50, and the electromagnet 5 becomes the non-excited state. In this regard, if the separator 85 is not provided and the second area 72 of the armature 7 is in contact with the extended part 520 of the yoke 52 in the second inclined state, the second area 72 is unlikely to be separated from the yoke 52 due to existence of residual magnetization in the yoke 52 even if the coil current does not flow. In this respect, in the present embodiment, since the separator 85 is provided as the magnetic gap, it is possible to suppress difficulty in separating the second area 72 from the yoke 52, and to reduce deterioration of the opening characteristic of the electromagnetic relay 1.

Patent Literature 1 will now be described. According to the electromagnetic relay described in Patent Literature 1, a residual plate made of a non-magnetic stainless steel thin plate as a magnetic gap is fixed to and integrated with a projecting end surface of a yoke attracting an armature. Therefore, it is prevented that the armature and the yoke are unlikely to be separated from each other due to residual magnetization and the open characteristic of the relay is deteriorated. However, in the electromagnetic relay described in Patent Literature 1, to provide the magnetic gap, it is necessary to fix and integrate the residual plate to and with the yoke. Therefore, there is a problem that the number of parts increases, and simplification of the configuration is desired. In contrast, according to the present embodiment, since the separator 85 is provided, it is possible to provide a magnetic gap while simplifying the configuration.

In particular, in the present embodiment, since the holder 8 having electrically insulating properties (for example, made of a synthetic resin) holds the armature 7 and includes the separator 85, it is possible to provide a magnetic gap while simplifying the configuration. In addition, since the holder 8 of the present embodiment holds not only the armature 7 but also the permanent magnet 9, the configuration is further simplified.

Each of the press parts 80 of the present embodiment is configured to cause movement of the movable contact 26 to the open position by applying the pressing force to the certain surface 250 of the corresponding movable spring 25. Therefore, for example, even if welding occurs between the movable contact 26 and the fixed contact 21, they can be separated from each other by the pressing force causing movement to the open position. Therefore, for example, as compared with a configuration in which the movable contact 26 is moved to the closed position by applying a pressing force to the certain surface 250 of the movable spring 25, reliability between the contacts can be enhanced.

Further, each press part 80 of the present embodiment is configured to cause movement of the movable contact 26 to the closed position by eliminating the pressing force to the certain surface 250 of the corresponding movable spring 25. Therefore, for example, even if the movable contact 26 and/or the fixed contact 21 are worn due to aging, the closed state between the contacts can be maintained. Therefore, the reliability between the contacts can be enhanced. That is, for example, even in a configuration in which the movable contact is moved to the closed position by applying a pressing force, the closed state between the contacts can be maintained even when they are worn as long as depth of wear is smaller than a predetermined amount (for example, corresponding to a distance of OT (Over Travel)). However, according to this configuration, a gap may be developed between the contacts when depth of wear exceeds the predetermined amount. However, in the present embodiment, since the movable contact 26 is moved to the closed position by eliminating the pressing force, the closed state between the contacts can be maintained by the elastic restoring force of the movable spring 25 even if depth of wear exceeds the predetermined amount.

(4) Assembly Procedure of Embodiment 1

Hereinafter, an example of the assembly procedure of the electromagnetic relay 1 of the present embodiment will be described with reference to FIG. 11 to FIG. 13.

First, as shown in FIG. 11, the pair of contact units 2 are attached to the base 4B of the housing 4. Here, prior to the pair of fixed terminals 20, the pair of support terminals 27 to which the movable springs 25 are fixed are attached to the base 4B by press-fit fixing, for example. Specifically, the support terminal 27 of the first contact unit 2A is inserted (press-fitted) into the second slot 47 of the first accommodation part 401 at the right end of the base 4B, and the terminal piece 270 is led out from the lead-out opening 470 in the second slot 47 to the outside of the housing 4. Specifically, the support terminal 27 of the second contact unit 2B is inserted (press-fitted) into the second slot 47 of the second accommodation part 402 at the left end of the base 4B, and the terminal piece 270 is led out from the lead-out opening 470 in the second slot 47 to the outside of the housing 4.

Next, the pair of fixed terminals 20 are attached to the base 4B by, for example, press-fit fixing. More specifically, the upright part 22 of the fixed terminal 20 of the first contact unit 2A is inserted (press-fitted) into the first slot 46 of the first accommodation part 401 of the base 4B, and the terminal piece 24 is led out to the outside of the housing 4 from the lead-out opening 460 of the first slot 46. In addition, the upright part 22 of the fixed terminal 20 of the second contact unit 2B is inserted (press-fitted) into the first slot 46 in the second accommodation part 402 of the base 4B, and the terminal piece 24 is led out to the outside of the housing 4 from the lead-out opening 460 of the first slot 46.

Subsequently, as shown in FIG. 12, the electromagnet 5 of the electromagnetic device 3 is attached to the base 4B by, for example, press-fit fixing. Specifically, the coil 50 is positioned facing an accommodation area in back of the third partition 3 in the third accommodation part 403 of the base 4B while the axial direction A2 (see FIG. 2) of the coil 50 of the electromagnet 5 extends along the left and right directions. Then, the coil 50 is accommodated (press-fitted) in the accommodation area of the third accommodation part 403 so that the second terminal pieces 532 (see FIG. 6) of the pair of coil terminals 53 pass through the pair of lead-out openings 4030 in the third accommodation part 403.

Then, as shown in FIG. 13, the armature unit 6 of the electromagnetic device 3 is attached to the base 4B. More specifically, the armature unit 6 is positioned facing an accommodation area in front of the third partition 43 in the third accommodation part 403 of the base 4B so that the length direction of the armature unit 6 extends along the left and right directions. However, orientation of the armature unit 6 is adjusted so that the second holding block 82 of the holder 8 in which the permanent magnet 9 is accommodated faces downward and further is positioned more left than the rotation axis A1. Then, the armature unit 6 is accommodated in the accommodation area of the third accommodation part 403 so that the first area 71 and the second area 72 of the armature 7 face the pair of extended parts 520 of the yoke 52 in the third accommodation part 403.

In this regard, a front end and a rear end of the axle 813 of the holder 8 move downward while displacing the front wall 44 and a top end of the third partition 43 to separate the front wall 44 and the top end of the third partition 43 from each other in the forward and rearward directions. In short, the front wall 44 and the top end of the third partition 43 are elastically deformed in the forward direction and the rearward direction, respectively. Thereafter, the front end and the rear end of the axle 813 reach the bearing holes 440 and 430 and are fitted thereinto. Thereby the front wall 44 and the third partition 43 are elastically restored. As a result, the armature unit 6 is attached to the base 4B to be allowed to swing.

In this regard, at the right end of the armature unit 6, the first press part 80A is accommodated in the cutout 410 of the first partition 41, and is positioned to allow a top end of the first press part 80A to face the certain surface 250 of the movable spring 25. The right first insertion piece 810 of the first holding block 81 is inserted into an insertion opening 4031 (see FIG. 13) provided at the right end of the third accommodation part 403. Further, the second insertion piece 804 of the first press part 80A is positioned more right than the cutout 410.

On the other hand, also at the left end of the armature unit 6, the second press part 80B is accommodated in the cutout 420 of the second partition 42, and is positioned to allow a top end of the second press part 80B to face the certain surface 250 of the movable spring 25. The left first insertion piece 810 of the first holding block 81 is inserted into an insertion opening 4031 (see FIG. 13) provided at the left end of the third accommodation part 403. Further, the second insertion piece 804 of the second press part 80B is positioned more left than the cutout 420.

Finally, the cover 4A is attached so as to cover, from above, the base 4B to which the contact units 2 and the electromagnetic device 3 are attached, and thus assembly of the electromagnetic relay 1 is completed.

In the electromagnetic relay 1 of the present embodiment, the movable contact 26 is placed between the base 4B and the fixed contact 21 in the arrangement direction in which the base 4B and the electromagnets 5 are arranged (the upward and downward directions in the illustrations). Therefore, as described above, for example, the movable spring 25 including the movable contact 26, the fixed terminal 20 including the fixed contact 21, the electromagnet 5, and the armature unit 6 can be attached to the base 4B in this order from above the base 4B. Therefore, it is excellent in workability of assembling operation. In particular, considering the automation of the assembly of the electromagnetic relay 1, the contact unit 2 and the armature unit 6 can be attached sequentially in the arrangement direction (the upward and downward directions in the illustrations) like the present embodiment. This can improve the productivity of the electromagnetic relay 1.

(5) Variations of Embodiment 1

Several variations are listed below. Hereinafter, the embodiment described above will be referred to as a "basic example".

In the basic example, the first press part 80A includes two protrusions which are the first protrusion 801 and the second protrusion 802, and is configured to make contact with the movable spring 25 with these protrusions. However, the first press part 80A is not limited to this configuration, but may include a single protrusion like the second press part 80B and be configured to make contact with the movable spring 25 with the protrusion.

In the basic example, as shown in FIG. 7B, a dimensional relation is defined so that the first press part 80A of the holder 8 is not in contact with the certain surface 250 of the movable spring 25 while the electromagnet 5 is in the excited state. However, the dimensional relation is not limited to this configuration, but may be defined so that the first press part 80A is in slight contact with the certain surface 250 of the movable spring 25 even while the electromagnet 5 is in the excited state. That is, the pressing force from the first press part 80A may be not eliminated but attenuated.

In the basic example, as shown in FIG. 8A, a dimensional relation is defined so that the second press part 80B of the holder 8 is not in contact with the certain surface 250 of the movable spring 25 while the electromagnet 5 is in the non-excited state. However, the dimensional relation is not limited to this configuration, but may be defined so that the second press part 80B is in slight contact with the certain surface 250 of the movable spring 25 even while the electromagnet 5 is in the non-excited state. That is, the pressing force from the second press part 80B may be not eliminated but attenuated.

In the basic example, the armature unit 6 is supported on the base 4B to be allowed to swing, by fitting the axle 813 of the holder 8 into the bearing holes 430 and 440 of the base 4B, but may no be limited to this configuration. The holder 8 may be provided with bearing holes, and the base 4B may be provided with an axle to be fitted into the bearing holes of the holder 8.

In the basic example, the separator 85 is configured so separate the entire second area 72 from the yoke 52 while the electromagnet 5 is in the excited state. However, the separator 85 is not limited to this, but may be configured to separate the left end of the second area 72 from the yoke 52 and allow the right end of the second area 72 to be in contact with the yoke 52, for example.

In the basic example, the separator 85 is formed as a protruded piece slightly protruding rightward from the left edge of the second opening 812. However, the separator 85 is not limited to this, but may be formed to cover the entire second area 72, for example.

In the basic example, the separator 85 is placed to correspond only to the second area 72. However, the separator 85 is not limited to this, but may be provided to correspond to the first area 71 additionally. That is, the number of separators 85 is not limited to one.

Embodiment 2

(1) Outline of Embodiment 2

The following embodiment is just one of various embodiments of the present disclosure. The following embodiment may be modified in various ways depending on the design and the like so long as the objects of the present disclosure can be achieved. In addition, FIG. 14 to FIG. 26C described in the following embodiment are schematic diagrams, and the ratio of the size and thickness of each component in FIG. 14 to FIG. 26C does not necessarily reflect the actual dimension ratio.

Hereinafter, upward, downward, left, right, forward, and rearward directions of the electromagnetic device 3X and the electromagnetic relay 1X of the present embodiment will be described by defining upward, downward, left, right, forward, and rearward arrows illustrated in FIG. 14, FIG. 16, FIG. 17, and FIG. 19. These arrows are provided merely for illustrative purposes and are not tangible. Further, these directions are not intended to limit the use directions of the electromagnetic device 3X and the electromagnetic relay 1X.

Figure 14:
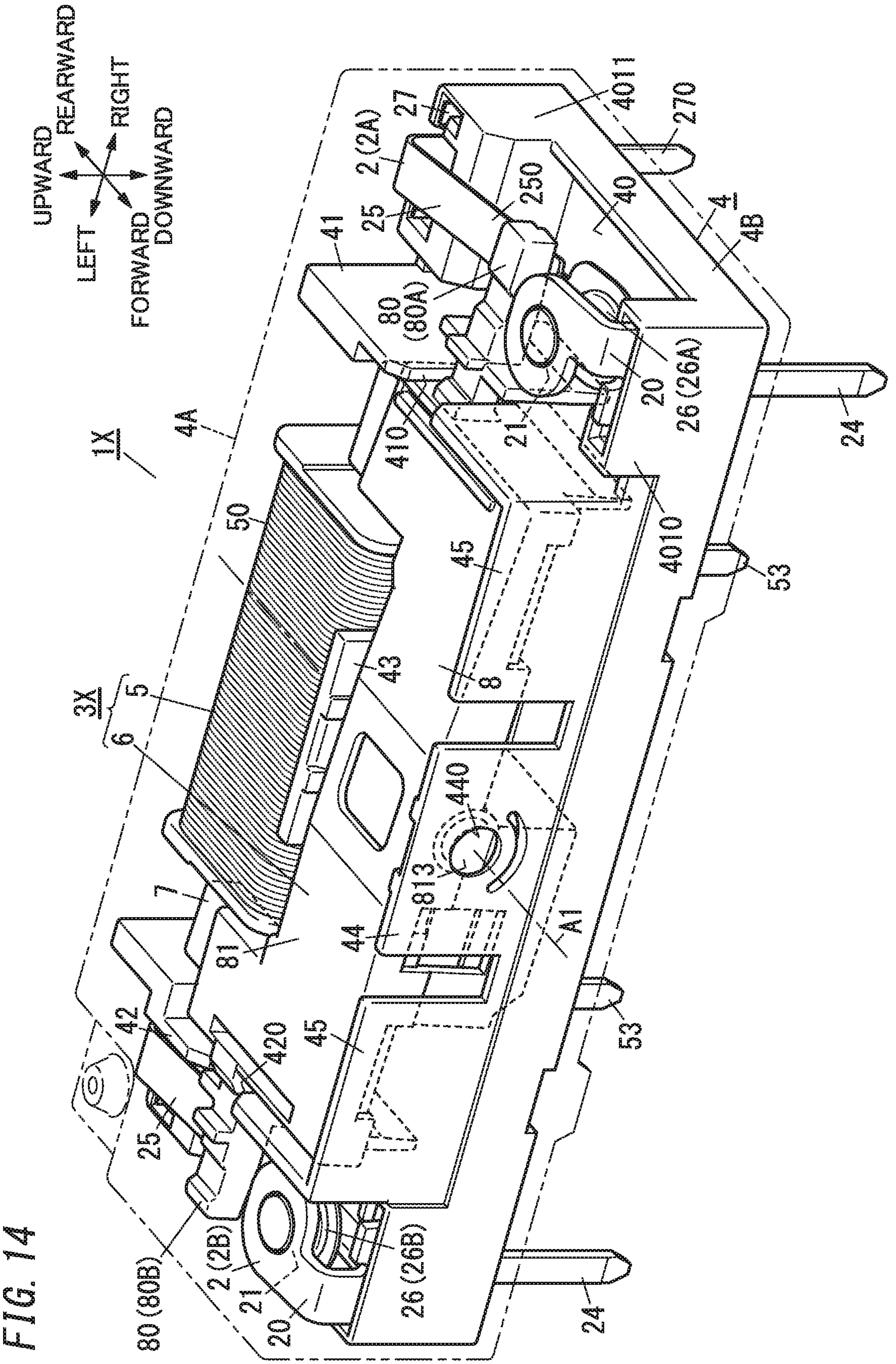
FIG. 14 is a perspective view of an electromagnetic relay including an electromagnetic device according to Embodiment 2.
Figure 16:
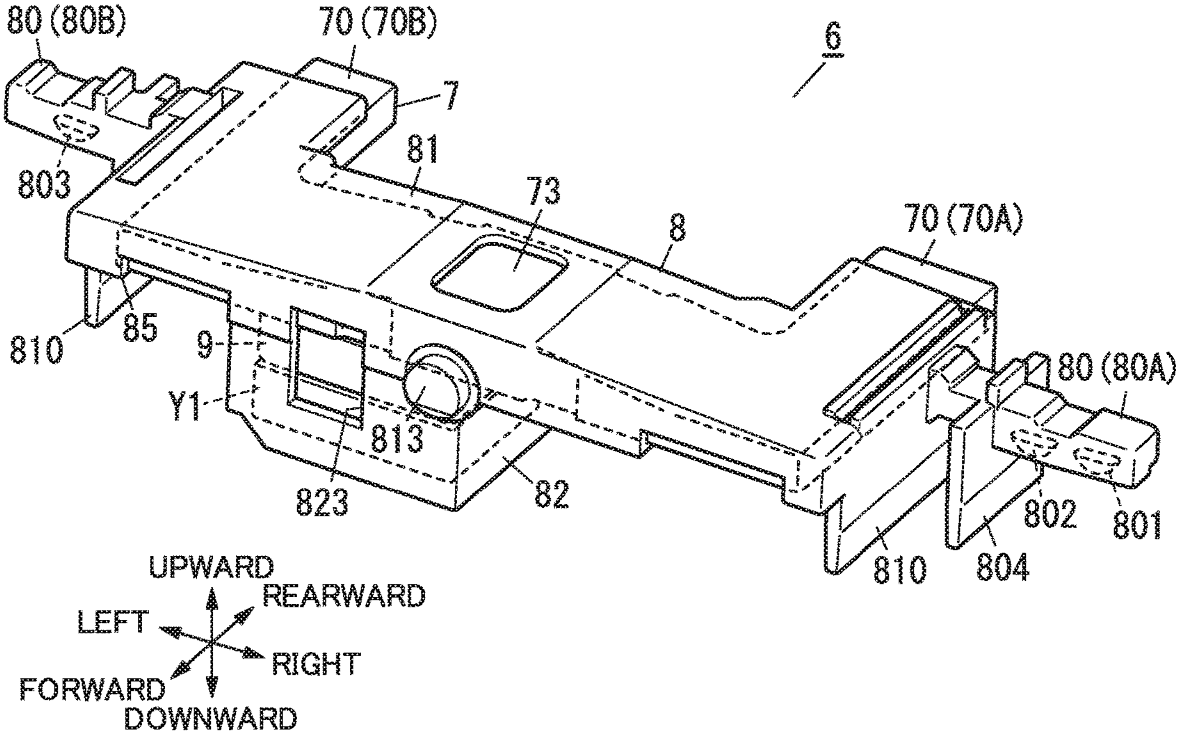
FIG. 16 is a perspective view of an armature unit of the above electromagnetic device viewed from above.
Figure 17:
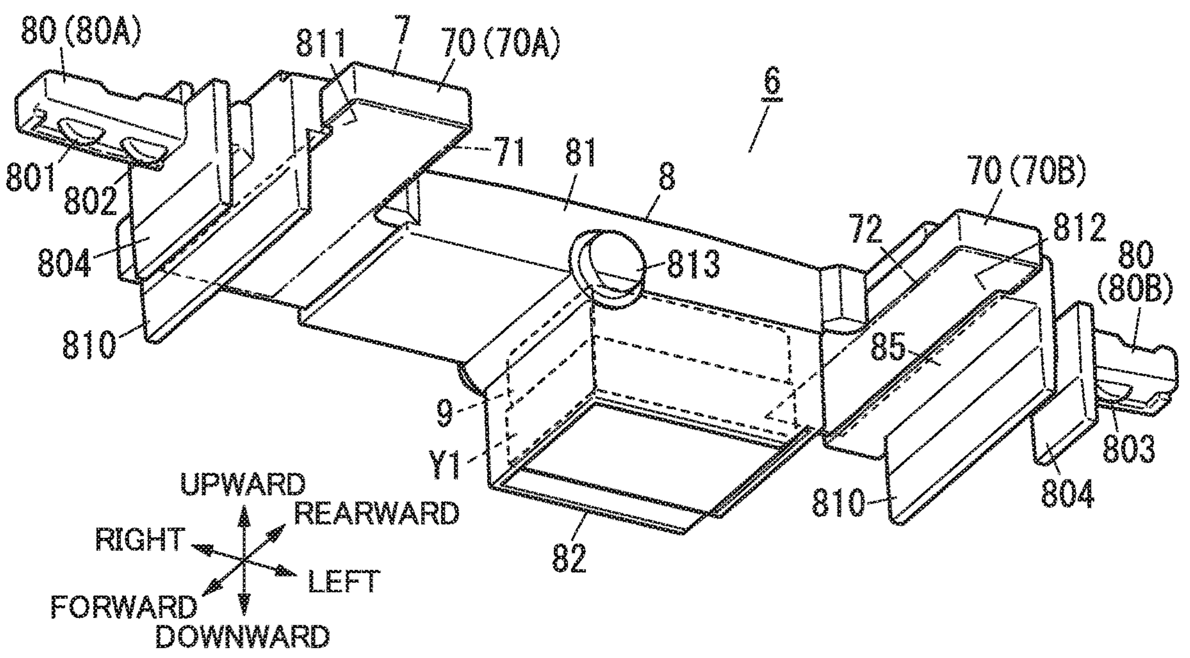
FIG. 17 is a perspective view of the above armature unit viewed from below.
Figure 18:
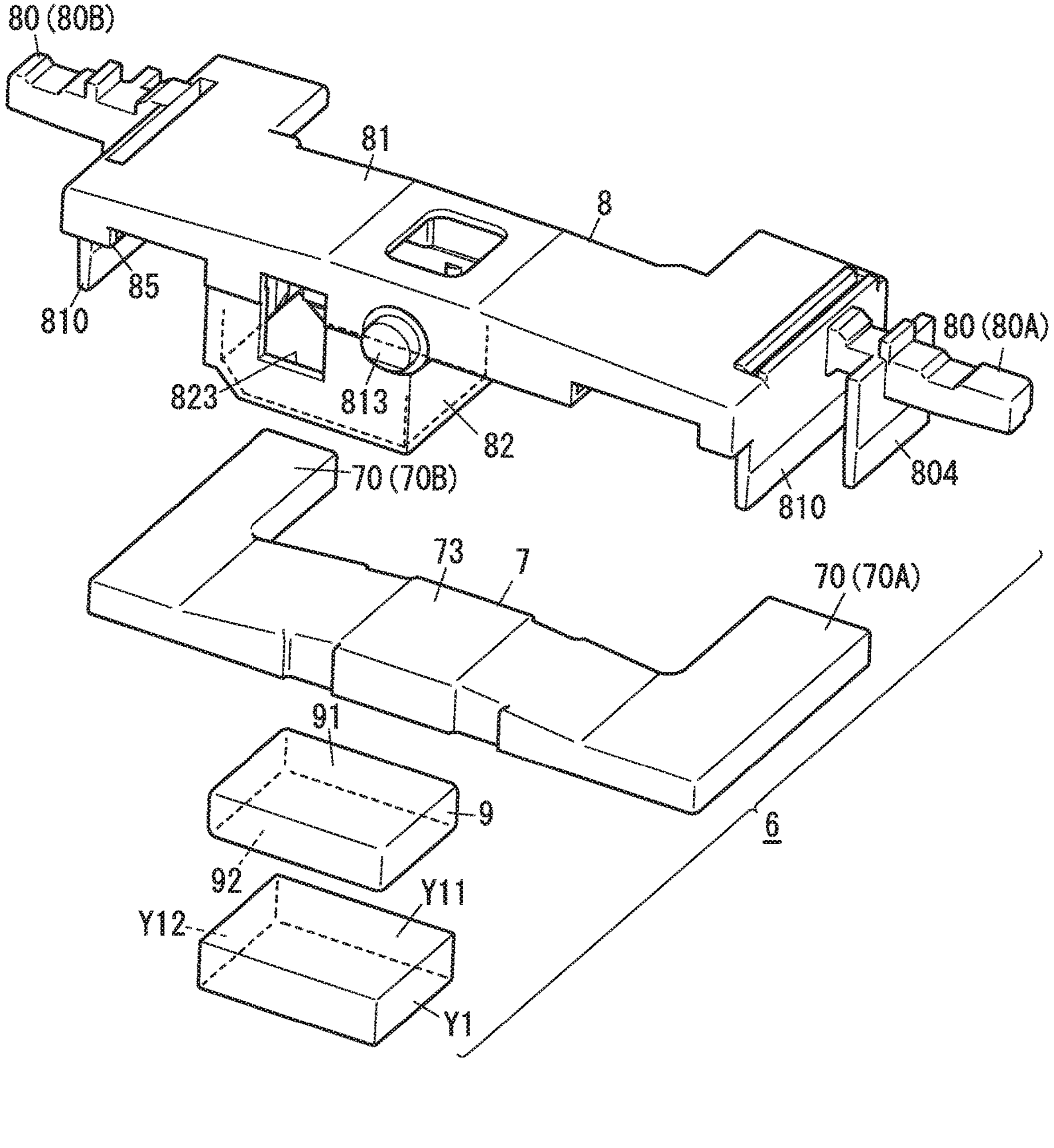
FIG. 18 is an exploded perspective view of the above armature unit.

As shown in FIG. 14, the electromagnetic device 3X of the present embodiment includes an electromagnet 5 and an armature unit 6. As shown in FIG. 16 to FIG. 18, the armature unit 6 includes an armature 7, a permanent magnet 9, an auxiliary yoke Y1, and a holder 8.

Figure 19:
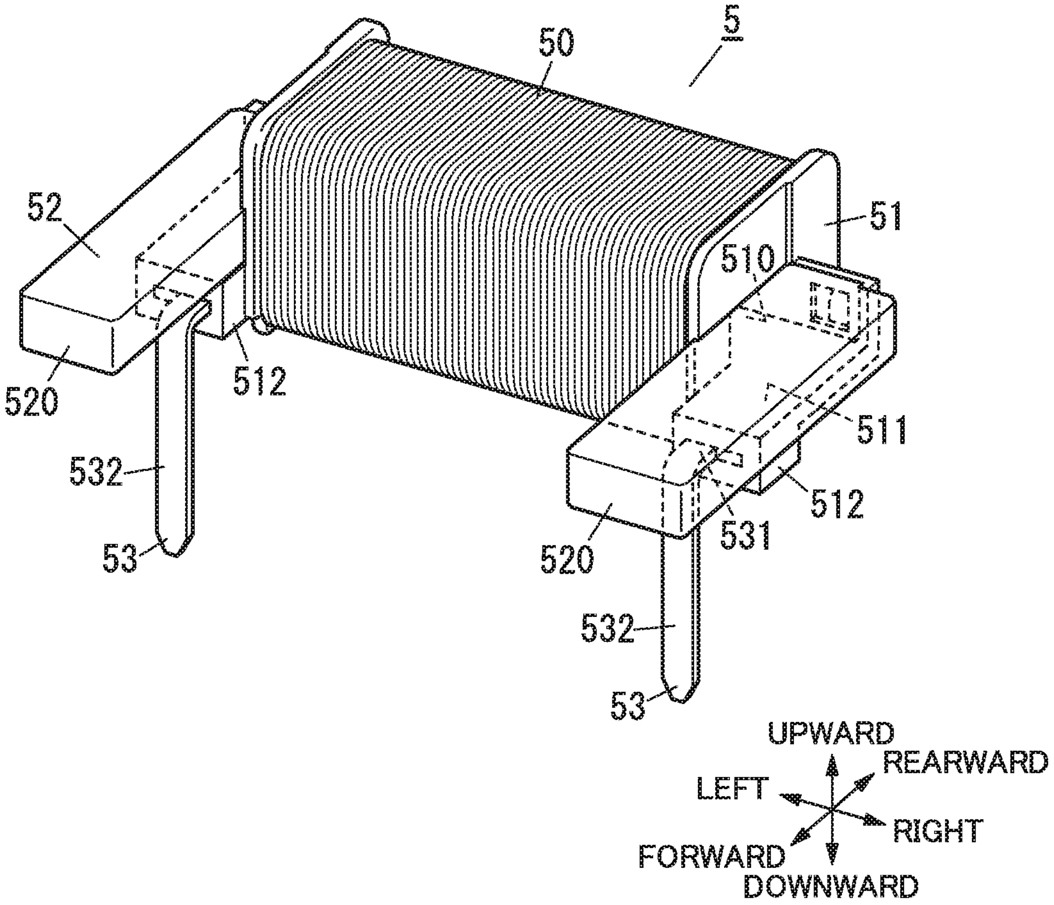
FIG. 19 is a perspective view of the electromagnet of the above electromagnetic device.
Figure 22A:
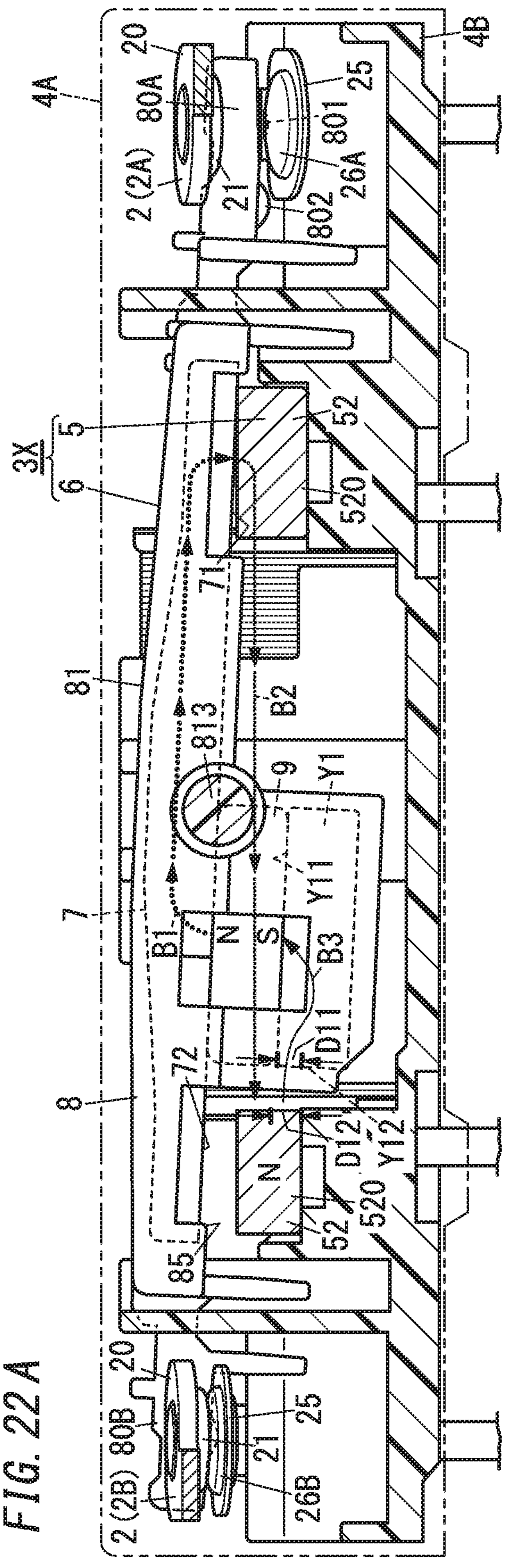
FIG. 22A and FIG. 22B are sectional views of A-A line in FIG. 15.
Figure 22B:
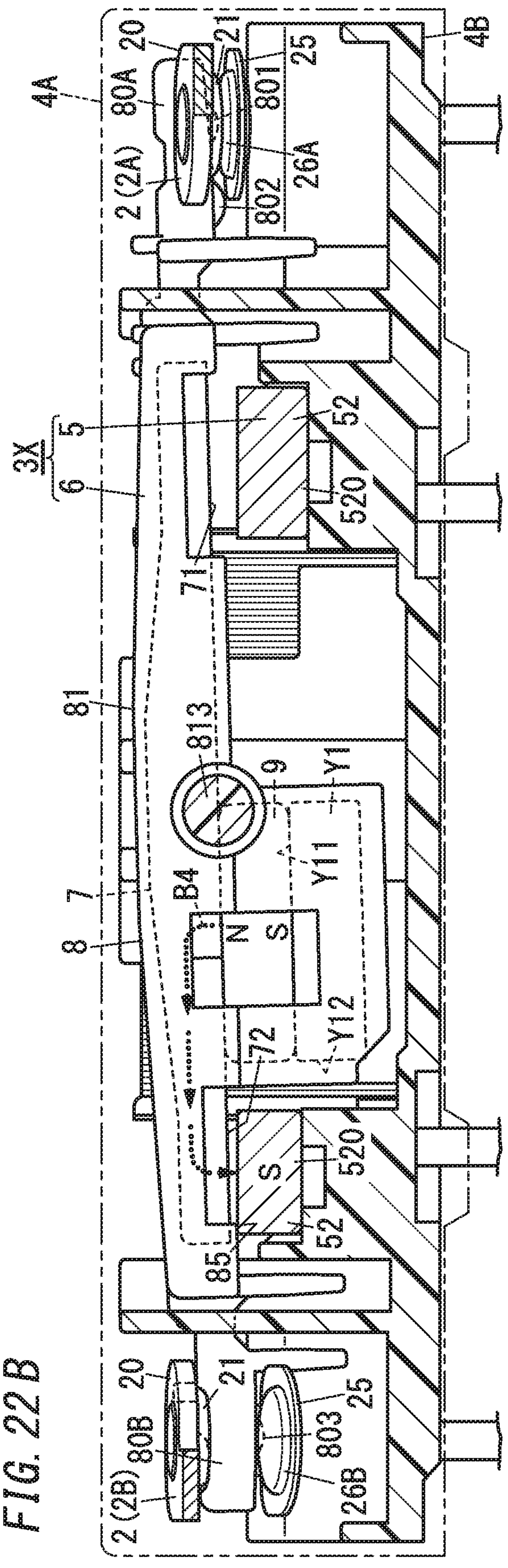

As shown in FIG. 19, the electromagnet 5 includes a coil 50 and a yoke 52. In the permanent magnet 9, a first magnetic pole (an N pole in the example of FIG. 22A) faces the armature 7. As shown in FIG. 22A and FIG. 22B, the auxiliary yoke Y1 includes a first surface Y11 (upper surface) and a second surface Y12 (left side surface). The first surface Y11 faces a second magnetic pole of the permanent magnet 9 (an S pole in the example of FIG. 22A) and intersects a magnetic pole direction of the permanent magnet 9. Here, the magnetic pole direction is a direction in which a magnetic pole surface of the N pole and a magnetic pole surface of the S pole in the permanent magnet 9 are arranged, and is a direction substantially along the upward and downward directions. The second surface Y12 faces the yoke 52.

As shown in FIG. 22A and FIG. 22B, when the electromagnet 5 is excited, the armature 7 moves toward or away from the yoke 52. The second surface Y12 of the auxiliary yoke Y1 faces the yoke 52 in a range of at least part of a movable range of the armature 7 moving in response to the excitation of the electromagnet 5. Here, as an example, when the electromagnet 5 is in the non-excited state and the left end of the armature 7 is raised to an upper position as shown in FIG. 22A, a region D11 of part of the second surface Y12 faces a region D12 of part of a right surface of a protruded part (extended part) 520 of the yoke 52.

The electromagnetic relay 1X of the present embodiment includes, for example, the electromagnetic device 3X and two contact units 2. Each contact unit 2 includes a fixed contact 21 and a movable contact 26 movable in accordance with movement of the armature 7 between a closed position in contact with the fixed contact 21 and an open position away from the fixed contact 21.

JP 2005-63940 A discloses an electromagnetic relay. This electromagnetic relay includes a base, a multiple contact mechanism, a card as a movable object for switching contacts, an electromagnet block, a card driving movable block rotatably supported by the base and placed facing the electromagnet block, a cover case, and the like. The movable block includes a block body molded of resin, an iron piece (armature) fitted and fixed to a front surface of the block body, a permanent magnet attracted and fixed to a center of a front surface of the iron piece, a fulcrum axle made of metal, and the like. In response to excitation or non-excitation of the electromagnet block, the iron piece is attracted to and separated from a yoke of the electromagnet block, whereby contact switching is performed. However, in a magnetic circuit formed by the armature, the permanent magnet, and the yoke, magnetic efficiency is likely to decrease with increase in magnetic flux leakage. Therefore, reduction of leakage of the magnetic flux is desired According to the configuration of the present embodiment, the second surface Y12 of the auxiliary yoke Y1 faces the yoke 52 in the range of at least part of the movable range of the armature 7 moving in response to the excitation of the electromagnet 5. Therefore, a magnetic circuit is constituted by the yoke 52, the second surface Y12 (left side surface) of the auxiliary yoke Y1, the first surface Y11 (the upper surface) of the auxiliary yoke Y1, the magnetic pole surface of the second magnetic pole of the permanent magnet 9, and the magnetic pole surface of the first magnetic pole of the permanent magnet 9. Therefore, for example, as compared with a case where the auxiliary yoke Y1 is not provided (see FIG. 23A), conversion can be made so that a flow of a magnetic flux in a transverse direction becomes dominant with respect to a flow of a magnetic flux in a magnetic pole direction (longitudinal direction) passing through the both magnetic pole surfaces of the permanent magnet 9 (see FIG. 23B). As a result, it is possible to reduce the leakage of the magnetic flux at the second magnetic pole surface of the permanent magnet 9 (the magnetic pole surface of the S pole at lower part of the permanent magnet 9 in FIG. 22A).

It is assumed that the electromagnetic relay 1X of the present embodiment is configured as a so-called safety relay having a normally open contact, which closes a contact when the electromagnet 5 is excited, and a normally closed contact, which closes a contact when the electromagnet 5 is not excited, and capable of detecting the occurrence of abnormalities such as contact welding. Therefore, the number of contact units 2 is two. The two contact units 2 are a first contact unit 2A corresponding to the normally open contact and a second contact unit 2B corresponding to the normally closed contact. However, the electromagnetic relay 1X is not limited to a safety relay, and the number of contact units 2 may be one or three or more.

(2) Details of Embodiment 2

(2.1) Overall Configuration

Hereinafter, the electromagnetic relay 1X of the present embodiment will be described in detail with reference to FIG. 14 to FIG. 24B. As shown in FIG. 14, the electromagnetic relay 1X includes the two contact units 2 (the first contact unit 2A and the second contact unit 2B), the electromagnetic device 3X, and a housing 4 including a cover 4A and the base 4B. As described in the chapter of "(1) Outline of Embodiment 2" above, the electromagnetic relay 1X is applicable, for example, as a safety relay. More specifically, it is preferable that the electromagnetic relay 1X is configured so that, when the contacts of the first contact unit 2A, which is the normally open contact, are welded, the contacts of the second contact units 2B, which is the normally closed contact, are separated by 0.5 mm or more from each other even when the electromagnet 5 is in a non-excited state. Further, it is preferable that the electromagnetic relay 1X is configured so that, when the contacts of the second contact units 2B, which is normally closed contact, are welded, the contacts of the first contact unit 2A, which is the normally open contact, are separated by 0.5 mm or more from each other even when the electromagnet 5 is excited. That is, when weld of the first contact unit 2A occurs, the weld can be detected by the second contact unit 2B. When weld of the second contact unit 2B occurs, the weld can be detected by the first contact unit 2A. As shown in FIG. 14, the electromagnetic relay 1X is formed in a substantially rectangular parallelepiped flat shape as a whole.

(2.2) Contact Unit

(2.2.1) Configuration of Contact Unit

As shown in FIG. 14, the two contact units 2 include the first contact unit 2A and the second contact unit 2B. The first contact unit 2A corresponds to a normally open contact, and is disposed at a right end of the certain surface 40 (upper surface) of the base 4B of the housing 4. The second contact unit 2B corresponds to a normally closed contact, and is disposed at a left end of the certain surface 40 (upper surface) of the base 4B of the housing 4.

(2.2.2) First Contact Unit

Figure 20A:
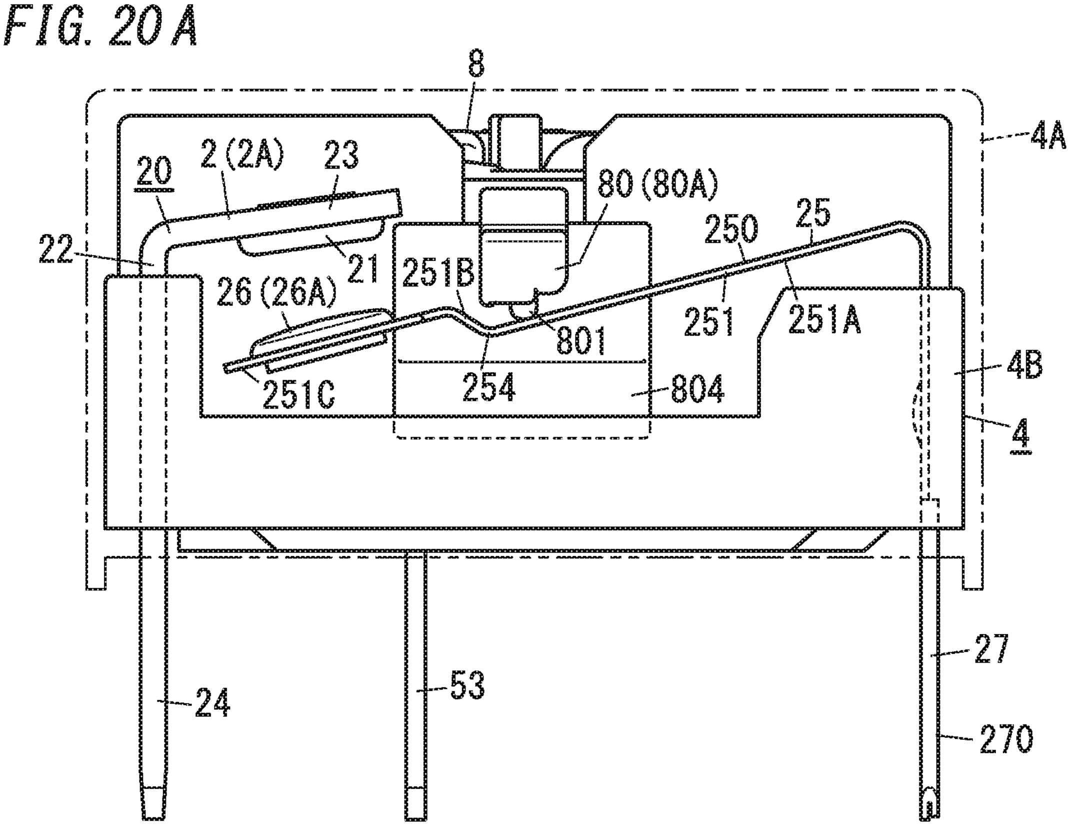
FIG. 20A and FIG. 20B are right side views of the above electromagnetic relay.
Figure 20B:
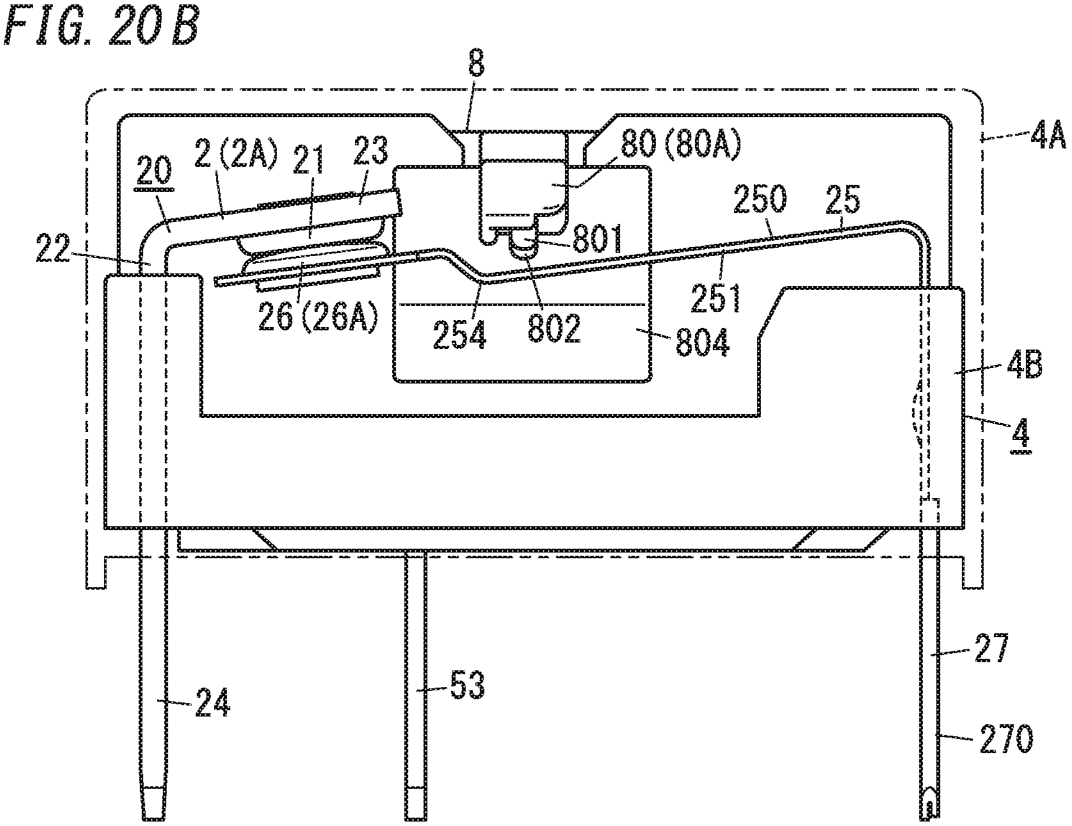

First, the first contact unit 2A will be described mainly referring to FIG. 20A and FIG. 20B. FIG. 20A is a right side view of the electromagnetic relay 1X in a state where the electromagnet 5 is in the non-excited state, and FIG. 20B is a right side view of the electromagnetic relay 1X in a state where the electromagnet 5 is in the excited state.

As shown in FIG. 20A, the first contact unit 2A includes a fixed terminal 20 including a fixed contact 21, a movable spring 25 including a movable contact 26 (hereinafter sometimes referred to as a first movable contact 26A), and a support terminal 27 supporting the movable spring 25. The fixed terminal 20 is formed in a substantially L-shaped plate shape as a whole when viewed in the left and right directions. The movable spring 25 and the support terminal 27 constitute a movable terminal which is formed in a substantially L-shaped plate shape as a whole when viewed in the left and right directions.

Specifically, the fixed terminal 20 of the first contact unit 2A is formed of electrically conductive material. The fixed terminal 20 includes a fixed contact 21, an upright part 22, an upper wall part 23, and a terminal piece 24. The upright part 22, the upper wall part 23, and the terminal piece 24 are formed by bending a single plate member (such as a copper alloy plate). That is, the upright part 22, the upper wall part 23, and the terminal piece 24 are formed as an integral part.

The upright part 22 is formed in a substantially rectangular plate shape, and is placed so that a thickness direction thereof extends in the forward and rearward directions. The upper wall part 23 is formed in a substantially rectangular plate shape, and protrudes rearward from a right end of an upper part of the upright part 22. However, the upper wall part 23 is slightly inclined with respect to the horizontal direction. Specifically, in the open position where the first movable contact 26A and the fixed contact 21 are separated from each other, the upper wall part 23 is slightly inclined in a direction away from the movable contact 26 as moving forward. As shown in FIG. 20A and FIG. 20B, attached to a lower surface of the upper wall part 23 is the fixed contact 21 by an appropriate attachment method (e.g., swaging, welding, or the like). The fixed contact 21 is formed of, for example, a silver alloy or the like. The terminal piece 24 is formed in a strip shape elongated in the upward and downward directions, extends downward from a lower part of the upright part 22, and is led out from the housing 4 to the outside.

In the present embodiment, as an example, the fixed contact 21 is separate from the upper wall part 23 and is fixed by swaging or the like, but may be formed integrally with the upper wall part 23.

The movable spring 25 of the first contact unit 2A is a leaf spring made of an electrically conductive thin plate, and is formed to have a substantially L-shape when viewed in the left and right directions.

Figure 24A:
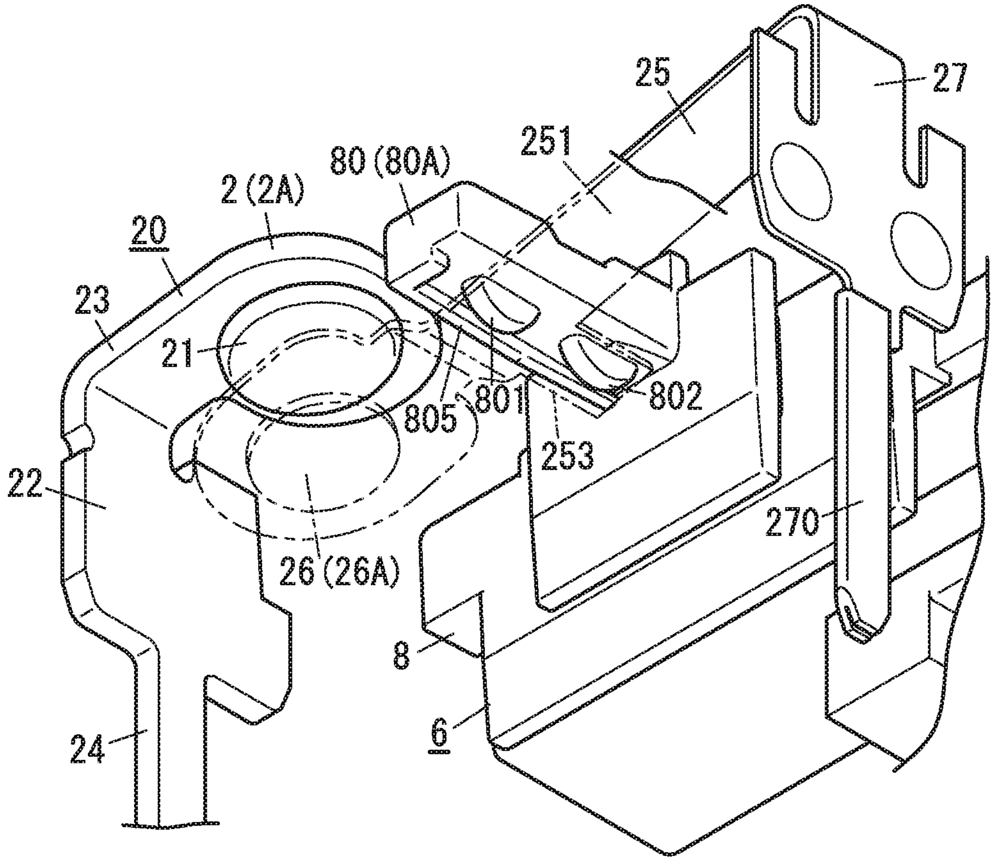
FIG. 24A and FIG. 24B are perspective views of primary part of the above electromagnetic relay.

As shown in FIG. 20A, the movable spring 25 includes the first movable contact 26A, a lateral piece 251, and a protruded piece 253 (see FIG. 24A). The lateral piece 251, the protruded piece 253, and the support terminal 27 are formed, for example, by performing a bending process on a single plate member. That is, the movable spring 25 and the support terminal 27 are integrally formed.

The lateral piece 251 is formed in a substantially rectangular plate shape elongated in the forward and rearward directions, and is placed so that a thickness direction thereof is slightly inclined with respect to the upward and downward directions. Here, the lateral piece 251 is also slightly inclined with respect to the support terminal 27 in its design shape. In the open position in which the first movable contact 26A and the fixed contact 21 are separated from each other, the lateral piece 251 is slightly inclined in a direction away from the fixed contact 21 as moving forward.

Further, the lateral piece 251 includes a step part 254 in a vicinity of the first movable contact 26A. That is, the lateral piece 251 includes a first part 251A that extends straight forward while tilting downward from the upper end of the support terminal 27, a second part 251B that extends forward while tilting upward once, and a third part 251C that extends forward while tilting downward again. The first part 251A and the third part 251C are inclined substantially in parallel. Further, the third part 251C is inclined in parallel with the upper wall part 23 to which the fixed contact 21 is attached in the closed position in which the first movable contact 26A and the fixed contact 21 are in contact. That is, the step part 254 is formed by a difference in height between the first part 251A and the third part 251C due to the second part 251B. The step part 254 shields the first movable contact 26A from an abrasion powder which may be produced when the first press part 80A of the holder 8 made of synthetic resin makes contact with the movable spring 25 many times, thereby suppressing spread of the abrasion powder.

As shown in FIG. 20A and FIG. 20B, the first movable contact 26A is attached to a distal end of an upper surface (part of the certain surface 250) of the lateral piece 251, that is, an upper surface of the third part 251C, by an appropriate attachment method (for example, swaging method, welding method, or the like). The first movable contact 26A is formed of, for example, a silver alloy or the like, and is disposed so as to face the fixed contact 21 in the upward and downward directions. However, a positional relationship between the first movable contact 26A and the fixed contact 21 is that the first movable contact 26A is on the lower side and the fixed contact 21 is on the upper side. In the closed position in which the first movable contact 26A and the fixed contact 21 are in contact with each other, the third part 251C to which the first movable contact 26A is attached is inclined in parallel with the upper wall part 23 to which the fixed contact 21 is attached. Therefore, it is possible to prevent occurrence of an accident in which an end (corner) of one contact comes into contact with the other contact. In short, the contact area is increased and thereby the contact reliability can be improved.

The protruded piece 253 protrudes leftward from a left edge near the distal end of the lateral piece 251 (a distal end of the first part 251A). The protruded piece 253 is formed in a rectangular plate shape, and a thickness direction thereof extends in the upward and downward directions. The protruded piece 253 serves as part with which a second protrusion 802 of a first press part 80A of the holder 8, which will be described later, comes into contact from above.

In the present embodiment, in one example, the first movable contact 26A is separate from the lateral piece 251 and is fixed by swaging or the like, but may be formed integrally with the lateral piece 251.

The support terminal 27 of the first contact unit 2A is configured to support the movable spring 25. The support terminal 27 includes a terminal piece 270 to be led out from the housing 4. The terminal piece 270 is formed in a strip shape elongated in the upward and downward directions.

As shown in FIG. 20A, a thickness of the fixed terminal 20 is larger than thicknesses of the movable spring 25 and the support terminal 27 (e.g., almost two times). However, a thickness of the terminal piece 270 of the support terminal 27 is substantially twice the thickness of the movable spring 25 by bending part of a plate member constituting the support terminal 27, and is substantially equal to a thickness of a plate member constituting the fixed terminal 20. Here, as shown in FIG. 24A, the terminal piece 270 is bent to have a substantially U-shape with a left side opened when viewed from below.

In the first contact unit 2A configured as described above, when the electromagnet 5 is in the non-excited state, the certain surface 250 (upper surface) of the movable spring 25 continues to be pressed by the first press part 80A of the holder 8, as shown in FIG. 20A. Therefore, a distal end part of the movable spring 25 is bent downward by elastic deformation, and the first movable contact 26A is in the open position away from the fixed contact 21.

In the first contact unit 2A, when the electromagnet 5 is in the excited state, the pressing force from the first press part 80A of the holder 8 is eliminated as shown in FIG. 20B. Therefore, the distal end part of the movable spring 25 elastically returns upward, and the first movable contact 26A is in the closed position in contact with the fixed contact 21. In the present embodiment, as shown in FIG. 20B, a dimensional relation is defined so that the first press part 80A of the holder 8 does not touch the certain surface 250 of the movable spring 25 while the electromagnet 5 is in the excited state. That is, when the electromagnet 5 is in the excited state, a slight gap is formed between the first press part 80A and the certain surface 250 of the movable spring 25, and the pressing force from the first press part 80A is eliminated.

(2.2.3) Second Contact Unit

Figure 21A:
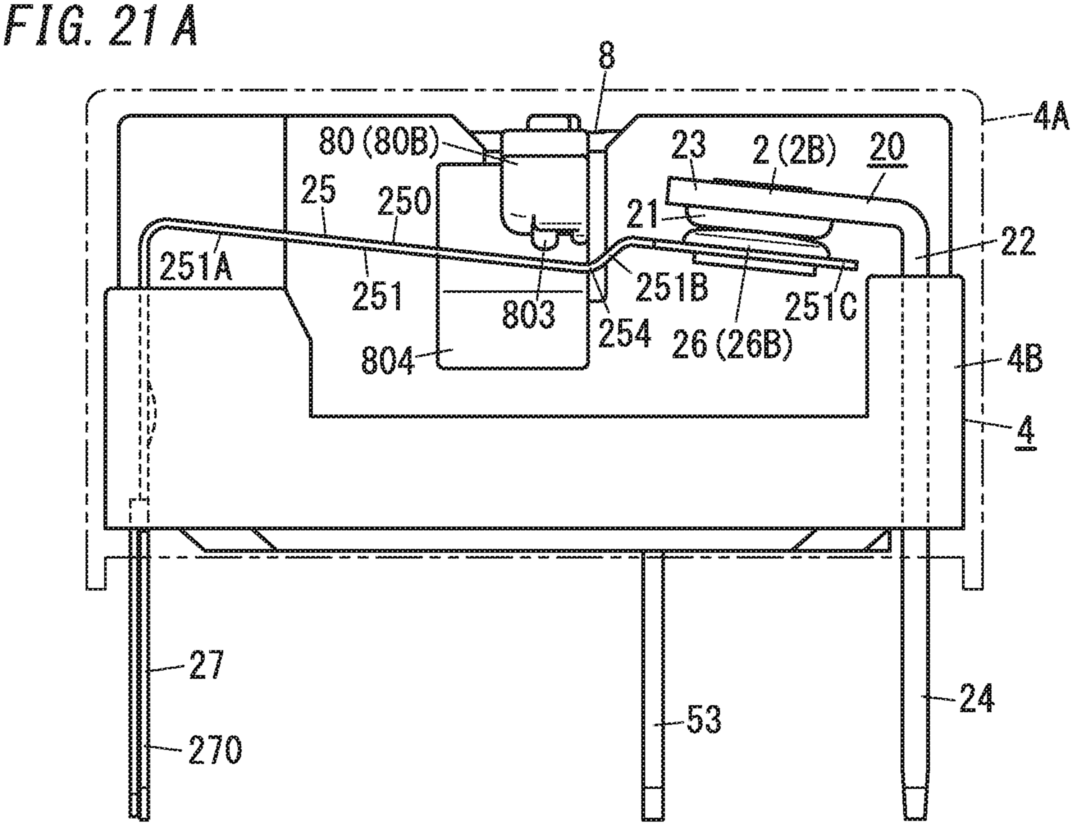
FIG. 21A and FIG. 21B are left side views of the above electromagnetic relay.
Figure 21B:
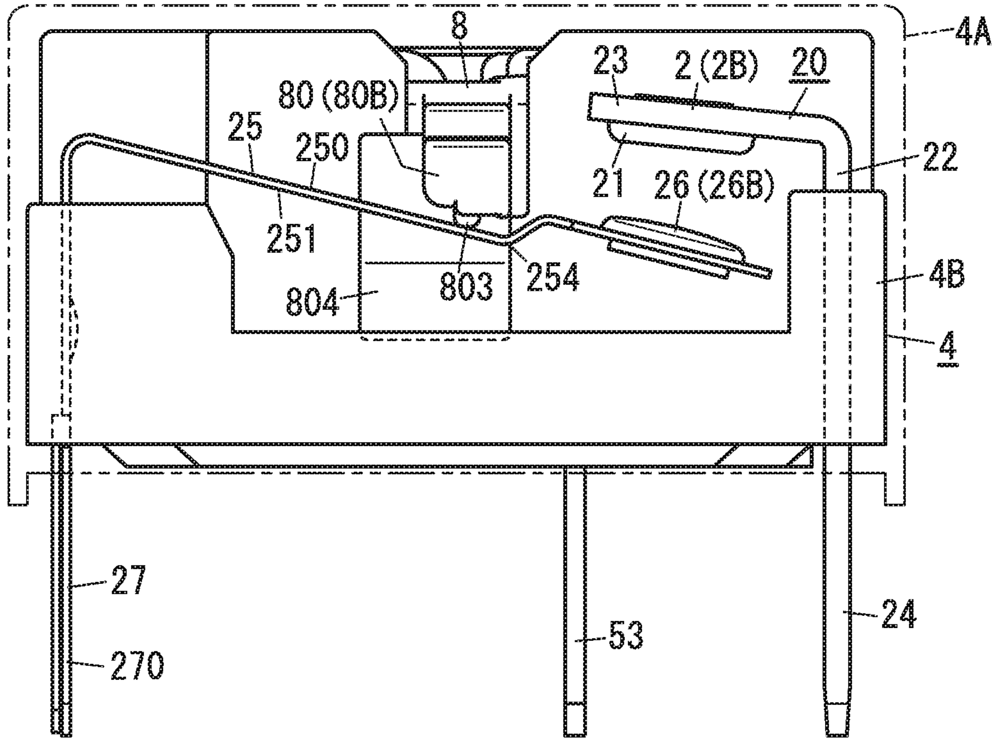

Next, the second contact unit 2B will be described mainly referring to FIG. 21A and FIG. 21B. FIG. 21A is a left side view of the electromagnetic relay 1X with the electromagnet 5 being in the non-excited state, and FIG. 21B is a left side view of the electromagnetic relay 1X with the electromagnet 5 being in the excited state.

In the present embodiment, the second contact unit 2B has substantially the same configuration as the first contact unit 2A. Therefore, in the following description, in order to simplify the description, common reference numerals are given to common structures to avoid redundant explanations as appropriate.

As shown in FIG. 21A, the second contact unit 2B includes a fixed terminal 20 including a fixed contact 21, a movable spring 25 including a movable contact 26 (hereinafter sometimes referred to as a second movable contact 26B), and a support terminal 27 supporting the movable spring 25. The movable spring 25 and the support terminal 27 constitute a movable terminal. Also in the second contact unit 2B, the movable spring 25 and the support terminal 27 are integrally formed.

Figure 15:
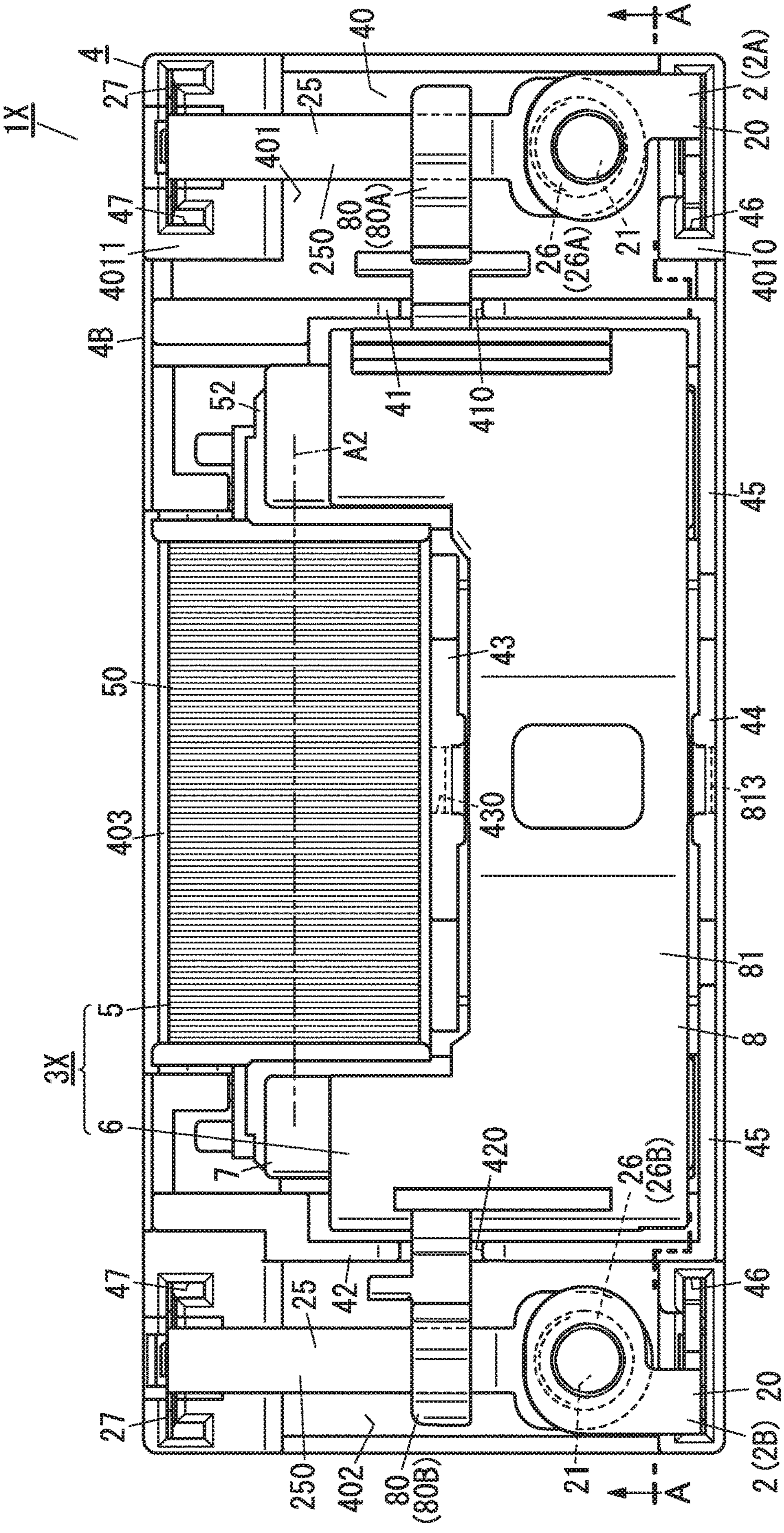
FIG. 15 is a plan view of the above electromagnetic relay.

Specifically, the fixed terminal 20 of the second contact unit 2B is formed of electrically conductive material. The fixed terminal 20 includes a fixed contact 21, an upright part 22, an upper wall part 23, and a terminal piece 24. As shown in FIG. 15, the fixed terminal 20 of the second contact unit 2B employs a configuration that is plane symmetric with the fixed terminal 20 of the first contact unit 2A in the left and right directions. Also in the second contact unit 2B, the upper wall part 23 is slightly inclined with respect to the horizontal direction. Specifically, in the open position where the second movable contact 26B and the fixed contact 21 are separated from each other, the upper wall part 23 is slightly inclined in a direction away from the movable contact 26 as moving forward.

The movable spring 25 of the second contact unit 2B is a leaf spring made of an electrically conductive thin plate, and is formed to have a substantially L-shape when viewed in the left and right directions. As shown in FIG. 21A, the movable spring 25 includes the second movable contact 26B and a lateral piece 251. That is, unlike the movable spring 25 of the first contact unit 2A, the movable spring 25 of the second contact unit 2B does not include the protruded piece 253.

Here, the movable contact 26 of each of the first contact unit 2A and the second contact unit 2B is configured to make contact with the fixed contact 21 at one contact point. It is assumed that the first contact unit 2A corresponds to a normally open contact and is inserted into an electric path to which a load is connected, for example. Therefore, it is desirable that the first contact unit 2A allows contact at one contact point so as to minimize a resistance for current. However, the movable contact 26B of the second contact unit 2B may be configured to make contact with the fixed contact 21 at two contact points. The second contact unit 2B corresponds to a normally closed contact, and is assumed to be connected to a detection circuit for detecting an abnormality such as contact welding, for example. Therefore, in a case where the number of movable contacts 26B of the second contact unit 2B is set to two, even if a foreign substance or the like adheres to one of a pair of second movable contacts 26B, the other makes contact with the fixed contact 21. Thus, the contact reliability is enhanced, and the detection circuit can more reliably detect an abnormality.

Also in the second contact unit 2B, similarly to the first contact unit 2A, the second movable contact 26B is placed to face the fixed contact 21 in the upward and downward directions. A positional relationship between the second movable contact 26B and the fixed contact 21 is that the second movable contact 26B is on the lower side and the fixed contact 21 is on the upper side.

Also, in the second contact unit 2B, the lateral piece 251 is slightly inclined with respect to the support terminal 27 in its design shape. In the open position in which the second movable contact 26B and the fixed contact 21 are separated from each other, the lateral piece 251 is slightly inclined in a direction away from the fixed contact 21 as moving forward. The lateral piece 251 includes a step part 254 in a vicinity of the second movable contact 26B.

In the present embodiment, as one example, the fixed contact 21 of the second contact unit 2B is separate from the upper wall part 23 and is fixed by swaging or the like, but may be formed integrally with the upper wall part 23. The second movable contact 26B of the second contact unit 2B is separate from the lateral piece 251 and is fixed by swaging or the like, but may be formed integrally with the lateral piece 251.

In the second contact point 2B configured as described above, when the electromagnet 5 is in the excited state, the certain surface 250 (upper surface) of the movable spring 25 continues to be pressed by the second press part 80B of the holder 8 to be described later, as shown in FIG. 21B. Therefore, a distal end part of the movable spring 25 is bent downward by elastic deformation, and the second movable contact 26B is in the open position away from the fixed contact 21.

Further, in the second contact unit 2B, when the electromagnet 5 is in the non-excited state, a pressing force from the second press part 80B of the holder 8 is eliminated as shown in FIG. 21A. Therefore, the distal end part of the movable spring 25 elastically returns upward, and the second movable contact 26B is in the closed position in contact with the fixed contact 21. In the present embodiment, as shown in FIG. 21A, a dimensional relation is defined so that the second press part 80B of the holder 8 does not come into contact with the certain surface 250 of the movable spring 25 while the electromagnet 5 is in the non-excited state. That is, when the electromagnet 5 is in the non-excited state, a slight gap is formed between the second press part 80B and the certain surface 250 of the movable spring 25, and the pressing force from the second press part 80B is eliminated.

(2.3) Electromagnetic Device (2.3.1) Configuration of Electromagnetic Device

As shown in FIG. 14, the electromagnetic device 3X includes the electromagnet 5 and the armature unit 6. In the electromagnetic device 3X, the armature 7 of the armature unit 6 is movable in accordance with excitation/non-excitation of the electromagnet 5 to switch open/closed states of the first contact unit 2A and the second contact unit 2B. In the present embodiment, for example, the armature 7 of the armature unit 6 rotates (swings) about a rotation axis A1 (see FIG. 14) within a movable range in accordance with excitation/non-excitation of the electromagnet 5. Note that "swing" in the present embodiment means that both ends (left and right ends) in a length axis of the armature unit 6 having length move upward and downward alternately relative to a center (not necessarily a strict center) in the length axis as a fulcrum. That is, the armature unit 6 is, for example, a so-called seesaw type armature unit. However, the armature unit 6 is not limited to the seesaw type.

The rotation axis A1 illustrated by a dashed line in FIG. 14 is described only for the purpose of assisting the description, and is not tangible. In the present embodiment, a center axis of an axle 813 of the holder 8 of the armature unit 6 (which will be described later) coincides with the rotation axis A1. The armature unit 6 swings about the rotational axis A1 with respect to the base 4B of the housing 4 in response to excitation/non-excitation of the electromagnet 5 to displace the movable contacts 26. Thus, the armature unit 6 can have an increased stroke and can be downsized (especially decreased in height).

(2.3.2) Electromagnet

First, the electromagnet 5 will be described mainly with reference to FIG. 15 and FIG. 19. As shown in FIG. 19, the electromagnet 5 includes the coil 50, the yoke 52, and a pair of coil terminals 53.

The yoke 52 is a magnetic material, and forms a magnetic path through which a magnetic flux passes. The yoke 52 is formed in a substantially U-shaped plate shape elongated in the left and right directions as a whole.

The coil 50 is formed by winding an electrically conductive wire around a coil bobbin 51. The coil bobbin 51 is formed of an electrically insulating material such as a synthetic resin material. The coil bobbin 51 is formed in a substantially cylindrical shape elongated in the left and right directions. The coil bobbin 51 is placed to have an axial direction coinciding with the left and right directions. The axial direction of the coil bobbin 51 corresponds to an axial direction A2 of the coil 50 (see FIG. 15).

As shown in FIG. 19, the coil bobbin 51 includes a through hole 510 that penetrates in the left and right directions, and the yoke 52 is held so that a body part of the yoke 52 that extends in the left and right direction penetrates the through hole 510. A pair of protruded parts 520 extend forward from left and right ends of the body part of the yoke 52 (see FIG. 19). In short, the yoke 52 is provided so as to protrude from the coil 50. The pair of protruded parts 520 protrude from both ends of the coil 50 in the axial direction A2 in directions intersecting with the axial direction A2 (here, forward directions substantially orthogonal to the axial direction A2).

The coil bobbin 51 includes holding pedestals 511 which have substantially rectangular plate shapes and are provided at both ends in the left and right directions and below the pair of protruded parts 520. Each holding pedestal 511 is formed continuously from a lower edge of the through hole 510 so as to have an upper surface flush with an inner bottom surface of the through hole 510. The holding pedestals 511 preferably support the pair of protruded parts 520.

The pair of coil terminals 53 are held by the coil bobbin 51 and connected to the coil 50. Specifically, one of the pair of coil terminals 53 is electrically connected to one end of the electrically conductive wire wound around the coil bobbin 51, and the other of the pair of coil terminals 53 is electrically connected to the other end of the electrically conductive wire. Further, a terminal holding blocks 512 which have rectangular parallelepiped shapes and are provided on lower surfaces of front end parts of the holding pedestals 511 of the coil bobbin 51 hold the coil terminals 53, individually.

Each of the coil terminals 53 includes a first terminal piece 531, which is long in the forward and rearward directions and is held by a corresponding terminal holding block 512 which penetrating it in the forward and rearward directions. A rear end of the first terminal piece 531 is bent downward and protrudes from the terminal holding block 512. The electrically conductive wire wound around the coil bobbin 51 is connected to an electrically conductive wire end part exposed from the terminal holding block 512. Each coil terminal 53 further includes a second terminal piece 532 extending downward from a front end of the first terminal piece 531. The second terminal piece 532 is part to be led out from the housing 4 to the outside.

In the electromagnet 5 configured as described above, when a voltage is applied between both ends of the coil 50, that is, to the pair of coil terminals 53, a current (coil current) flows through the coil 50 to excite the electromagnet 5. While the coil current is not flowing, the electromagnet 5 is in the non-excited state.

In the present embodiment, the pair of coil terminals 53 and the yoke 52 are integrally molded with the coil bobbin 51. Therefore, it is excellent in workability of assembling operation of the electromagnet 5 relative to the base 4B of the housing 4.

(2.3.3) Armature Unit

Next, the armature unit 6 will be described mainly with reference to FIG. 16 to FIG. 18. The armature unit 6 is a part that moves (swings in this embodiment) in response to excitation/non-excitation of the electromagnet 5 so that the movable contact 26 is displaced between the closed position in contact with the fixed contact 21 and the open position away from the fixed contact 21. As shown in FIG. 18, the armature unit 6 includes the armature 7, the holder 8, a permanent magnet 9, and the auxiliary yoke Y1.

The armature 7 is, for example, a member made of soft iron. The armature 7 is held by the holder 8. The armature 7 as a whole is formed in a substantially U-shaped plate shape that is long in the left and right directions. Specifically, as shown in FIG. 18, the armature 7 includes a body piece 73 that is long in the left and right directions, and a pair of leg pieces 70 that are integrally formed at both ends of the body piece 73 in the left and right directions.

The body piece 73 is accommodated in the holder 8. The body piece 73 has a rectangular plate shape, and is placed to have a thickness direction extending in the upward and downward directions. The pair of leg pieces 70 are formed so as to extend rearward from the both ends of the body piece 73. The pair of leg pieces 70 have rectangular plate shapes, and are placed to have thickness directions extending in the upward and downward directions. A rear end part of each leg piece 70 is placed to protrude from the holder 8. A lower surface of each leg piece 70 is substantially exposed from the holder 8.

The armature 7 is placed to have at least part thereof having an area facing the yoke 52. In the present embodiment, the lower surfaces of the individual leg pieces 70 exposed from the holder 8 are areas facing the yoke 52 (the protruded parts 520). Hereinafter, a right leg piece 70 of the pair of leg pieces 70 may be referred to as a first leg piece 70A, and the area facing a right one of the protruded parts 520 of the yoke 52 may be referred to as a first area 71 (see FIG. 17). A left leg piece 70 of the pair of leg pieces 70 may be referred to as a second leg piece 70B, and the area facing a left one of the protruded parts 520 of the yoke 52 may be referred to as a second area 72. The first area 71 and the second area 72 are provided to opposite tops of the armature unit 6 extending in opposite directions (the left and right directions) moving away from the rotation axis A1, respectively.

The permanent magnet 9 is formed in a rectangular parallelepiped shape which is flat in the upward and downward directions. The permanent magnet 9 is held by the holder 8. The permanent magnet 9 is placed to have opposite polarities in the upward and downward directions different from each other. In the present embodiment, the permanent magnet 9 is placed so that its N pole is directed upward and its S pole is directed downward, as shown in FIG. 22A and FIG. 22B. Hereinafter, a magnetic pole surface on the N pole may be referred to as a first magnetic pole surface (upper surface) 91, and a magnetic pole surface on the S pole may be referred to as a second magnetic pole surface (lower surface) 92 (see FIG. 18). In the permanent magnet 9, the N pole faces the armature 7. That is, the first magnetic pole surface 91 faces the body piece 73 of the armature 7.

The auxiliary yoke Y1 is formed in a flat rectangular parallelepiped shape which is thin in the upward and downward directions. The auxiliary yoke Y1 is a plate member formed of electromagnetic soft iron defined in JIS C 2504, for example. The auxiliary yoke Y1 includes a first surface Y11 (upper surface) and a second surface Y12 (left side surface). The first surface Y11 is a surface facing the second magnetic pole surface 92 on the S pole of the permanent magnet 9 and intersecting the magnetic pole direction of the permanent magnet 9. The second surface Y12 is a surface directed to the left protruded part 520 of the yoke 52.

Here, the auxiliary yoke Y1 has substantially the same shape and substantially the same size as the permanent magnet 9. Specifically, a dimensional relationship is defined so that a thickness of the auxiliary yoke Y1 is substantially equal to a thickness of the permanent magnet 9. Further, a dimensional relationship is defined so that the areas of individual upper and lower end surfaces of the auxiliary yoke Y1 are substantially equal to the areas of individual upper and lower end surfaces of the permanent magnet 9.

The auxiliary yoke Y1 is placed below the permanent magnet 9. The auxiliary yoke Y1 is held by the holder 8 together with the permanent magnet 9 so that the upper surface of the auxiliary yoke Y1 is in substantial plane contact with the lower surface of the permanent magnet 9. The auxiliary yoke Y1 and the permanent magnet 9 are arranged to overlap each other so that the auxiliary yoke Y1 is hidden when viewed from above the permanent magnet 9. In short, the permanent magnet 9 is placed to cover the first surface Y11 of the auxiliary yoke Y1. It is preferable that the auxiliary yoke Y1 is fixed to the lower surface of the permanent magnet 9 by an adhesive or the like until the permanent magnet 9 has a magnetic force through a magnetization process of the permanent magnet 9 in manufacturing the armature unit 6.

The holder 8 is formed to be long in the left and right directions and have a flat substantially rectangular cylindrical shape. The holder 8 is formed of, for example, an electrically insulating material such as a synthetic resin material. The holder 8 is configured to hold the armature 7, the permanent magnet 9, and the auxiliary yoke Y1 integrally. Specifically, the holder 8 includes a first holding block 81 for holding the armature 7, a second holding block 82 for holding the permanent magnet 9 and the auxiliary yoke Y1, and a pair of press parts 80. The first holding block 81, the second holding block 82, and the pair of press parts 80 are formed as an integral part. The armature 7 and the permanent magnet 9 are in contact with each other inside the holder 8 (see FIG. 22A and FIG. 22B). Thus the holder 8 holds the armature 7, the permanent magnet 9 and the auxiliary yoke Y1 integrally and therefore the permanent magnet 9 and the auxiliary yoke Y1 can be rotated (swung) integrally with the armature 7 with displacements thereof suppressed.

The first holding block 81 is formed in a flat rectangular cylindrical shape that is long in the left and right directions. As shown in FIG. 17, the first holding block 81 includes a bottom both left and right ends of which are opened downward. The first holding block 81 holds the armature 7 to cover a peripheral surface of the body piece 73 of the armature 7 and allow rear ends of the pair of leg pieces 70 of the armature 7 to protrude from the first holding block 81. In particular, the first area 71 and the second area 72 of the armature 7 are exposed through a first opening 811 and a second opening 812 at right and left ends of the bottom of the first holding block 81, respectively (see FIG. 17).

The first holding block 81 includes first insertion pieces 810 individually protruding downward from left and right ends thereof. The first holding block 81 includes the axle 813 protruding outward (forward and rearward) from a center in the left and right directions of the bottom. A central axis of the axle 813 corresponds to the rotation axis A1 about which the armature unit 6 swings with respect to the electromagnet 5 in response to excitation/non-excitation of the electromagnet 5. In other words, the axle 813 is pivotally supported to allow the armature unit 6 to swing with respect to the base 4B of the housing 4.

Further, the first holding block 81 includes the separator 85 (see FIG. 17, FIG. 22A, and FIG. 22B) that separates at least part of the area of the armature 7 facing the yoke 52 from the yoke 52 when the armature 7 moves toward the yoke 52. The separator 85 comes into contact with the yoke 52 when the armature 7 approaches the yoke 52. The separator 85 is formed integrally and continuously with the holder 8 in forming the holder 8 by molding, and is made of an electrically insulating material such as a synthetic resin material. The separator 85 is provided to form a magnetic gap.

More specifically, the separator 85 is formed as a protruding piece that protrudes rightward from a left edge of the second opening 812 and extends lengthwise in the forward and rearward directions. In other words, the separator 85 is configured to form a step under the second area 72 of the armature 7.

The separator 85 configured as described above suppresses deterioration of opening characteristic of the electromagnetic relay 1X due to difficulty in separation between the second area 72 of the armature 7 and the left protruded part 520 of the yoke 52 caused by residual magnetization when the electromagnet 5 is switched from the excited state to the non-excited state.

The second holding block 82 is integral with the bottom of the first holding block 81. The second holding block 82 is formed in a substantially rectangular box shape having an open lower surface. The second holding block 82 accommodates therein and holds the permanent magnet 9 and the auxiliary yoke Y1. As shown in FIG. 17, the second holding block 82 exposes the lower surface of the auxiliary yoke Y1 through the open lower surface.

The second holding block 82 includes a plurality of press-fit projections (not shown) on inner surfaces of a left wall and a rear wall thereof, respectively. Each press-fit projection is formed in a rib shape extending along the upward and downward directions. In manufacture of the armature unit 6, the press-fit projection can be in contact with side surfaces of the permanent magnet 9 and the auxiliary yoke Y1 which are inserted into the second holding block 82 from below, thereby achieving press-fit fixing. Therefore, the permanent magnet 9 and the auxiliary yoke Y1 are suppressed from being easily detached from the second holding block 82.

The second holding block 82 includes a window hole 823 penetrating in the forward and rearward directions at a front wall thereof. The window hole 823 has a rectangular opening in a front view. The window hole 823 is positioned in a position to allow a boundary surface where the permanent magnet 9 and the auxiliary yoke Y1 are in contact with each other, to be visible from the side. The window hole 823 allows visual inspection of appearances of the permanent magnet 9 and the auxiliary yoke Y1, for example, in manufacture (or usage) of the armature unit 6 or the electromagnetic device 3X. For example, it is possible to inspect arrangement of the permanent magnet 9 and the auxiliary yoke Y1 in the second holding block 82 and surfaces of members of the permanent magnet 9 and the auxiliary yoke Y1.

The second holding block 82 is placed closer to a left side of the first holding block 81 than the axle 813 of the first holding block 81 is. Therefore, a center of gravity of each of the permanent magnet 9 and the auxiliary yoke Y1 accommodated in the second holding block 82 is positioned left with respect to the rotation axis A1. Therefore, for example, as compared with a case where the center of gravity of each of the permanent magnet 9 and the auxiliary yoke Y1 overlaps the rotation axis A1, swing of the armature unit 6 in response to the excitation/non-excitation of the electromagnet 5 can be performed with higher accuracy by the permanent magnet 9 and the auxiliary yoke Y1. Further, for example, as compared with a case where two sets of the permanent magnet 9 and the auxiliary yoke Y1 are provided and the two sets are arranged in bilateral symmetry with respect to the rotation axis A1, swing of the armature unit 6 can be performed with higher accuracy with the number of parts decreased.

The pair of press parts 80 are provided integrally with the left and right end parts of the first holding block 81. Each press part 80 is part that applies a pressing force to the certain surface 250 of the movable spring 25 to move the movable contact 26. Hereinafter, the press part 80 protruding rightward from the right end part of the first holding block 81 may be referred to as a first press part 80A. The press part 80 protruding leftward from the left end part of the first holding block 81 may be referred to as a second press part 80B.

Each press part 80 is formed in an elongated rectangular parallelepiped shape. As shown in FIG. 16 and FIG. 17, the first press part 80A includes at its lower surface a first protrusion 801 and a second protrusion 802 which are convex downward. As shown in FIG. 20A and FIG. 20B, the first protrusion 801 faces the lateral piece 251 of the movable spring 25 of the first contact unit 2A. As shown in FIG. 24A, the second protrusion 802 faces the protruded piece 253 of the movable spring 25 of the first contact unit 2A. In short, the first press part 80A comes into contact with the movable spring 25 and gives a pressing force thereto with the first protrusion 801 and the second protrusion 802 in-between, thereby moving the first movable contact 26A. As described above, since the first contact unit 2A corresponds to the normally open contact, the first press part 80A gives the pressing force to the movable spring 25 by making contact therewith while the electromagnet 5 is in the non-excited state (see FIG. 20A).

On the other hand, as shown in FIG. 16 and FIG. 17, the second press part 80B includes at its lower surface a third protrusion 803 convex downward. As shown in FIG. 21A and FIG. 21B, the third protrusion 803 faces the lateral piece 251 of the movable spring 25 of the second contact unit 2B. In short, the second press part 80B comes into contact with the movable spring 25 and gives a pressing force thereto with the third protrusion 803 in-between, thereby moving the second movable contact 26B. Since the second contact unit 2B corresponds to the normally closed contact as described above, the second press part 80B gives the pressing force to the movable spring 25 by making contact therewith while the electromagnet 5 is in the excited state (see FIG. 21B).

Each press part 80 includes a second insertion piece 804 with a rectangular plate shape at a position spaced apart from the first holding block 81 by a predetermined distance. The second insertion piece 804 is placed to have a thickness direction extending in the left and right directions.

Figure 24B:
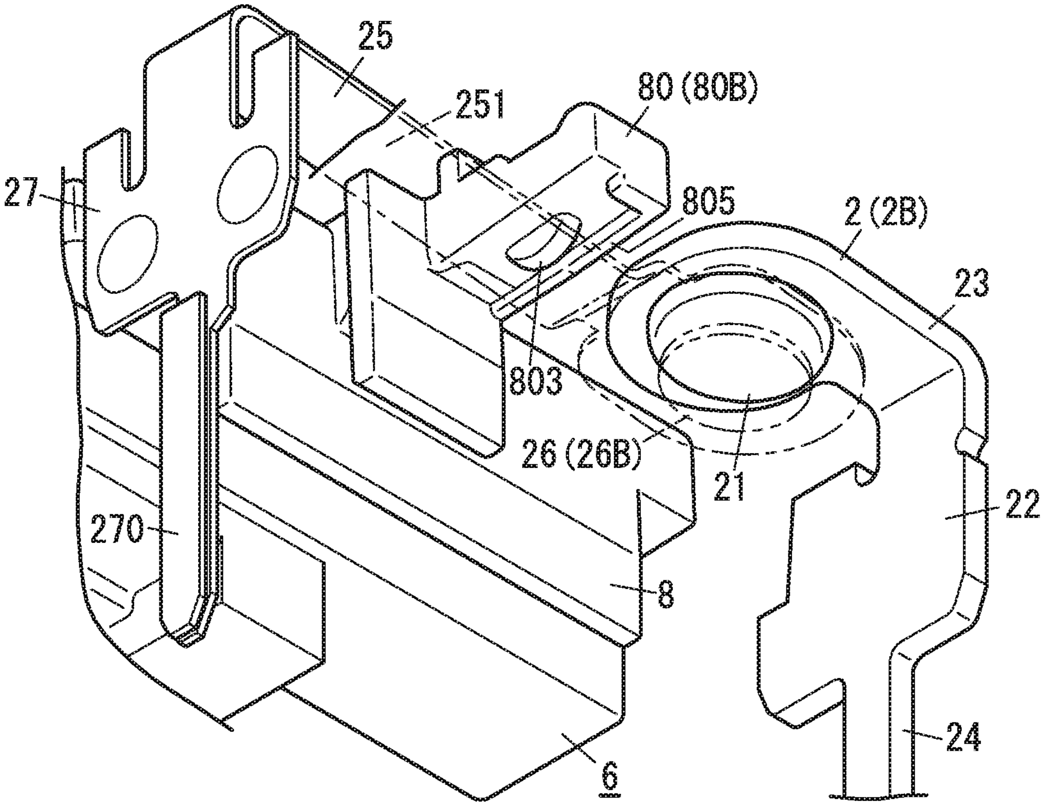

As shown in FIG. 24A and FIG. 24B, each press part 80 further includes an L-shaped protrusion 805 which protrudes from a lower surface thereof and has a substantially L-shape when viewed from below. Each L-shaped protrusion 805 is positioned outward the second insertion piece 804 of a corresponding press part 80 in the left and right directions. Each L-shaped protrusion 805 is formed along a front edge and an outward edge in the left and right directions, of the lower surface of the corresponding press part 80.

Not to prevent contact between the first to third protrusions 801 to 803 and the movable spring 25, a protrusion amount of the L-shaped protrusion 805 is smaller than a protrusion amount of each of these protrusions. Part of the L-shaped protrusion 805 along the front edge is positioned to substantially face to the step part 254 of the movable spring 25. The L-shaped protrusion 805 cooperates with the step part 254 to shield the movable contact 26 from an abrasion powder which may be produced due to operation of the press part 80, thereby suppressing spread of the abrasion powder.

In the armature unit 6 configured as described above, each press part 80 applies a pressing force to a certain surface 250 of a corresponding movable spring 25, thereby moving the movable contact 26 to the open position. In addition, each press part 80 eliminates the pressing force to the certain surface 250 of the corresponding movable spring 25, thereby moving the movable contact 26 to the closed position. In particular, since the armature unit 6 is of the seesaw type, when one of the first press part 80A and the second press part 80B moves toward the certain surface 250 of the corresponding movable spring 25, the other moves away from the certain surface 250 of the corresponding movable spring 25.

Here, in the present embodiment, the auxiliary yoke Y1 is placed to allow the second surface Y12 to face the yoke 52 in a range of at least part of a movable range of the armature 7 moving in response to excitation/non-excitation. The movable range is, for example, defined as a range allowing the armature 7 to rotate (swing) between a position in which the left end of the armature 7 is lifted as shown in FIG. 22A and a position in which the left end of the armature 7 is dropped as shown in FIG. 22B.

The second surface Y12 of the auxiliary yoke Y1 faces the yoke 52 while the electromagnet 5 is not excited. More specifically, when the left end of the armature 7 is raised to the upper position as shown in FIG. 22A in response to the non-excitation of the electromagnet 5, an area D11 of part of the second surface Y12 faces an area D12 of part of a right surface of the left protruded part 520 of the yoke 52. While the electromagnet 5 is not excited, the second surface Y12 faces the left protruded part 520 with the area D11 largest. With a drop of the lower end of the armature 7 caused by switch of the electromagnet 5 from the non-excited state to the excited state, an area of the second surface Y12 facing the left protruded part 520 gradually decreases. In a state in which swing of the armature 7 is stabilized after switch of the electromagnet 5 to the excited state (see FIG. 22B), the second surface Y12 is directed to the protruded part 520 (that is, directed left) but is not within a range facing the protruded part 520.

(2.4) Housing

The housing 4 is made of an electrically insulating material such as a synthetic resin material. As shown in FIG. 14, the housing 4 is formed in a substantially rectangular box shape that is long in the left and right directions as a whole and is relatively small in height. The housing 4 is constituted by the cover 4A and the base 4B. In FIG. 14, the cover 4A is indicated only by a two-dot chain line in order to make it easy to understand an inner structure of the electromagnetic relay 1X. The cover 4A has a rectangular box shape with an open bottom surface, and is attached to cover, from above, the base 4B to which the contact units 2 and the electromagnetic device 3X are attached. The housing 4 houses the contact units 2 and the electromagnetic device 3X.

As shown in FIG. 14 and FIG. 15, the base 4B has a flat rectangular plate shape as a whole. The base 4B is configured to hold the contact units 2 and the electromagnetic device 3X on its certain surface 40 (upper surface) side. The certain surface 40 of the base 4B extends in a plane including the forward and rearward directions and the left and right directions in FIG. 14, and has a substantially rectangular outer shape when viewed in the upward and rearward directions. That is, a plane including the certain surface 40 of the base 4B is perpendicular to the upward and rearward directions. Note that the term “perpendicular” as used herein has a broader meaning than “perpendicular” in a geometric sense and is not limited to “perpendicular” in a strict sense and may be interpreted as substantially perpendicular (an angle of intersection may be, for example, 90°±10°.

Specifically, as shown in FIG. 15, the base 4B includes on its certain surface 40 side three accommodation parts 401 to 403 for accommodating the pair of contact units 2 and the electromagnetic device 3X individually. Hereinafter, an accommodation part in which the first contact unit 2A is accommodated is referred to as a first accommodation part 401, and an accommodation part in which the second contact unit 2B is accommodated is referred to as a second accommodation part 402. An accommodation part in which the electromagnetic device 3X is accommodated is referred to as a third accommodation part 403. Each of these accommodation parts is formed as a recessed space.

The first accommodation part 401 is positioned at a right end of the certain surface 40 of the base 4B. The second accommodation part 402 is positioned at a left end of the certain surface 40 of the base 4B. The third accommodation part 403 is positioned between the first accommodation part 401 and the second accommodation part 402 on the certain surface 40 of the base 4B. In the third accommodation part 403, the armature unit 6 of the electromagnetic device 3X and the electromagnet 5 of the electromagnetic device 3X are accommodated to be arranged so that the armature unit 6 is on a front side and the electromagnet 5 is on a rear side.

Therefore, the first contact unit 2A accommodated in the first accommodation part 401 and the electromagnet 5 accommodated in the third accommodation part 403 are arranged on a plane intersecting with the upward and downward directions on the certain surface 40 side of the base 4B (here, the certain surface 40). Similarly, the second contact unit 2B accommodated in the second accommodation part 402 and the electromagnet 5 accommodated in the third accommodation part 403 are arranged on a plane intersecting with the upward and downward directions on the certain surface 40 side of the base 4B (here, the certain surface 40). Therefore, the electromagnetic relay 1X can be downsized (in particular, decreased in height).

Further, the electromagnet 5 accommodated in the third accommodation part 403 is positioned between the first contact unit 2A and the second contact unit 2B. Therefore, the electromagnetic relay 1X is further downsized (in particular, decreased in height).

In particular, as shown in FIG. 15, the first contact unit 2A is placed close to either one (right one) of opposite ends of the coil 50 in the axial direction A2 of the coil 50. As shown in FIG. 15, the second contact unit 2B is placed close to the other (left one) of the opposite ends of the coil 50 in the axial direction A2 of the coil 50. This arrangement makes it possible to increase the stroke of the armature unit 6 due to the excitation/non-excitation of the electromagnet 5. As shown in FIG. 15, the axial direction A2 of the coil 50 is set substantially along a plane in which the certain surface 40 of the base 4B extends.

Between the first accommodation part 401 and the third accommodation part 403, a first partition 41 having a substantially rectangular plate shape protrudes upright from the certain surface 40 of the base 4B. Between the second accommodation part 402 and the third accommodation part 403, a second partition 42 having a substantially rectangular plate shape is provided upright from certain surface 40 of the base 4B. The first partition 41 and the second partition 42 are arranged so that their thickness directions extend along the left and right directions. As shown in FIG. 14, the first partition 41 and the second partition 42 include cutouts 410 and 420 into which the corresponding press parts 80 are inserted, respectively.

In the third accommodation part 403, a third partition 43 having a substantially rectangular plate shape for separating the electromagnet 5 and the armature unit 6 from each other protrudes upright from the certain surface 40 of the base 4B. The third partition 43 is placed so that its thickness direction extends along the forward and rearward directions. As shown in FIG. 15, the third partition 43 includes a bearing hole 430 penetrating in the thickness direction a center in the upward, downward, left and right directions. On the other hand, the base 4B includes, at a substantial center in the left and right directions of its front end, a front wall 44 facing the third partition 43 with the armature unit 6 in-between. The front wall 44 includes a bearing hole 440 penetrating in its thickness direction. The bearing hole 440 is configured to cooperate with the bearing hole 430 of the third partition 43 to receive the axle 813 of the holder 8. A front wall 45 is provided close to each of left and right sides of the front wall 44 with a cutout 441 in-between.

As shown in FIG. 15, each of the first accommodation part 401 and the second accommodation part 402 includes at its front end a first slot 46 into which the upright part 22 of the fixed terminal 20 is inserted. The first slot 46 is provided in an upper surface of a rib 4010 which is formed at the front end and has a predetermined thickness. In an inner bottom of the first slot 46, a lead-out opening (not shown) is formed.

The lead-out opening allows the terminal piece 24 of the fixed terminal 20 to be inserted thereinto and to be led out therefrom to the outside of the housing 4.

As shown in FIG. 15, each of the first accommodation part 401 and the second accommodation part 402 includes, at its rear end, a second slot 47 into which the support terminal 27 for supporting the movable spring 25 is inserted. The second slot 47 is provided in an upper surface of a rib 4011 which is formed at the rear end and has a predetermined thickness. In an inner bottom of the second slot 47, a lead-out opening (not shown) is formed. The lead-out opening allows the terminal piece 270 of the support terminal 27 to be inserted thereinto and to be led out therefrom to the outside of the housing 4.

The third accommodation part 403 includes lead-out openings (not shown) at both left and right ends slightly in front of the third partition 43. The lead-out opening allow the second terminal pieces 532 of the pair of coil terminals 53 of the electromagnet 5 to be inserted thereinto and to be led out therefrom to the outside of the housing 4.

As shown in FIG. 22A and FIG. 22B, the coil terminal 53 of the present embodiment is provided on an opposite side of the yoke 52 from the armature 7. Further, the coil terminal 53 includes a second terminal piece 532 extending in a direction away from the armature 7 (the downward direction). Since the second terminal piece 532 is led out to the outside of the housing 4 through the aforementioned lead-out opening, the electromagnetic device 3X is downsized. In particular, each coil terminal 53 is provided to be positioned within a projection area of the protruded part 520 of the yoke 52 when the electromagnet 5 is viewed in the upward and downward directions. Therefore, further downsizing of the electromagnetic device 3X can be achieved.

Further, in the present embodiment, similarly to Embodiment 1, the movable contact 26 is placed between the base 4B and the fixed contact 21 in an arrangement direction in which the base 4B and the electromagnet 5 are arranged (the upward and rearward directions in FIG. 14). The armature unit 6 includes a press part 80 which causes movement of the movable contact 26 by applying a pressing force to a certain surface 250 facing the fixed contact 21, of the movable spring 25. That is, as in Embodiment 1, the movable contact 26 and the fixed contact 21 are arranged in this order from the bottom to the top from the base 4B. Therefore, for example, the movable contact 26, the fixed contact 21, and the armature unit 6 can be assembled to the base 4B in this order from above the base 4B along the arrangement direction in which the base 4B and the electromagnet 5 are arranged (the upward and rearward directions in FIG. 14). Therefore, the electromagnetic relaying 1X of the present embodiment is also excellent in workability of assembling operation. In particular, considering automation of assembly of the electromagnetic relay 1X, the present embodiment allows sequentially assembling the contact unit 2 and the armature unit 6 along one direction, and therefore productivity of the electromagnetic relay 1X can be improved.

(3) Explanation of Operation of Embodiment 2

Hereinafter, the operation of the electromagnetic relay 1X according to the present embodiment will be described by referring to FIG. 22A, FIG. 22B, FIG. 23A and FIG. 23B. As described before, it is assumed that the permanent magnet 9 has an N pole as its upper pole and an S pole as its lower pole (see FIG. 22A and FIG. 22B).

First, a magnetic path formed while the electromagnet 5 is in the non-excited state will be described. A magnetic flux generated from the N pole of the permanent magnet 9 passes through the armature 7 and falls from the right end of the armature 7 to the right protruded part 520 of the yoke 52 (see a magnetic path indicated by a dotted arrow B1 in FIG. 22A). Then, the magnetic flux passes through the U-shaped yoke 52 and reaches the left protruded part 520 of the yoke 52 (see a magnetic path indicated by a dotted arrow B2 in FIG. 22A). Here, as shown in FIG. 22A, the area D12 of the part of the right surface of the left protruded part 520 faces the area D11 of the part of the second surface Y12 of the auxiliary yoke Y1. Therefore, a magnetic flux which is part of the magnetic flux passing through the protruded part 520 and passes through the area D11 of the second surface Y12 increases. Then, the magnetic flux travels toward the first surface Y11 of the auxiliary yoke Y1 while bending in an arc inside the auxiliary yoke Y1, and then travels from the first surface Y11 toward the second magnetic pole surface 92 on the S pole of the permanent magnet 9.

As a result, the auxiliary yoke Y1 is attracted to the left protruded part 520 (see a magnetic path indicated by a solid arrow B3 in FIG. 22A). The entire armature unit 6 including the armature 7 is in an inclined state in which the right end is swung down about the rotation axis A1 (see FIG. 14) (hereinafter, referred to as a first inclined state).

In the first inclined state, as shown in FIG. 22A, the second area 72 of the armature 7 is located away from (the left protruded part 520 of) the opposite yoke 52. On the other hand, the first area 71 of the armature 7 is in contact with (the right protruded part 520 of) the opposite yoke 52. In the first inclined state, the right first press part 80A is in contact with the movable spring 25 of the first contact unit 2A and applies a pressing force thereto. Therefore, the first movable contact 26A is in the open position away from the fixed contact 21. On the other hand, the left second press part 80B is separated upward from the movable spring 25 of the second contact unit 2B and is in a non-contact state. Therefore, the second movable contact 26B is in the closed position in contact with the fixed contact 21.

When, for example, a switch (not shown) connected in series to the coil 50 is switched from an off state to an on state in a condition where the electromagnet 5 is in the non-excited state, a voltage is applied between the pair of coil terminals 53, and a coil current flows through the coil 50. Then, the electromagnet 5 is excited, and as shown in FIG. 22B, the polarity of the left protruded part 520 of the yoke 52 is reversed from the N pole to the S pole. As a result, the left end of the armature 7 in contact with the upper part of the permanent magnet 9, which is the N-pole, is attracted to the left protruded part 520 (see a magnetic path indicated by a dotted arrow B4 in FIG. 22B). That is, the armature 7 receives an attraction force from the yoke 52 due to excitation of the electromagnet 5, and moves (swings) in a direction in which the second area 72 moves toward the yoke 52. In other words, the entire armature unit 6 including the armature 7 is switched from the first inclined state to an inclined state in which the left end is swung down due to swing about the rotation axis A1 (see FIG. 14) (hereinafter, referred to as a second inclined state).

In the second inclined state, the second area 72 of the armature 7 is located closer to (the left protruded part 520 of) the opposite yoke 52 than in the first inclined state, but is not in contact with the protruded part 520. This is because the separator 85 of the holder 8 prevents contact between the second area 72 and the protruded part 520 (see FIG. 22B). On the other hand, the first area 71 of the armature 7 is located away from (the right protruded part 520 of) the opposite yoke 52. In the second inclined state, contrary to the first inclined state, the right first press part 80A is separated upward from the movable spring 25 of the first contact unit 2A and thus is in a non-contact state. Therefore, the first movable contact 26A is in the closed position in contact with the fixed contact 21. On the other hand, the left second press part 80B is in contact with the movable spring 25 of the second contact unit 2B and applies a pressing force thereto. Therefore, the second movable contact 26B is in the open position away from the fixed contact 21.

Figure 23A:
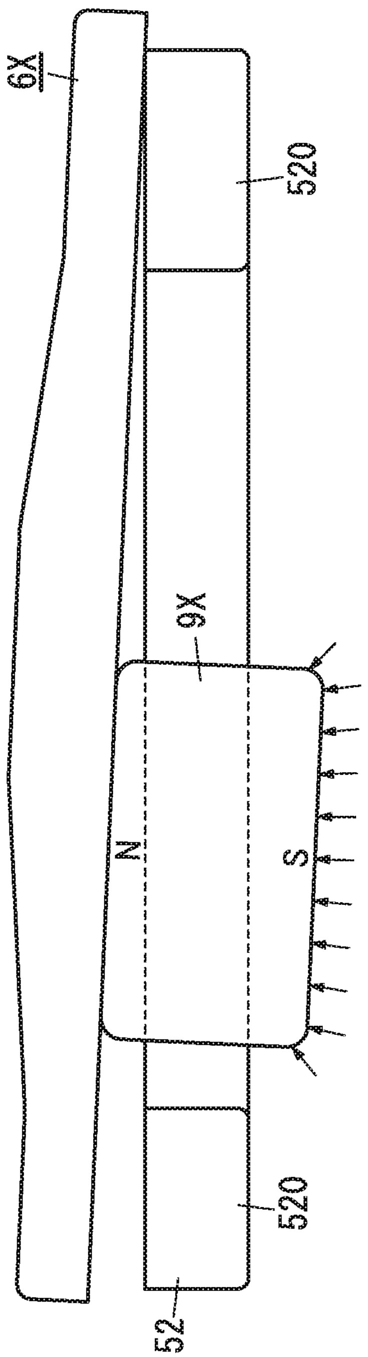
FIG. 23A is an explanatory view of a magnetic circuit in an electromagnetic device of a comparative example.
Figure 23B:
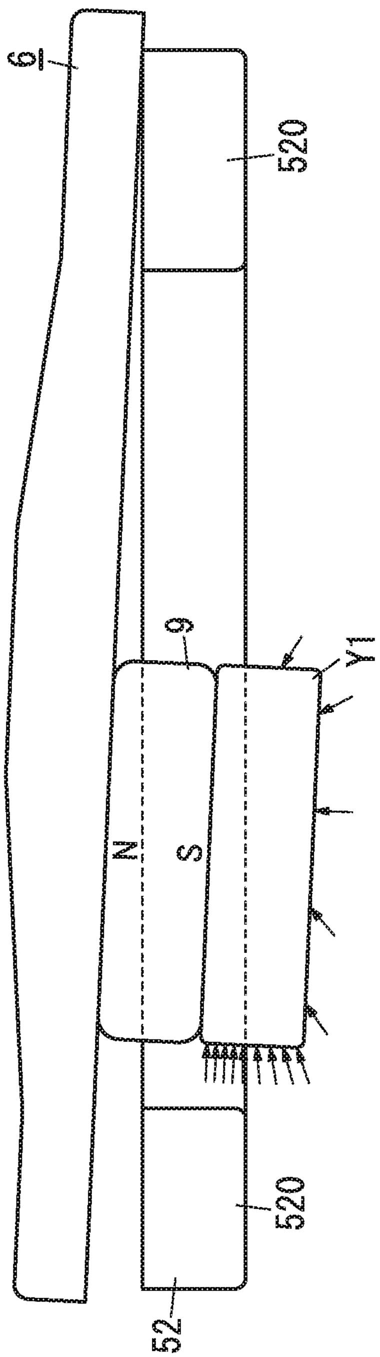
FIG. 23B is an explanatory view of a magnetic circuit in the electromagnetic device of the above electromagnetic relay.

Now, comparison between FIG. 23A and FIG. 23B is made. FIG. 23A shows a conceptual view of a magnetic circuit made by the yoke 52 and an armature unit 6X of a comparative example devoid of the auxiliary yoke Y1. The armature unit 6X of the comparative example does not include the auxiliary yoke Y1 but includes a permanent magnet 9X having a thickness of about twice the thickness of the permanent magnet 9 of the present embodiment. On the other hand, FIG. 23B shows a conceptual view of a magnetic circuit made by the yoke 52 and the armature unit 6 of the present embodiment. In FIG. 23A and FIG. 23B, illustration of the holder 8 and the like is omitted. In both FIG. 23A and FIG. 23B, part of the magnetic flux while the electromagnet 5 is in the non-excited state is illustrated by directional lines. The number and lengths of directional lines in the figures are merely schematic. The armature unit 6 of the present embodiment shown in FIG. 23B is larger in a ratio of a magnetic flux passing through the protruded part 520 to the magnetic flux passing through the magnetic pole surface of the S pole of the permanent magnet 9 than the comparative example shown in FIG. 23A.

As described above, the present embodiment includes the auxiliary yoke Y1 and therefore can reduce the leakage of the magnetic flux at the other magnetic pole (the S pole in FIG. 22A) of the permanent magnet 9. In particular, the second surface Y12 of the auxiliary yoke Y1 faces the protruded part 520 at least in the non-excited state. Therefore, the magnetic flux between the protruded part 520 and the second surface Y12 increases and thus the leakage of the magnetic flux can be reduced.

The permanent magnet 9 is smaller in size than the permanent magnet 9X in the comparative example of FIG. 23A (here substantially half). Therefore it is possible to reduce the production cost. In particular, although a total magnetic flux as a whole is reduced to approximately half when the size of the permanent magnet 9 is approximately halved, the magnetic flux density at the permanent magnet 9 and the left side of the auxiliary yoke Y1 is increased and thus an attraction force between the permanent magnet 9 and the yoke 52 can be almost equivalent to that in the comparative example of FIG. 23A.

In addition, the permanent magnet 9 and the auxiliary yoke Y1 are located at positions deviated from the rotation axis A1. Therefore, the rotation of the armature 7 in accordance with excitation/non-excitation can be performed with higher accuracy by the permanent magnet 9 and the auxiliary yoke Y1, and the leakage of magnetic flux can be reduced.

(4) Variations of Embodiment 2

Other variations of the above embodiment are listed below. The variations described below can be applied in combination in an appropriate manner. In the following, the above embodiment is also referred to as a "basic example".

(4.1) Variation 1

Figure 25:
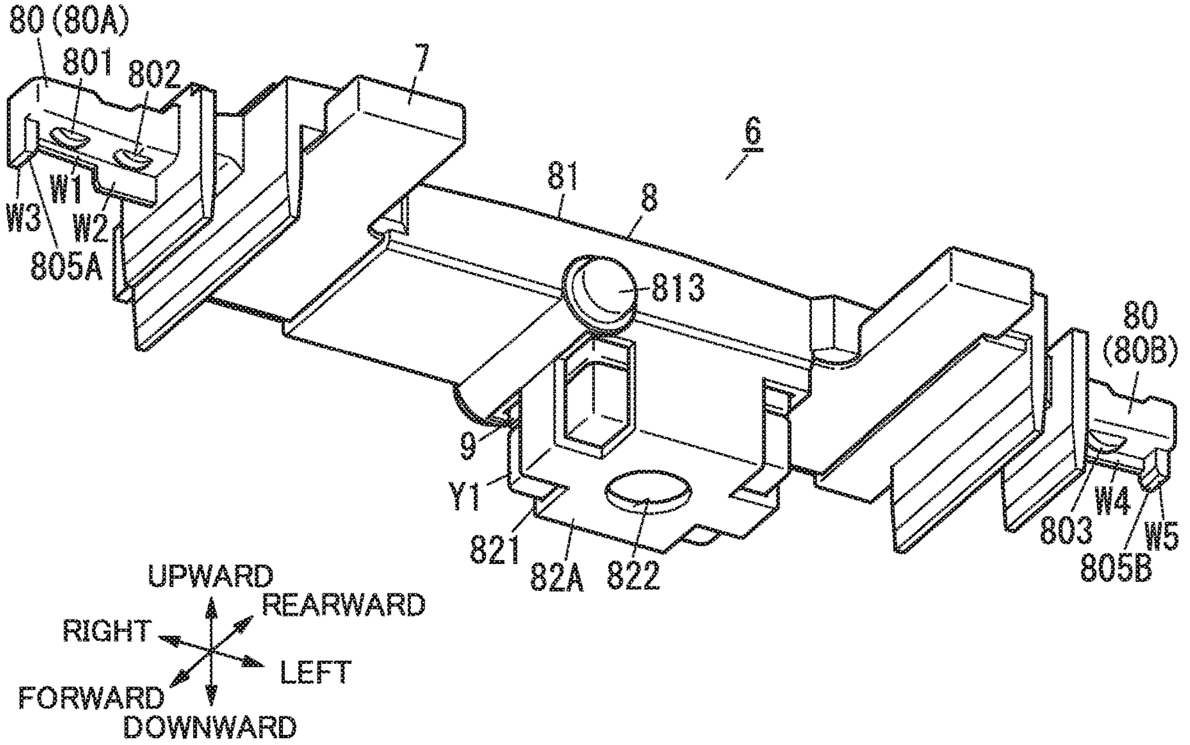
FIG. 25 is a perspective view of a variation of the above armature unit viewed from blow.

In the armature unit 6 of the basic example, the holder 8 is configured to hold the permanent magnet 9 and the auxiliary yoke Y1 by press-fitting from below. However, the configuration of the holder 8 is not limited to the configuration of holding by press-fitting. For example, FIG. 25 shows a variation (variation 1) of the armature unit 6. In the armature unit 6 of the present variation, the permanent magnet 9 and the auxiliary yoke Y1 are integrally molded with the holder 8. Specifically, the holder 8 of the present variation includes a second holding block 82A having a structure different from that of the second holding block 82 of the basic example.

The second holding block 82A is formed in a rectangular parallelepiped box shape so as to cover not only the permanent magnet 9 and front, rear, left and right surfaces of the auxiliary yoke Y1 but also a lower surface of the auxiliary yoke Y1. The second holding block 82A includes at its individual four corners window holes 821 exposing the permanent magnet 9 and the auxiliary yoke Y1. The second holding block 82A includes a circular window hole 822 in its lower surface. The window hole 821 is positioned in a position to allow a boundary surface where the permanent magnet 9 and the auxiliary yoke Y1 are in contact with each other, to be visible from the side. The window hole 821 allows visual inspection of appearances of the permanent magnet 9 and the auxiliary yoke Y1, for example, in manufacture (or usage) of the armature unit 6 or the electromagnetic device 3X.

According to this configuration, the permanent magnet 9, the auxiliary yoke Y1, and the holder 8 are formed as an integrally molded product, and therefore the workability of assembling operation of the armature unit 6 is excellent.

The holder 8 of the present variation further includes L-shaped protrusions 805A and 805B having different structures from the L-shaped protrusion 805 for suppressing spread of the abrasion powder, of the holder 8 of the basic example. The L-shaped protrusions 805A and 805B of the present variation are configured to have different protrusion amounts from the lower surface of the press part 80 depending on their parts.

Specifically, the L-shaped protrusion 805A formed on the first press part 80A on the right side has three parts. That is, the right L-shaped protrusion 805A includes a first wall W1 facing the first protrusion 801 in the forward and rearward directions, a second wall W2 facing the second protrusion 802 in the forward and rearward directions, and a third wall W3 corresponding to a right end wall. The protrusion amount of the first wall W1 is slightly smaller than the protrusion amount of the first protrusion 801, for example. On the other hand, the protrusion amounts of the second wall W2 and the third wall W3 are substantially equal to each other, and both are larger than the protrusion amount of the first wall W1. As an example, dimensions in the upward and downward directions of the second wall W2 and the third wall W3 are about three times as large as a dimension in the upward and downward directions of the first wall W1.

On the other hand, the L-shaped protrusion 805B formed on the second press part 80B on the left side includes a fourth wall W4 facing the third projection 803 in the forward and rearward directions, and a fifth wall W5 corresponding to a left end wall. The protrusion amount of the fourth wall W4 is substantially equal to the protrusion amount of the first wall W1, for example. The protrusion amount of the fifth wall W5 is substantially equal to the protrusion amount of each of the second wall W2 and the third wall W3.

In short, the right L-shaped protrusion 805A of this variation includes a recess formed by the first to third walls W1 to W3, and the left L-shaped protrusion 805B includes a recess formed by the fourth wall W4 and the fifth wall W5.

The L-shaped protrusions 805A and 805B can more efficiently suppress spread of the abrasion powder produced by the operation of the press part 80 while avoiding contact by the movable spring 25 due to these recesses.

(4.2) Variation 2

In the basic example, the configuration of the electromagnetic relay 1X alone has been described. A plurality of electromagnetic relays 1X may be applied. For example, as shown in FIG. 26A to FIG. 26C, relay systems 100A to 100C each including a plurality of electromagnetic relays 1X can be configured.

Figure 26A:
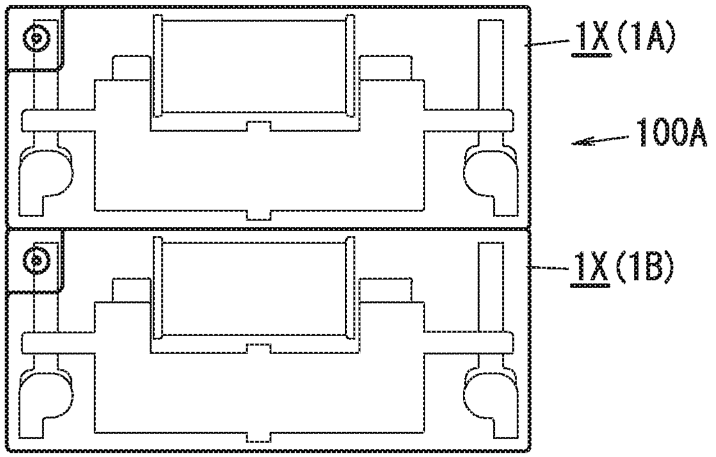
FIG. 26A to FIG. 26C are conceptual views of examples where a plurality of the above electromagnetic relays are arranged adjacent to each other.

FIG. 26A shows a relay system 100A. The relay system 100A includes two electromagnetic relays 1X (1A and 1B). FIG. 26A is a schematic view of the two electromagnetic relays 1X viewed from above. The two electromagnetic relays 1X are arranged close to each other (side by side) according to installation environments (e.g., dimensions of a mounting board for the electromagnetic relays 1X), requirements, or the like. In the illustrated example, the two electromagnetic relays 1X are arranged so that a front surface of the first electromagnetic relay 1A closely faces a rear surface of the second electromagnetic relay 1B.

Figure 26B:
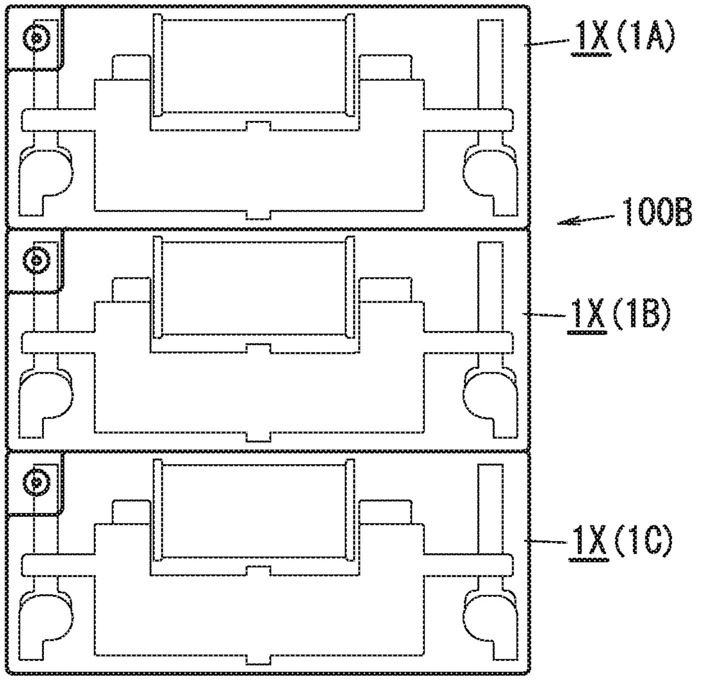

FIG. 26B shows a relay system 100B. The relay system 100B includes three electromagnetic relays 1X (1A, 1B, and 1C). FIG. 26B is a schematic view of the three electromagnetic relays 1X viewed from above. The three electromagnetic relays 1X are arranged close to each other (side by side) according to installation environments, requirements, or the like. In the illustrated example, the three electromagnetic relays 1X are arranged so that a front surface of the electromagnetic relay 1A closely faces a rear surface of the electromagnetic relay 1B and a front surface of the electromagnetic relay 1B closely faces a rear surface of the electromagnetic relay 1C.

Figure 26C:
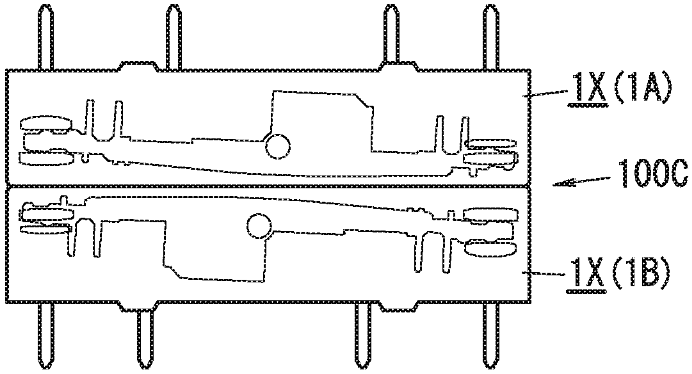

FIG. 26C shows a relay system 100C. Like the relay system 100A, the relay system 100C includes two electromagnetic relays 1X (1A and 1B). FIG. 26C is a schematic view of the two electromagnetic relays 1X from the side. In the illustrated example, the two electromagnetic relays 1X are arranged so that an upper surface of the electromagnetic relay 1A and an upper surface of the electromagnetic relay 1B closely face to each other (upper surface connecting).

When a plurality of electromagnetic relays 1X are arranged close to each other, a magnetic force of the permanent magnet 9 of each electromagnetic relay 1X may have a considerable effect on the other adjacent electromagnetic relays 1X, in contrast to a case where the electromagnetic relay 1X is used alone. This is considered to be caused by the leakage of the magnetic flux from the permanent magnet 9. In the electromagnetic relay 1B located in the center of the side-by-side arrangement relay system 100B, it is likely to be particularly affected by leakage flux. Specifically, there is a possibility that the attraction force between the permanent magnet 9 and the yoke 52 is reduced and swing of the armature 7 is not properly performed.

On the other hand, as described in the basic example, by providing the respective electromagnetic relays 1X with the auxiliary yokes Y1, it is possible to reduce the leakage magnetic flux. As a result, it is possible to suppress the reduction of the attractive force when the adjacent arrangement as shown in FIG. 26A to FIG. 26C is applied.

(4.3) Other Variations

In the basic example, as shown in FIG. 22A, FIG. 22B, and FIG. 23B, the permanent magnet 9 is placed so that the N pole is directed upward and the S pole is directed downward. However, the permanent magnet 9 may be placed so that the N pole is directed downward and the S pole is directed upward.

In the basic example, the auxiliary yoke Y1 has substantially the same shape and substantially the same size as the permanent magnet 9, but is not particularly limited. For example, a dimensional relationship may be defined so that the thickness of the auxiliary yoke Y1 is different from the thickness of the permanent magnet 9. For example, the auxiliary yoke Y1 may have a doughnut shape having a through hole at its center. Further, a dimensional relationship is defined so that the areas of individual upper and lower end surfaces of the auxiliary yoke Y1 are different from the areas of individual upper and lower end surfaces of the permanent magnet 9. However, considering the efficiently reduction of the leakage magnetic flux and the reduction of the height of the entire electromagnetic device 3X, it is desirable that the auxiliary yoke Y1 has the structure of the basic example.

In the basic example, the permanent magnet 9 is placed to cover the entire area of the first surface Y11 of the auxiliary yoke Y1, but may cover only an area of part of the first surface Y11. However, in consideration of efficiently reducing the leakage magnetic flux, the basic example is desirable.

In the basic example, the second surface Y12 of the auxiliary yoke Y1 is configured to be positioned outside the range facing the yoke 52 while the electromagnet 5 is excited. However, an area of at least part of the second surface Y12 of the auxiliary yoke Y1 may face the yoke 52 not only when the electromagnet 5 is not excited but also when the electromagnet 5 is excited. However, in this case, there is a possibility that the armature 7 is hardly separated from the yoke 52 due to residual magnetization when the excitation is switched to the non-excitation. Therefore the configuration of the basic example is desirable.

In the basic example, the step part 254 for suppressing spread of the abrasion powder in each movable spring 25 has a structure recessed downward with respect to the third part 251C. However, for example, the step part 254 may have a structure protruded upward with respect to the third part 251C.

In the basic example, the first press part 80A includes two protrusions which are the first protrusion 801 and the second protrusion 802, and is configured to make contact with the movable spring 25 with these protrusions. However, the first press part 80A is not limited to this configuration, but may include a single protrusion like the second press part 80B and be configured to make contact with the movable spring 25 with the protrusion.

In the basic example, the armature unit 6 is supported on the base 4B to be allowed to swing, by fitting the axle 813 of the holder 8 into the bearing holes 430 and 440 of the base 4B, but may no be limited to this configuration. The holder 8 may be provided with bearing holes, and the base 4B may be provided with an axle to be fitted into the bearing holes of the holder 8.

Conclusion (Advantages)

As described above, an electromagnetic relay (1) according to a first aspect includes: at least one contact unit (2); an electromagnet (5); an armature unit (6); and a base (4B). The at least one contact unit (2) includes a fixed contact (21) and a movable spring (25) including a movable contact (26). The electromagnet (5) includes a coil (50) and is excited by a coil current flowing through the coil (50). The armature unit (6)

is movable in accordance with excitation of the electromagnet (5) to allow the movable contact (26) to move between a closed position in contact with the fixed contact (21) and an open position away from the fixed contact (21). The base (4B) holds the contact unit (2) and the electromagnet (5) on a certain surface (40) side. The movable contact (26) is placed between the base (4B) and the fixed contact (21) in an arrangement direction in which the base (4B) and the electromagnet (5) are arranged. The armature unit (6) includes a press part (80) which causes movement of the movable contact (26) by applying a pressing force to a certain surface (250) facing the fixed contact (21), of the movable spring (25). According to the first aspect, the movable contact (26) is placed between the base (4B) and the fixed contact (21) in the arrangement direction (the upward and downward directions) in which the base (4B) and the electromagnet (5) are arranged. Therefore, the movable contact (26), the fixed contact (21), the electromagnet (5) and the armature unit (6) can be attached to the base (4B) in this order from above the base (4B) along the upward and downward directions, for example. Therefore, it is possible to provide the electromagnetic relay (1) excellent in workability of assembling operation.

Preferably in an electromagnetic relay (1) according to a second aspect would be realized in combination with the first aspect, the contact unit (2) and the electromagnet (5) are arranged in a plane crossing the arrangement direction (the upward and downward directions) on the certain surface (40) side of the base (4B). According to the second aspect, it is possible to provide the electromagnetic relay (1) excellent in workability of assembling operation while being downsized (in particular, decreased in height).

Preferably in an electromagnetic relay (1) according to a third aspect would be realized in combination with the first or second aspect, the press part (80) causes movement of the movable contact (26) to the open position by applying the pressing force to the certain surface (250) of the movable spring (25). According to the third aspect, even if welding occurs between the movable contact (26) and the fixed contact (21), they can be separated from each other by the pressing force causing movement to the open position. Therefore, as compared with a configuration in which the movable contact (26) is moved to the closed position by applying a pressing force thereto, reliability between the contacts can be enhanced.

Preferably in an electromagnetic relay (1) according to a fourth aspect would be realized in combination with the third aspect, the press part (80) causes movement of the movable contact (26) to the closed position by reducing or eliminating the pressing force to the certain surface (250) of the movable spring (25). According to the fourth aspect, it is possible to maintain the closed state between the contacts even if the movable contact (26) and/or the fixed contact (21) are worn due to aging, for example. Therefore, the reliability between the contacts can be enhanced. That is, for example, even in a configuration in which the movable contact is moved to the closed position by applying a pressing force, the closed state between the contacts can be maintained even when they are worn as long as depth of wear is smaller than a predetermined amount, for example, corresponding to a distance of OT (Over Travel). However, a gap may be developed between the contacts when depth of wear exceeds the predetermined amount. However, the movable contact is moved to the closed position by eliminating or reducing the pressing force, the closed state between the contacts can be maintained by the elastic restoring force of the movable spring (25) even if depth of wear exceeds the predetermined amount.

Preferably in an electromagnetic relay (1) according to a fifth aspect would be realized in combination with any one of the first to fourth aspects, the contact unit (2) is placed close to either one of opposite ends of the coil (50) in an axial direction (A2) of the coil (50). According to the fifth aspect, as compared with a case where the contact unit (2) and the coil (50) are arranged along a direction perpendicular to the axial direction (A2), for example, the stroke of the armature unit (6) can be increased with downsizing (in particular decreasing in height) achieved.

Preferably in an electromagnetic relay (1) according to a sixth aspect would be realized in combination with any one of the first to fifth aspects, the armature unit (6) moves the movable contact (26) by swinging about a rotation axis (A1) relative to the base (4B) in accordance with excitation of the electromagnet (5). According to the sixth aspect, it is possible to increase the stroke of the armature unit (6) while realizing downsizing (in particular, decreasing in height).

Preferably an electromagnetic relay (1) according to a seventh aspect would be realized in combination with any one of the first to sixth aspects further includes a plurality of the contact units (2) including two contact units (2) which are a first contact unit (2A) and a second contact unit (2B). Preferably, the armature unit (6) includes two of the press parts (80) which are a first press part (80A) and a second press part (80B). The first press part (80A) causes movement of the movable contact (26) of the first contact unit (2A) by applying the pressing force to the certain surface (250) of the movable spring (25) of the first contact unit (2A). The second press part (80B) causes movement of the movable contact (26) of the second contact unit (2B) by applying the pressing force to the certain surface (250) of the movable spring (25) of the second contact unit (2B). When one of the first press part (80A) and the second press part (80B) moves toward the certain surface (250) of a corresponding movable spring (25), the other of the first press part (80A) and the second press part (80B) moves away from the certain surface (250) of a corresponding movable spring (25). According to the seventh aspect, one of the first contact unit (2A) and the second contact unit (2B) can serve as a normally open contact which closes a contact when the electromagnet (5) is excited, and the other can serve as a normally closed contact which closes a contact when the electromagnet (5) is not excited. Therefore, the electromagnetic relay (1) can be applied as a safety relay capable of detecting occurrence of an abnormality such as contact welding.

Preferably an electromagnetic relay (1) according to an eighth aspect would be realized in combination with any one of the first to seventh aspects further includes a plurality of the contact units (2). Preferably, the electromagnet (5) is placed among the plurality of contact units (2). According to the eighth aspect, it is possible to realize further downsizing (in particular, decreasing in height).

Preferably in an electromagnetic relay (1) according to a ninth aspect would be realized in combination with the eighth aspect, at least two contact units (2) of the plurality of contact units (2) are arranged with the electromagnet (5) in-between. Preferably, the two contact units (2) include a contact unit (2A) which is on one side of the electromagnet (5) in an arrangement direction of the two contact units (2) and includes a normally open contact, and a contact unit (2B) which is on the other side of the electromagnet (5) in the arrangement direction of the two contact units (2) and includes a normally closed contact. According to the ninth aspect, the electromagnetic relay (1) can be applied as a safety relay capable of detecting occurrence of an abnormality such as contact welding.

Configurations according to the second to ninth aspects are not necessary for the electromagnetic relay (1) and thus may be omitted appropriately.

Also as described above, an electromagnetic device (3) according to a tenth aspect includes: an electromagnet (5); and an armature unit (6). The electromagnet (5) includes a coil (50) and a yoke (52) provided to protrude from the coil (50). The armature unit (6) includes an armature (7) at least part of which has an area facing the yoke (52), and a holder (8) holding the armature (7). The armature (7) moves in a direction in which the area moves toward the yoke (52) or in a direction in which the area moves away from the yoke (52), when the electromagnet (5) is excited. The holder (8) includes a separator (85) which has electrically insulating properties and separates at least part of the area of the armature (7) facing the yoke (52) from the yoke (52) when the area moves toward the yoke (52). According to the tenth aspect, the magnetic gap can be provided with the configuration simplified.

Preferably in an electromagnetic device (3) according to an eleventh aspect would be realized in combination with the tenth aspect, the armature unit (6) further includes a permanent magnet (9). Preferably the holder (8) holds the armature (7) and the permanent magnet (9) integrally. According to the eleventh aspect, movement of the armature unit (6) in response to the excitation of the electromagnet (5) can be performed with higher accuracy by the permanent magnet (9). Further, the holder (8) holds both of the armature (7) and the permanent magnet (9) and therefore the configuration can be simplified.

Preferably in an electromagnetic device (3) according to a twelfth aspect would be realized in combination with the eleventh aspect, the armature unit (6) swings about a rotation axis (A1) relative to the electromagnet (5) in accordance with excitation of the electromagnet (5). Preferably the permanent magnet (9) is placed in a position deviated away from the rotation axis (A1). According to the twelfth aspect, swing of the armature unit (6) in response to the excitation of the electromagnet (5) can be performed with higher accuracy by the permanent magnet (9).

Preferably in an electromagnetic device (3) according to a thirteenth aspect would be realized in combination with any one of the tenth to twelfth aspects, the separator (85) is placed to separate only part of the area of the armature (7) from the yoke (52). According to the thirteenth aspect, manufacture of the armature unit (6) can be made easier than that of a configuration separating the entire area from the yoke (52), for example.

Preferably in an electromagnetic device (3) according to a fourteenth aspect would be realized in combination with any one of the tenth to thirteenth aspects, the separator (85) is placed to be in contact with at least part of the yoke (52) facing the area of the armature (7). According to the fourteenth aspect, it is possible to provide the magnetic gap with the configuration more simplified.

Preferably in an electromagnetic device (3) according to a fifteenth aspect would be realized in combination with any one of the tenth to fourteenth aspects, the armature unit (6) swings about a rotation axis (A1) relative to the electromagnet (5) in accordance with excitation of the electromagnet (5). Preferably the separator (85) is placed to separate an outer end of opposite ends of the area of the armature (7) in a radial direction of the rotation axis (A1) from the yoke (52). According to the fifteenth aspect, the magnetic gap can be made with higher accuracy than a configuration separating an inner end of opposite ends of the area of the armature (7) from the yoke (52), for example. Therefore, separation of the armature (7) from the yoke (52) can be made easier.

Preferably in an electromagnetic device (3) according to a sixteenth aspect would be realized in combination with any one of the tenth to fifteenth aspects, the armature unit (6) swings about a rotation axis (A1) relative to the electromagnet (5) in accordance with excitation of the electromagnet (5). Preferably the armature (7) includes a plurality of the areas facing the yoke (52) including two areas which are a first area (71) and a second area (72). Preferably the first area (71) and the second area (72) are provided to opposite tops of the armature unit (6) extending in opposite directions (left and right directions) moving away from the rotation axis (A1), respectively. Preferably a first interval (D1) between the first area (71) and the yoke (52) when the first area (71) is in a closest position to the yoke (52) and a second interval (D2) between the second area (72) and the yoke (52) when the second area (72) is in a closest position to the yoke (52) are different from each other. According to the sixteenth aspect, control of operation (swing) of the armature (7) can be facilitated.

Preferably in an electromagnetic device (3) according to a seventeenth aspect would be realized in combination with the sixteenth aspect, the separator (85) is placed to separate either one of the first area (71) and the second area (72) of the armature (7) from the yoke (52). According to the seventeenth aspect, manufacture of the armature unit (6) can be made easier than that of a configuration separating both the first area (71) and the second area (72), for example.

Preferably in an electromagnetic device (3) according to an eighteenth aspect would be realized in combination with any one of the tenth to seventeenth aspects, the electromagnet (5) further includes a coil terminal (53). Preferably the coil terminal (53) is held by a coil bobbin (51) of the coil (50) and is connected to the coil (50). Preferably the coil terminal (53) is provided on an opposite side of the yoke (52) from the armature (7) and extends in a direction away from the armature (7). According to the eighteenth aspect, it is possible to downsize the electromagnetic device (3).

An electromagnetic relay (1) according to a nineteenth aspect includes: the electromagnetic device (3) according to any one of the tenth to eighteenth aspects; and a contact unit (2). The contact unit (2) includes a fixed contact (21), and a movable contact (26) movable in accordance with movement of the armature unit (6) between a closed position in contact with the fixed contact (21) and an open position away from the fixed contact (21). According to the nineteenth aspect, it is possible to provide the electromagnetic relay (1) including the electromagnetic device (3) which can be provided with the magnetic gap with the configuration simplified.

Configurations according to the eleventh to eighteenth aspects are not necessary for the electromagnetic device (3) and thus may be omitted appropriately.

Also as described above, an electromagnetic device (3X) according to a twentieth aspect includes: an electromagnet (5); an armature (7); a permanent magnet (9); and an auxiliary yoke (Y1). The electromagnet (5) includes a coil (50) and a yoke (52). The permanent magnet (9) includes poles one of which (one of an S pole and an N pole) faces the armature (7). The auxiliary yoke (Y1) includes a first surface (Y11) and a second surface (Y12). The first surface (Y11) faces the other of the poles (the other of the S pole and the N pole) of the permanent magnet (9) and crosses a magnetic pole direction of the permanent magnet (9). The second surface (Y12) faces the yoke (52). The armature (7) moves toward or away from the yoke (52) when the electromagnet (5) is excited. The second surface (Y12) of the auxiliary yoke (Y1) faces the yoke (52) in a range of at least part of a movable range of the armature (7) moving in response to the excitation. According to the twentieth aspect, it is possible to reduce the leakage flux at the other of the poles of the permanent magnet (9).

Preferably in an electromagnetic device (3X) according to a twenty-first aspect would be realized in combination with the twentieth aspect, the yoke (52) includes a protruded part (520) protruding from one end in an axial direction (A2) of the coil (50) in a direction crossing the axial direction (A2). Preferably the second surface (Y12) of the auxiliary yoke (Y1) faces the protruded part (520) in the range of the at least part. According to the twenty-first aspect, a flow of a magnetic flux between the protruded part (520) and the second surface (Y12) of the auxiliary yoke (Y1) becomes dominant, and therefore it is possible to further reduce the leakage of the magnetic flux.

Preferably in an electromagnetic device (3X) according to a twenty-second aspect would be realized in combination with the twentieth or twenty-first aspect, the armature (7) rotates about a rotation axis (A1) relative to the electromagnet (5) within the movable range in accordance with the excitation. Preferably the permanent magnet (9) is in a position deviated from the rotation axis (A1). According to the twenty-second aspect, rotation (swing) of the armature (7) in response to the excitation of the electromagnet (5) can be performed with higher accuracy through the permanent magnet (9) and the auxiliary yoke (Y1).

Preferably in an electromagnetic device (3X) according to a twenty-third aspect would be realized in combination with the twenty-second aspect, the auxiliary yoke (Y1) is in a position deviated from the rotation axis (A1). According to the twenty-third aspect, rotation (swing) of the armature (7) in response to the excitation of the electromagnet (5) can be performed with higher accuracy through the permanent magnet (9) and the auxiliary yoke (Y1) with the leakage flux reduced.

Preferably an electromagnetic device (3X) according to a twenty-fourth aspect would be realized in combination with any one of the twentieth to twenty-third aspects further includes a holder (8). The holder (8) holds the armature (7), the permanent magnet (9), and the auxiliary yoke (Y1) integrally. According to the twenty-fourth aspect, the permanent magnet (9) and the auxiliary yoke (Y1) can be rotated (swung) integrally with the armature (7) with displacements thereof suppressed.

Preferably in an electromagnetic device (3X) according to a twenty-fifth aspect would be realized in combination with any one of the twentieth to twenty-fourth aspects, the permanent magnet (9) is placed to cover the first surface (Y11) of the auxiliary yoke (Y1). According to the twenty-fifth aspect, it is possible to further efficiently reduce the leakage of the magnetic flux at the other magnetic pole of the permanent magnet (9).

Preferably in an electromagnetic device (3X) according to a twenty-sixth aspect would be realized in combination with any one of the twentieth to twenty-fifth aspects, the second surface (Y12) of the auxiliary yoke (Y1) faces the yoke (52) at least when the electromagnet (5) is not excited. According to the twenty-sixth aspect, it is possible to reduce the leakage of the magnetic flux during non-excitation.

Preferably in an electromagnetic device (3X) according to a twenty-seventh aspect would be realized in combination with any one of the twentieth to twenty-sixth aspects, the second surface (Y12) of the auxiliary yoke (Y1) is outside a range facing the yoke (52) when the electromagnet (5) is in the excitation. According to the twenty-seventh aspect, it is possible to reduce a possibility that the armature (7) is hardly separated from the yoke (52) when the excitation is switched to the non-excitation.

An electromagnetic relay (1X) according to a twenty-eighth aspect includes: the electromagnetic device (3X) according to any one of the twentieth to twenty-seventh aspects; and a contact unit (2). The contact unit (2) includes a fixed contact (21), and a movable contact (26) movable in accordance with movement of the armature (7) between a closed position in contact with the fixed contact (21) and an open position away from the fixed contact (21). According to the twenty-eighth aspect, it is possible to provide the electromagnetic relay (1X) including the electromagnetic device (3X) capable of reducing the leakage flux.

Configurations according to the twenty-first to twenty-seventh aspects are not necessary for the electromagnetic device (3X) and thus may be omitted appropriately.

REFERENCE SIGNS LIST

1, 1X Electromagnetic Relay
2 Contact Unit
2A First Contact Unit
2B Second Contact Unit
21 Fixed Contact
25 Movable Spring
250 Certain Surface
26 Movable Contact
26A First Movable Contact
26B Second Movable Contact
3, 3X Electromagnetic Device
4B Base
40 Certain Surface
5 Electromagnet
50 Coil
51 Coil Bobbin
52 Yoke
520 Protruded Part
53 Coil Terminal
6 Armature Unit
7 Armature
71 First Area
72 Second Area
8 Holder
80 Press Part
80A First Press Part
80B Second Press Part
85 Separator
9 Permanent Magnet
A1 Rotation Axis
A2 Axial Direction
D1 First Interval
D2 Second Interval
Y1 Auxiliary Yoke
Y11 First Surface
Y12 Second Surface

The invention claimed is:

1. An electromagnetic device comprising:
an electromagnet including a coil and a yoke; and
an armature unit including:
  an armature;
  a permanent magnet including poles one of which faces the armature;

an auxiliary yoke including a first surface which faces the other of the poles of the permanent magnet, and a second surface facing the yoke; and a holder holding the armature, the permanent magnet and the auxiliary yoke such that the permanent magnet is disposed between the armature and the auxiliary yoke, wherein:

the armature is configured to move toward or away from the yoke when the electromagnet is excited, the second surface of the auxiliary yoke is adjacent to the first surface of the auxiliary yoke and a normal direction of the second surface crosses a normal direction of the first surface, the yoke includes:

a first part around which the coil is disposed, the first part being disposed not to overlap with the armature when viewed from the normal direction of the first surface;

a second part extending from the first part toward the armature to overlap with the armature and extending along an arrangement direction where the armature and the first part are arranged, when viewed from the normal direction of the first surface; and a third part disposed such that the first part is interposed between the second part and the third part when viewed from the first part, the third part extending from the first part toward the armature to overlap with the armature and extending along the arrangement direction, when viewed from the normal direction of the first surface, and the second surface of the auxiliary yoke faces either the second part or the third part of the yoke in a range of at least part of a movable range of the armature moving in response to the excitation.

2. The electromagnetic device according to claim 1, wherein the yoke includes, as the second part or the third part, a protruded part protruding from one end in an axial direction of the coil in a direction crossing the axial direction, and the second surface of the auxiliary yoke faces the protruded part in the range of the at least part.

3. The electromagnetic device according to claim 1, wherein the second surface of the auxiliary yoke faces either the second part or the third part of the yoke at least when the electromagnet is not excited.

4. The electromagnetic device according to claim 1, wherein the second surface of the auxiliary yoke is outside a range facing either the second part or the third part of the yoke when the electromagnet is in the excitation.

5. An electromagnetic relay comprising:

the electromagnetic device according to claim 1; and a contact unit including a fixed contact, and a movable contact movable in accordance with movement of the armature between a closed position in contact with the fixed contact and an open position away from the fixed contact.

6. The electromagnetic device according to claim 1, wherein the holder has electrical insulation.

7. The electromagnetic device according to claim 1, wherein the holder holding the armature is configured to move toward or away from the yoke around a rotation axis of the holder, when the electromagnet is excited.

8. The electromagnetic device according to claim 7, wherein centers of gravity of the permanent magnet and the auxiliary yoke are located to be biased to one side from the rotation axis of the holder.

9. An electromagnetic device comprising:

an electromagnet including a coil and a yoke;

an armature;

a permanent magnet including poles one of which faces the armature; and an auxiliary yoke including a first surface which faces the other of the poles of the permanent magnet, and a second surface facing the yoke; and a base having a main surface and holding the electromagnet over the main surface, wherein:

the armature is configured to move toward or away from the yoke when the electromagnet is excited, the permanent magnet is disposed between the armature and the auxiliary yoke, the second surface of the auxiliary yoke is adjacent to the first surface of the auxiliary yoke and a normal direction of the second surface crosses a normal direction of the first surface, the yoke includes:

a first part around which the coil is disposed, the first part being disposed not to overlap with the armature when viewed from the normal direction of the first surface;

a second part extending from the first part toward the armature to overlap with the armature and extending along an arrangement direction where the armature and the first part are arranged, when viewed from the normal direction of the first surface; and a third part disposed such that the first part is interposed between the second part and the third part when viewed from the first part, the third part extending from the first part toward the armature to overlap with the armature and extending along the arrangement direction, when viewed from the normal direction of the first surface, and the second surface of the auxiliary yoke faces either the second part or the third part of the yoke in a range of at least part of a movable range of the armature moving in response to the excitation, and the permanent magnet is placed between the base and the armature in an arrangement direction in which the base and the electromagnet are arranged.

* * * * *